United States Patent
Kujawa et al.

(10) Patent No.: US 11,191,138 B1
(45) Date of Patent: Nov. 30, 2021

(54) LIGHT CONTROL SYSTEMS, METHODS, DEVICES, AND USES THEREOF

(71) Applicant: Lumitec, LLC, Delray Beach, FL (US)

(72) Inventors: John Alexander Kujawa, Delray Beach, FL (US); Michael John McDonald, Coconut Creek, FL (US); Steven Marc Rotolante, Jupiter, FL (US); Paul Stephan Abbott, Lake Worth, FL (US); Michael Albion Kestner, Boynton Beach, FL (US); Christopher Robert Fulmer, Jupiter, FL (US)

(73) Assignee: Lumitec, LLC, Delray Beach, FL (US)

( * ) Notice: Subject to any disclaimer, the term of this patent is extended or adjusted under 35 U.S.C. 154(b) by 0 days.

(21) Appl. No.: 16/575,922

(22) Filed: Sep. 19, 2019

Related U.S. Application Data

(60) Provisional application No. 62/733,569, filed on Sep. 19, 2018.

(51) Int. Cl.
| | |
|---|---|
| *H01K 7/00* | (2006.01) |
| *B60Q 1/26* | (2006.01) |
| *H05B 45/20* | (2020.01) |
| *B60R 16/023* | (2006.01) |
| *B60Q 3/80* | (2017.01) |

(52) U.S. Cl.
CPC ......... *H05B 45/20* (2020.01); *B60R 16/0231* (2013.01); *B60Q 3/80* (2017.02)

(58) Field of Classification Search
CPC ..... H05B 45/20; B60R 16/0231; B60R 16/03; B60Q 3/80; B60Q 1/1415; B60Q 1/143; B60Q 1/44; B60Q 1/54; B60Q 2300/112; H02K 21/48; B62J 6/001; B62J 6/003; H02J 7/1492
See application file for complete search history.

(56) References Cited

U.S. PATENT DOCUMENTS

| | | | |
|---|---|---|---|
| 8,506,125 B2 * | 8/2013 | Pohlert | H05B 45/00 362/277 |
| 8,710,770 B2 | 4/2014 | Woytowitz | |
| 9,193,273 B1 * | 11/2015 | Frank | B60L 55/00 |
| 9,609,720 B2 | 3/2017 | Woytowitz et al. | |
| 2006/0056855 A1 * | 3/2006 | Nakagawa | G09F 9/33 398/183 |
| 2014/0191662 A1 * | 7/2014 | Lee | H05B 45/20 315/132 |
| 2015/0189723 A1 * | 7/2015 | Ogawa | G06F 3/04817 315/294 |

\* cited by examiner

*Primary Examiner* — Minh D A
(74) *Attorney, Agent, or Firm* — Calfee, Halter & Griswold LLP

(57) ABSTRACT

Disclosed is a lighting control system that transmits lighting control signals digitally over a conductor which also provides power to the lights being controlled. The lighting control system includes a controller which transmits the control signals and one or more receivers that are associate with lights or other loads, the receivers receiving the digital signals from the controller and causing the lights or other loads to perform the actions required by the control signals.

18 Claims, 64 Drawing Sheets

Fig. 8

| NAME | TYPICAL | MINIMUM | MAXIMUM | NOTES |
|---|---|---|---|---|
| $V_{bus}$ | 12 V | 10 V | 30 V | |
| $V_{IL}$ | - | - | 8.25 V | V falling |
| $V_{IH}$ | - | 8.60 V | - | V rising |

Fig. 9

| NAME | TYPICAL | MINIMUM | MAXIMUM | NOTES |
|---|---|---|---|---|
| $t_{BO}$ | 20 ms | 18 ms | 28 ms | if short-inhibit not set, light begins ramp-up as normal. |
| $t_{ssd-PU}$ | 100 ms | 100 ms | No limit | if light was prev. in PLI mode. |
| $t_{ssd-PP}$ | 3 s | 2.2 s | No limit | Any mode. |
| $t_{sk}$ | 55 ms ($t_{bo}$ + (7 * $t_{sym}$)) | 25 ms | 64 ms | |
| $t_{sym}$ | 1 * $t_{sym-init}$ | 0.985*$t_{sym-init}$ (-1.5%) | 1.015*$t_{sym-init}$ (+1.5%) | Window size = +/- 1.5% of $t_{sym-init}$ |
| $t_{sol}$ | 3 * $t_{sym-typ}$ | 3 * $t_{sym-min}$ | No limit | |
| Low Speed Mode | | | | |
| $t_{sym-init}$ | 5 ms | 4.850 ms (-3%) | 5.150 ms (+3%) | $t_{sym-init}$ establishes the baud-rate |
| $t_{on}$ | 100 us | 80 us | 400 us | minimize to avoid visual flicker |
| slew | - | 0.02V/us (not tested) | - | minimize stray capacitance |
| jitter | - | -70 us | 70 us | minimize interrupt latency of bit-banging |
| High Speed Mode | | | | |
| $t_{sym}$ | 1 ms | 0.970 ms (-3%) | 1.030 ms (+3%) | $t_{sym-init}$ establishes the baud-rate |
| $t_{on}$ | 100 us | 80 us | 150 us | minimize to avoid visual flicker |
| slew | - | 0.1V/us (not tested) | - | minimize stray capacitance |
| jitter | - | -15 us | 15 us | minimize interrupt latency of bit-banging |

| Name | CRC-4-PLI | Defined CRC parameter set name. |
|---|---|---|
| Width (in bits) | 4 | Defines the width of the result CRC value (n bits). Simultaneously, also the width of the generator polynomial is defined (n+1 bits). |
| Polynomial | 0x3 (Normal) 0x9 (Koopman) ($x^4 + x^1 + x^0$) | Used generator polynomial value. Note that different representations exist. |
| Initial Value | 0x0 (Allows optional padding 26bits data with '0's at MSb to multiple of 8bits.) | The value used to initialize or "seed" the CRC value / register. Using a non-zero value prevents accepting a message with extra zeros prepended (padded). |
| Input reflected | FALSE The MSb (leftmost bit) is shifted in first. | Reflected means that the bits of the input are used in reverse order. TRUE = Least Sig. Bit first. FALSE = Most Sig. Bit first. |
| Result reflected | FALSE | If this value is TRUE, the final CRC value is reflected before being returned. |
| Final XOR value | 0xF | The Final XOR value is XOR'd to the final CRC value before being returned. Using a non-zero value prevents accepting a (shifted) message with extra zeros appended. |
| Check value examples | 0x00 → 0xF 0x00000000 → 0xF 0x4A0800 → 0x9 0x004A0800 → 0x9 0x004A0801 → 0xA 0x03AEA600 → 0x2 0x03FFFFFFF → 0x0 | Specified to help to validate the implementation. Also see CRC calculator at http://zorc.breitbandkatze.de/crc.html |

LIGHT CONTROL SYSTEMS, METHODS, DEVICES, AND USES THEREOF

CROSS-REFERENCE TO RELATED APPLICATIONS

This application claims priority to and all benefit of U.S. Patent Application Ser. No. 62/733,569, filed on Sep. 19, 2018, for LIGHT CONTROL SYSTEMS, METHODS, DEVICES, AND USES THEREOF ("the '569 Appl'n"), the entire disclosure of which is fully incorporated herein by reference. This application is related to two design patent applications filed herewith, U.S. application Ser. No. 29/706,294 and U.S. application Ser. No. 29/706,296, the entire disclosures of which are fully incorporated herein by reference.

TECHNICAL FIELD

This disclosure generally relates to light control systems, methods, devices, and uses thereof.

BACKGROUND

Lighting devices can be offered in a variety shapes, sizes, and configurations. Overall, lighting devices are utilized for illumination, projection, aesthetics, and the like. As such, lighting devices have many different types of applications. In some examples, lighting devices can be configured with one or more light emitting diodes (LEDs). High luminosity, bright colors, variety in light source combinations, and low power consumption are features of and reasons for the popularity of LEDs. In general, the color changes and combinations are achieved by passing electric currents and pulses through various LEDs, e.g., red plus blue-shifted yellow or three basic colors of red, blue and green to generate multifarious light sources unsurpassed by other light sources or lighting devices. Moreover, through various combinations of colors and changes in luminosity, a dynamic lighting effect can be achieved.

SUMMARY

In an exemplary embodiment, a method of controlling LED lighting devices on a vehicle using power line instructions (PLIs) sent via a lighting power line of the vehicle, the lighting power line having a nominal voltage of 10-30 volts, VDC, comprising: providing a controller configured to sequentially transmit lighting control PLIs via the lighting power line of the vehicle to control the color and intensity of LED lighting devices on the vehicle, wherein the lighting control PLIs comprise a plurality of data bits and wherein one type of data bit of the PLIs comprises the controller temporarily causing the power line to drop below the nominal voltage to below a voltage threshold set by the receiving controller; providing a plurality of LED lighting devices, each LED lighting device configured to (a) receive lighting control PLIs via a power line, (b) detect when the voltage on the power line drops below the voltage threshold to detect PLI data bits, and (c) change the lighting configuration of the LED lighting device in accordance with received PLIs; and providing a user interface permitting a user to instruct the controller to command, via a PLI, the LED lighting devices to change display color and intensity.

In another exemplary embodiment, an LED lighting device powered by a lighting power line and configured to (a) receive lighting control power line instructions (PLIs) sent via the lighting power line, (b) detect when a voltage on the lighting power line drops below a voltage threshold to detect specific PLI data bits, and (c) change the color and intensity of the LED lighting device in accordance with received PLIs, the LED lighting device comprising a decoder to decode data bits that have been encoded in PLIs received by the LED lighting device, the data bits comprising color data bits and intensity data bits.

In another exemplary embodiment, a method of controlling LED lighting devices on a vehicle using power line instructions (PLIs) sent via a lighting power line of the vehicle, the lighting power line having a nominal voltage of 10-30 volts, VDC, comprising: providing a controller configured to sequentially transmit lighting control PLIs via the lighting power line to control the color and intensity of LED lighting devices on the vehicle, wherein the lighting power line has a nominal voltage of 10-30 volts; VDC; wherein the lighting control PLIs comprise multiple data bits; and wherein one type of data bit of the PLIs comprises the controller temporarily causing the lighting power line to drop below its nominal voltage to below a voltage threshold set by the receiving controller; and wherein the PLIs comprise the following protocol on the lighting power line: at least two start bits, each of the start bits comprising the controller temporarily causing the lighting power line voltage to drop below the voltage threshold set by the controller for 80-400 microseconds and then increasing back up, and wherein the at least two start bits are separated by a period of time that establishes a baud rate for the PLIs; a plurality of data bits comprising command bits and bits representing at least one of color data, hue and saturation data, and brightness data, wherein for another type of data bit and between data bits, the lighting power line does not drop to below the voltage threshold set by the controller; and a plurality of error-detecting bits.

In another exemplary embodiment, a method of controlling LED lighting devices, comprising: providing a controller configured to transmit lighting control instructions; and providing a user interface permitting a user to instruct the controller to command the LED lighting devices to change display color and intensity; and wherein the user interface has a main control page displaying a name and icon for each subset of the LED lighting devices on a system; and wherein each icon can invoke either a single-stage widget, allowing a user to immediately control a LED lighting device (e.g., toggle on, momentary on), or a two-stage widget, which, when actuated (e.g., via press and hold actuation), presents the user with a plurality of different of dynamically changeable lighting control options and allowing the user to select one of the plurality of dynamically changeable lighting control options to allow for additional user control.

In another exemplary embodiment, a method of controlling LED lighting devices, comprising: providing a controller configured to transmit lighting control instructions comprising bits of a first bit polarity or bits of a second bit polarity, wherein a lighting control instruction to control the output color of a device comprises one or both of the following:

(a) two start bits of the first bit polarity; a plurality of bits comprising first and second sequential command bits, the first command bit being of the first bit polarity and the second command bit being of the second bit polarity; and a plurality of bits representing color data; and (b) two start bits of the first bit polarity, a plurality of bits comprising first and second sequential command bits, the first command bit being of the first bit polarity and the second command bit being of the first bit polarity, and a plurality of bits representing saturation and hue data.

In another exemplary embodiment, a method of controlling LED lighting devices, comprising: providing a controller configured to transmit lighting control instructions comprising bits of a first bit polarity or bits of a second bit polarity, wherein a lighting control instruction causing an LED lighting device to inhibit output on startup comprises: two start bits of the first bit polarity; and then a plurality of bits comprising sequential command bits, the first command bit being of the second bit polarity, the second command bit being of the second bit polarity, the third command bit being of the first bit polarity, the fourth command bit being of the first bit polarity, the fifth command bit being of the second bit polarity, and the sixth command bit being of the second bit polarity.

In another exemplary embodiment, a method of controlling LED lighting devices using power line instructions (PLIs) sent via one or more power lines, comprising: providing a controller configured to sequentially transmit lighting control PLIs via one or more power lines to control the pan and tilt angles of the lighting device; and providing a controller configured to sequentially transmit lighting control PLIs via one or more power lines to control the pan and tilt angles of the light as well as the focus of the light (zoom) where the diameter of the light projected on a surface that is a plane perpendicular to the direction of propagation of the energy increases and decreases in diameter while decreasing and increasing respectively in light intensity (illuminating power per unit area).

In another exemplary embodiment, a method of controlling devices with ON/OFF or pulse width modulation (PWM) capability with power line instructions (PLIs) sent via one or more power lines, comprising: providing a controller configured to sequentially transmit control PLIs via one or more power lines to control loads such as motors, and lighting devices without inherent PLI interpretation capability.

This Summary is provided merely for purposes of summarizing some example embodiments to provide a basic understanding of some aspects of the disclosure. Accordingly, it will be appreciated that the above described exemplary embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

Features, objects and advantages other than those set forth above will become more readily apparent when consideration is given to the detailed description below. Such detailed description makes reference to the following drawings:

FIGS. 8-9 illustrated electrical and timing characteristics of exemplary waveforms output by the controller of an exemplary embodiment;

FIG. 10 is a chart detailing the cyclic redundancy check method of error detection;

FIG. 11 provides example communication packets sent by the controller to vary the color and transition characteristics of a light in an exemplary embodiment;

FIG. 12 illustrates exemplary color, pattern, and transition codes used by an exemplary embodiment;

FIG. 28 illustrates a user interface listing light groupings according to an exemplary embodiment;

FIG. 39 is a chart illustrating a command structure according to another exemplary embodiment;

DETAILED DESCRIPTION

Systems, methods, devices (collectively referred to herein as "systems and methods") are described for controlling one or more devices, such as lighting devices in some exemplary embodiments. According to the systems and methods described herein, power line instruction ("PLI") commands can be used to control one or more features/functions of each lighting device, a group of lighting devices, and other types of devices in certain exemplary embodiments. In some exemplary embodiments, PLI commands are 32-bit instruction commands. The PLI commands can be provided over one or more power lines to the one or more lighting devices. In a non-limiting example, the one or more power lines can correspond to direct-current (DC) power lines. The technical advantages of the systems and methods described herein will be better understood and become more readily apparent according to the following examples described herein.

Figure 1:
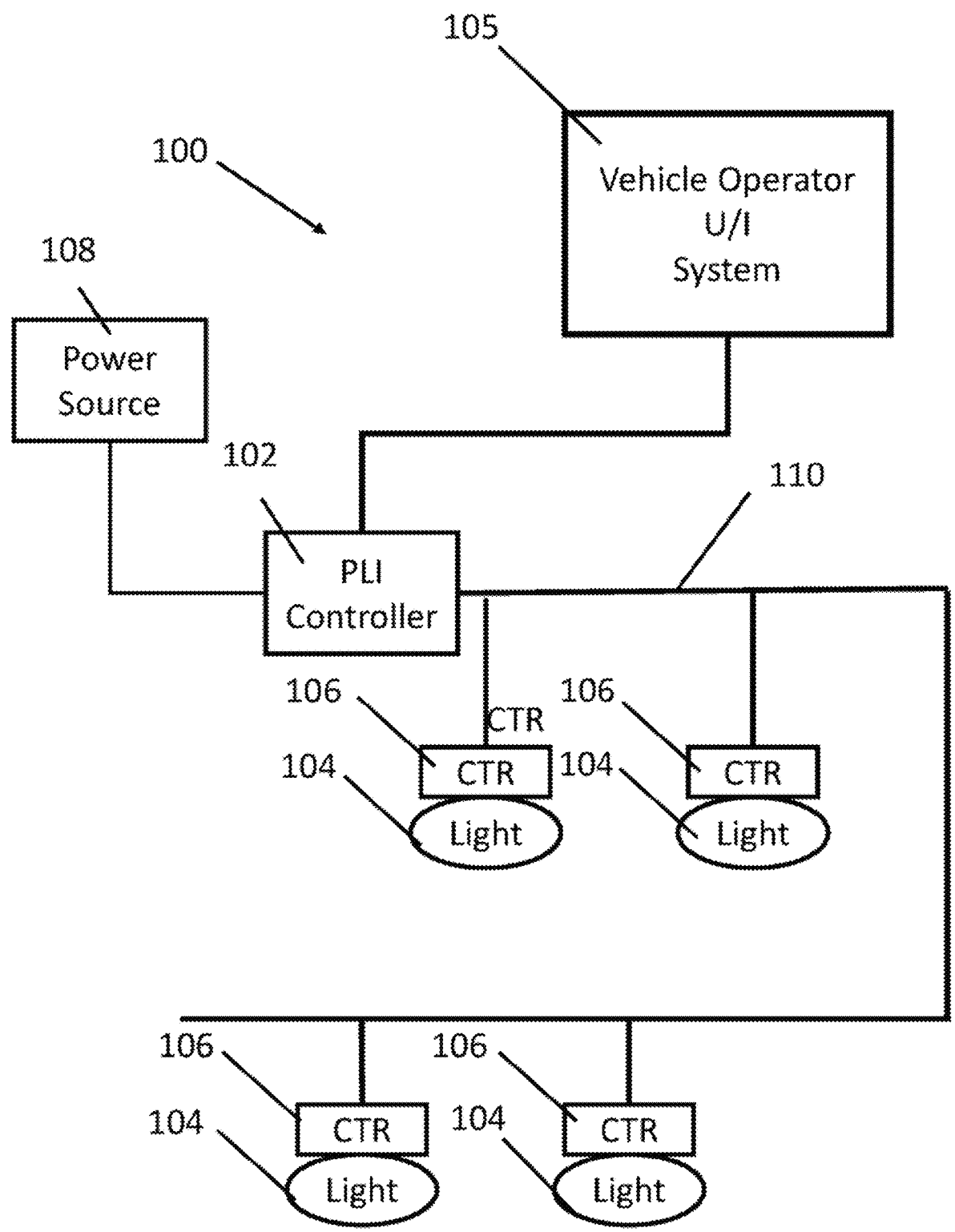
FIG. 1 illustrates a block diagram of a lighting control system according to an exemplary embodiment.

FIG. 1 illustrates a block diagram of an exemplary lighting control system 100. The exemplary lighting control system 100 comprises a PLI controller 102 and a plurality of lighting fixtures, each of which comprises a light source 104 that is controlled by a luminaire controller 106. In exemplary embodiments, each lighting fixture 104, 106 includes light source 104 and corresponding luminaire controller 106 combined in a single package. While the term "relay" or "relays" is used herein, certain embodiments may employ solid state devices such as MOSFETs and equivalent switching semiconductor devices. As would be the case in an ordinary lighting system, illustrated is a power source 108 and a power bus 110. In some exemplary embodiments, the PLI controller 102 is electrically connected between the power source 108 and the lighting fixtures 104, 106. In many cases, this power bus 110 will be a wiring harness installed in a vehicle (such as a boat) or other system that communicates power from the power source 108 to various points of use, for example, lighting fixtures 104. Also illustrated is a user interface (U/I) system 105 that permits a user to interact with a menu in order to control luminaire controllers 106 using the PLI controller 102. In exemplary embodiments, control signals are provided from the PLI controller 102 to the luminaire controllers 106 via the power bus 110, avoiding the requirement for separate control wires, or potentially unreliable wireless communication methods. As discussed herein, exemplary PLI lighting devices are connected to a lighting power line and ground line and comprise: one or more LEDs, LED drivers connected to a luminaire controller 106, the luminaire controller 106 for receiving and implementing PLIs, and a power supply powered by the lighting power line to power the circuitry (power the controller, LED drivers, LEDs, etc.). In exemplary embodiments, PLI lighting devices are only connected to the lighting power line and ground line, which makes retrofitting of PLI lighting devices to existing lighting system wiring very simple.

Figure 2:
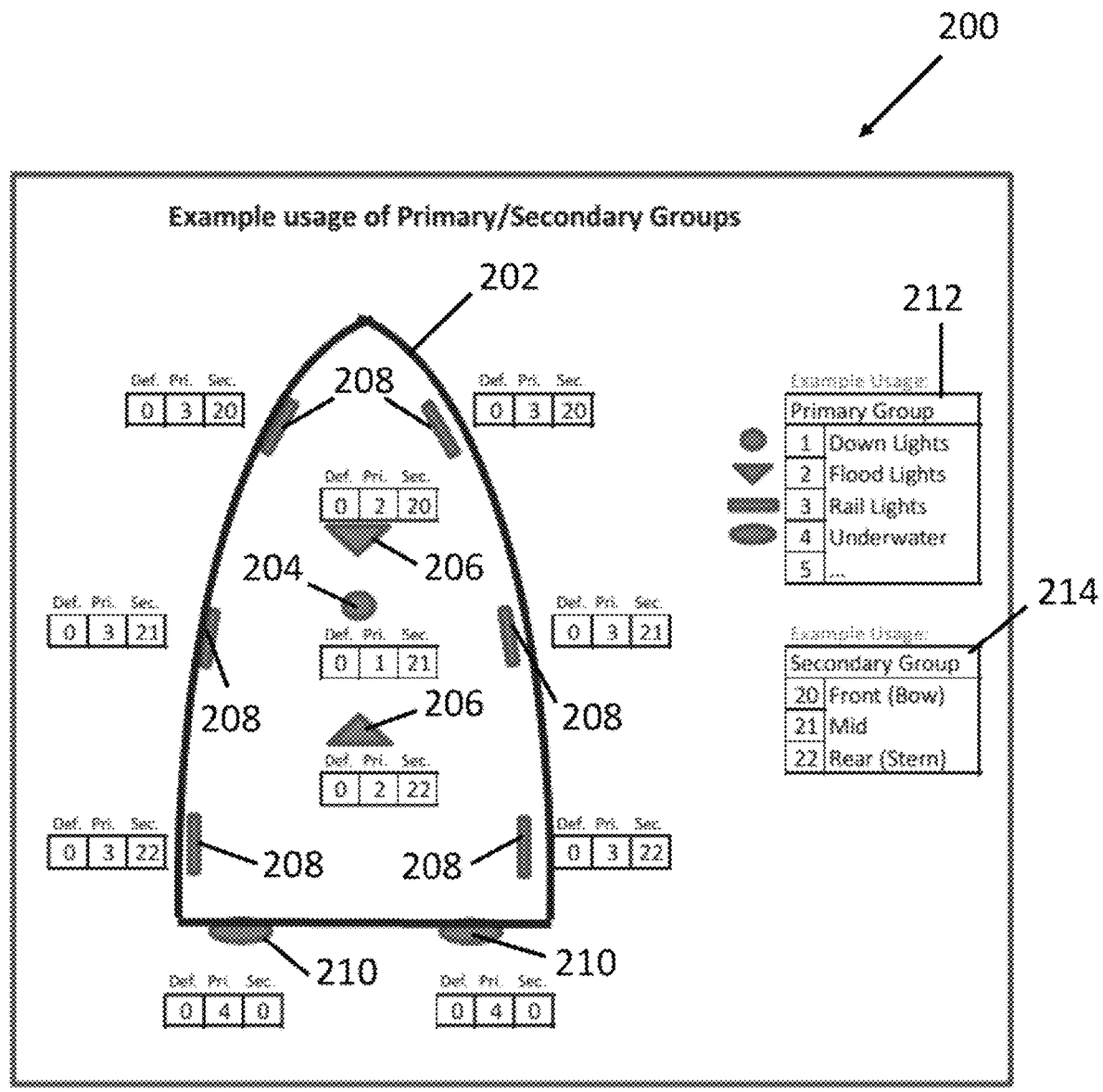
FIG. 2 illustrates a vehicle which includes a lighting control system according to an exemplary embodiment.

FIG. 2 illustrates an exemplary implementation 200 in which lighting fixtures are installed on a watercraft 202. In the illustrated example, there are four types of fixtures used, down lights 204, flood lights 206, rail lights 208, and underwater lights 210. This exemplary implementation should not be used to limit the types of lighting fixtures used in an implementation as the type of fixtures that could be implemented is almost limitless. As will be described in more detail, the illustrated fixtures are grouped into primary groups 212 and secondary groups 214 for purposes of control.

Figure 3:
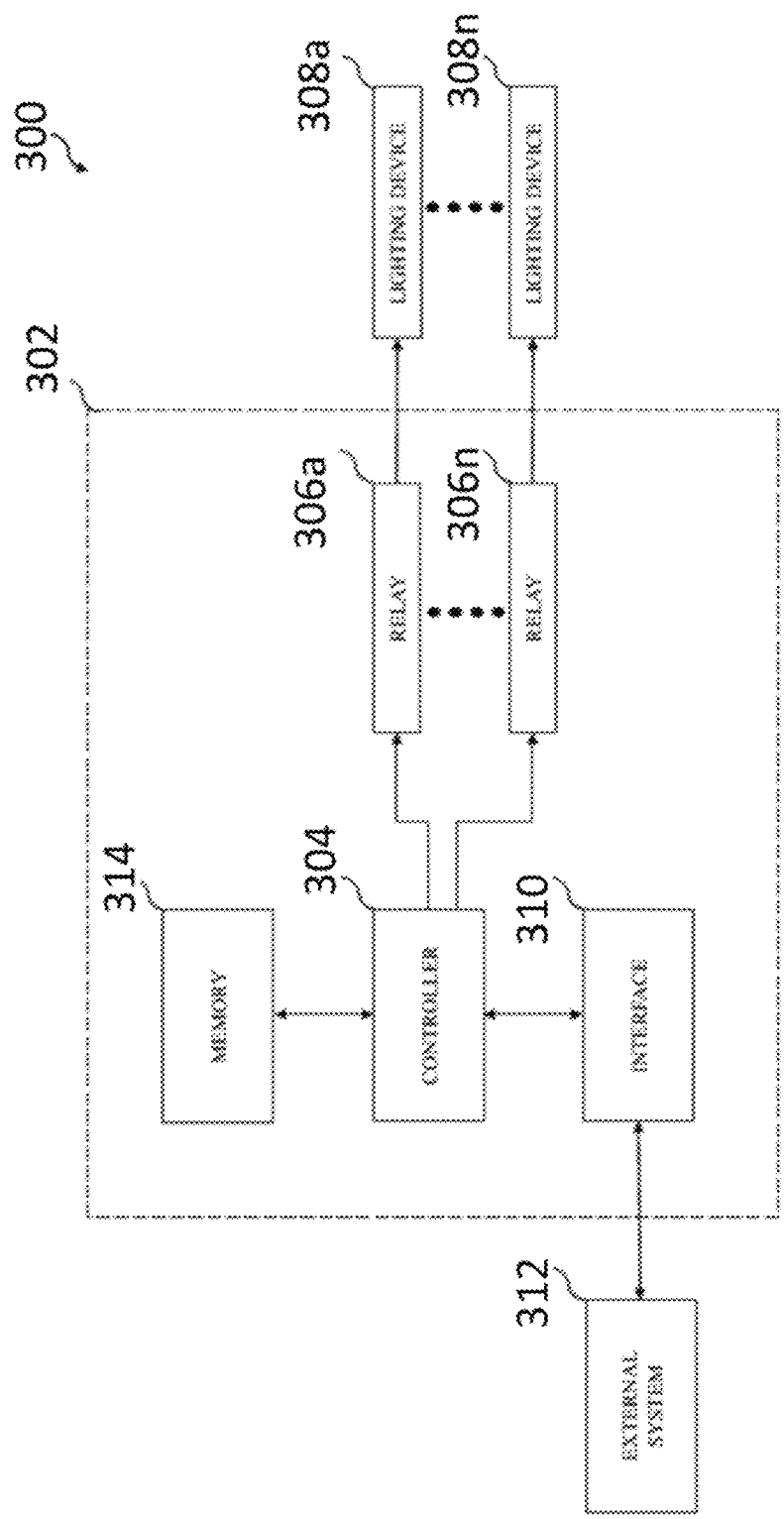
FIG. 3 illustrates an exemplary block diagram of a controller for a lighting control system according to another exemplary embodiment.

FIG. 3 illustrates a block diagram of an exemplary environment 300 that includes a lighting control system 302. The lighting control system 302 can include a controller 304. The controller 304 can be configured to control a plurality of relays 310a-310n, wherein "n" is an integer greater than zero. Although FIG. 3 illustrates a plurality of relays, in some examples, the controller 304 can be configured to control a single relay (e.g., relay 310a). The controller 304 can be configured to activate each relay 306a, 306n. Each relay 306a, 306b can be coupled to a corresponding lighting device 308a, 308n, wherein "n" is an integer greater than zero. Examples of lighting devices 308-308n can include, but not limited to, underwater lights, dome lighting, courtesy lighting (e.g., walkway lighting), flood lighting, down lighting, positionable lighting, etc. It should be understood that use of the term "relay" should not be interpreted as limiting the devices to mechanical relays and in fact, such devices may be mechanical or electronic as the circumstances and implementation warrant.

In some exemplary embodiments, the lighting control system 302 can include an interface 310. The interface 310 can include communication hardware that can be configured to facilitate a communication between the controller 304 and an external system 312. In an exemplary embodiment, the external system 312 can include one of a computer, a tablet, a mobile phone, programming device, and the like. The external system 312 can include memory that can store machine-readable instructions that the external system 312 can execute. In some examples, the stored machine-readable instructions can correspond to an application that can include a plurality of graphical user interfaces as disclosed and described herein. A user can interact with the plurality of graphical user interfaces to configure one or more parameters of the PLI controller 102. In some examples, the external system 312 can be configured to control one or more features/functions of each lighting device 308a-308n based on user input (e.g., PLI commands, etc.) associated with the plurality of graphical user interfaces (e.g., at an input device, such as a keyboard, a mouse, etc.).

In some exemplary embodiments, the external system can be a control system that is provisioned to interface with and control over components and systems present on the installation into which the lighting control system 302 is installed. For example, the control system may integrate the controls for various systems on a water craft such as engine control, navigation, communications, and entertainment.

In certain exemplary embodiments, the interface 310 can include wired and/or wireless communication technology for bidirectional communication between the controller 304 and the external system 312. For example, and without limitation, wired technology can include an Ethernet port, or the like. In some examples, the wireless communication technology can include radio technology. As such, in an exemplary embodiment the interface 310 can comprise, without limitation, Wi-Fi hardware, cellular hardware, or combinations which include both. According to the systems and methods described herein, the lighting control system 302 can be configured to control one or more parameters, including one or more functions/features of each lighting device 308a-308n based on configuration and/or parameter data (e.g., based on the user input) generated at the external system 312, and/or further based on stored data in memory 314 of the lighting control system 302.

The lighting control system 302 can include memory 314 for storing data and machine-readable instructions. The memory 314 can be implemented, for example, as a non-transitory computer storage medium, such as volatile memory (e.g., random access memory), non-volatile memory (e.g., a hard disk drive, a solid-state drive, flash memory or the like) or a combination thereof. In some examples, the controller 304 can include a processing unit (not shown in FIG. 3) to access the memory 314 and execute the machine-readable instructions. The processing unit could be implemented, for example, as one or more processor cores. In the present example, although the components of the lighting control system 302 are illustrated as being implemented on the same system, in other examples, the different components could be distributed across different systems and communicate, for example, over a network (e.g., wired network, wireless network, or both). Thus, the lighting control system 302 can be distributed across a plurality of different systems.

In some exemplary embodiments, the controller 302, the interface 310 and the memory 314 can be implemented on an integrated circuit. In these embodiments, the controller 304 can be configured as a web server module. The controller 304 can be configured to control outputs (e.g., the lighting devices 308a-308n) according to the systems and methods described herein. The web server module can be configured to communicate with an application (e.g., the application executing on the external system 312, as described herein). In some examples, the application is a web-based application. A user at the external system 312 can use the web-based application to communicate with the web server module (e.g., via a local web browser). The web server module can be configured to interact with other controller outputs to control each of the lighting device 308a-308n based on the user input.

As was illustrated in FIG. 1. in some examples, one or more different types of lighting devices 104, 106 (308a-308n in FIG. 3) can be connected to a similar power bus 110. Each of the lighting devices 104, 106 can be configured to receive a unique command (e.g., a PLI) over the bus 110 (e.g., from the PLI controller 102) to activate their respective features and/or functions. Each of the lighting devices 104, 106 can have a designated identifier (e.g., CLAN ID) to allow the PLI controller 102 to send particular commands to one or more lighting devices 104, 106 (or groups of lighting devices 212 and 214). In some exemplary embodiments, a message can be sent to a group of lighting devices 104, 106. For example, instead of turning on or off an individual lighting device (104), a plurality of devices assigned to a particular group can be turned on or off. This is illustrated in the primary group 212 and the secondary group 214 of FIG. 2. For example, a command can be sent to the down light 204 of FIG. 2. Alternatively, it may be desired to turn on lights located in the mid-section of the watercraft 202. The secondary group 214 includes a group entitled "Mid" with which the down light 204 is associated. Thus, in order to turn on a plurality of lights associated with the mid-section of the watercraft, the secondary group "Mid" and not just the down light 204 might be the target of a message in such an example.

Figure 4:
FIG. 4 illustrates an exemplary structure of a data transmission generated by a controller according to an exemplary embodiment.

FIG. 4 illustrates an exemplary data message 400. In this particular example, there are two start bits, 26 data/control bits, and four error-detection bits. Several message commands and/or parameters can be created, and the CRC bits can be encoded according to the systems and methods described herein (e.g., by using the graphical user interfaces described herein). As such, in some examples, the PLI controller 102 such as is illustrated in FIG. 1 can include an encoder and the lighting devices 104, 106 can include a decoder (luminaire controller 106) for decoding the data that has been encoded by the PLI controller 102.

Figure 5:
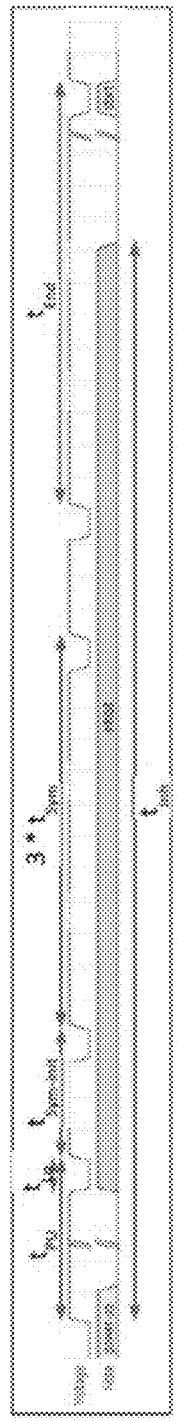
FIG. 5 illustrates a timing diagram of a data transmission generated by a controller according to an exemplary embodiment.
Figure 6:
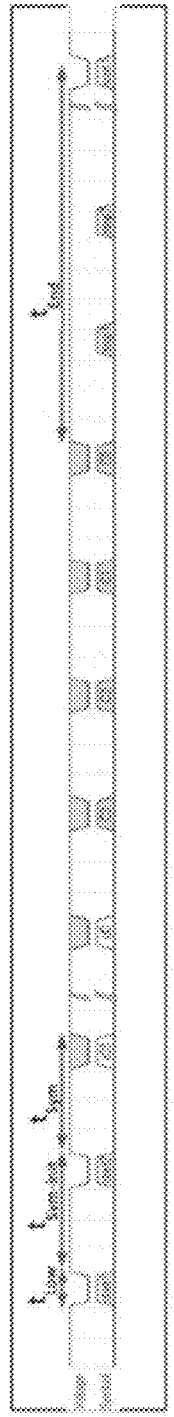
FIG. 6 illustrates another exemplary timing diagram generated by a controller according to an exemplary embodiment.

Additionally, or alternatively, in some examples, there can be a minimum time after power is initially applied to each lighting device 104, 106 before a message can be sent. After power up, the PLI controller 102 can be configured to send a sync command to notify a lighting device that the PLI controller 102 is available (e.g., for sending PLI). Such a signal is illustrated in FIG. 5. The lighting device 104, 106 can be configured to detect a Start-Inhibit command after powering on. Once the light detects the Start-Inhibit command, the lighting device 104, 106 can be configured to be in a stand-by state until it receives a PLI. In some examples, the PLI controller 102 can be configured to send a 16-bit message with a 1 milliseconds (ms) period and 100 microseconds (μs) pulse width, e.g., within 20 ms of the system powering on. As an example, a hexadecimal value to send will be "CCCC". A luminaire controller 106 of the lighting device 104, 106 can be configured to have a given number of chances (e.g., 4 chances) to detect "1100" set of pulses which should be unlikely to occur on a typical dimmer or from any debounce on a typical switch. In some examples, a command sync sequence as described herein should take about 16 ms. The PLI controller 102 can be configured to transmit a PLI 60 ms after it first turns on the lighting device 104, 106. The PLI controller 102 can be configured to control the lighting device 104, 106 according to the following parameters at instances of time: time=0 ms: power on; time=20 ms: Start-Inhibit Transmission of "CCCC" with 1 ms period and 100 μs pulse widths; and time=>60 ms. In some examples, the PLI can have a given period (e.g., 5 ms) and a given pulse width (e.g., about 100 μs). FIG. 6 illustrates a typical PLI timing diagram.

Figure 7A:
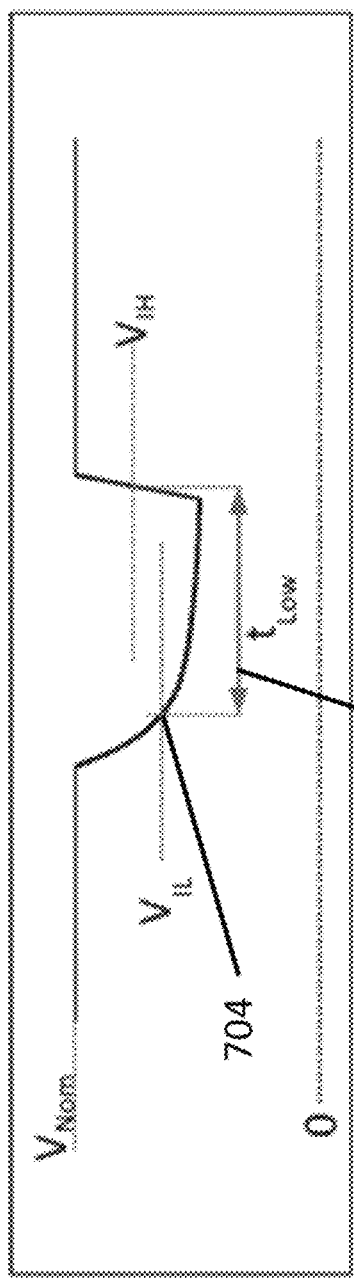
FIGS. 7A-7B illustrates an exemplary waveform output by the controller of an exemplary embodiment.

In some examples, a PLI message that can have 23 consecutive zeros can be transmitted, which can take about 117.76 ms if about a 5.12 ms period is maintained. Therefore, if the luminaire controller 106 of the lighting device 104, 106 detects that it has not received a one (1) bit after 117.76 ms, it can be configured to assume that the next transmitted bit it receives is the start bit to a new message. If a ±10% error rate is used in the accuracy for the period timing, then 130 ms can be used between messages. Referring to FIG. 7A, in exemplary embodiments one or more voltage thresholds (e.g., $V_{1L}$ 704 and $V_{1H}$) below the power line nominal voltage (e.g., FIG. 8) can be used to define a "one" (1) bit. In some exemplary embodiments, a bitwidth (e.g., pulse-width) shown as 702 can be set to about 100 μs and a bit period can be set to about 5.12 ms. In other examples, the bit width can be greater than or less than about the 100 μs (see, e.g., FIG. 9). If the pulse is too long (>130 μs) it can become noticeable to someone viewing the lighting device 104, 106 as there may be a slight flicker. In some examples, the lighting device 104, 106 can be configured to detect a "one" (1) bit when the power on the line drops below a voltage threshold 704 set by the luminaire controller 106 and ends when it raises above a second threshold, e.g., $V_{1H}$. The luminaire controller 106 can include a digital-to-analog controller (DAC). The DAC can be configured to compare the input voltage to a digitized reference voltage.

Figure 7B:
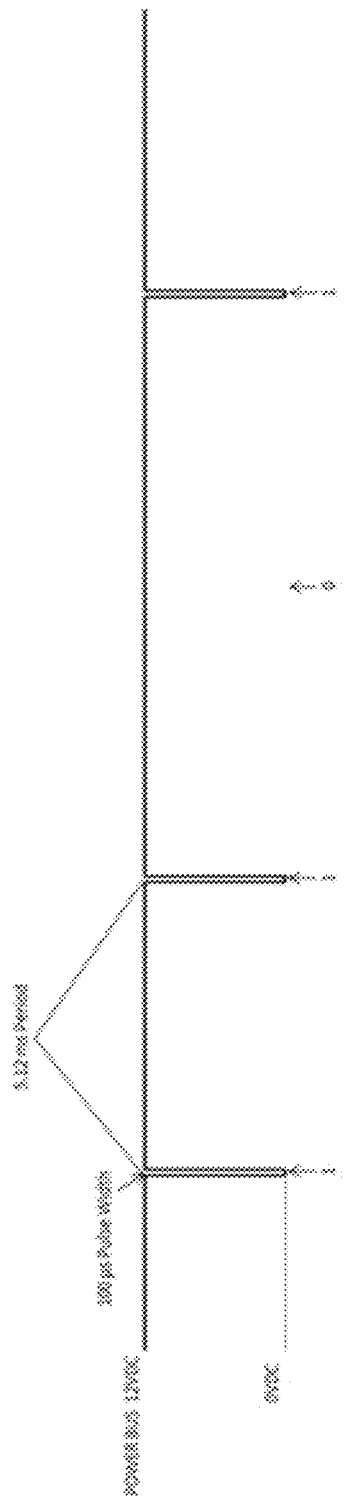
Figure 13:
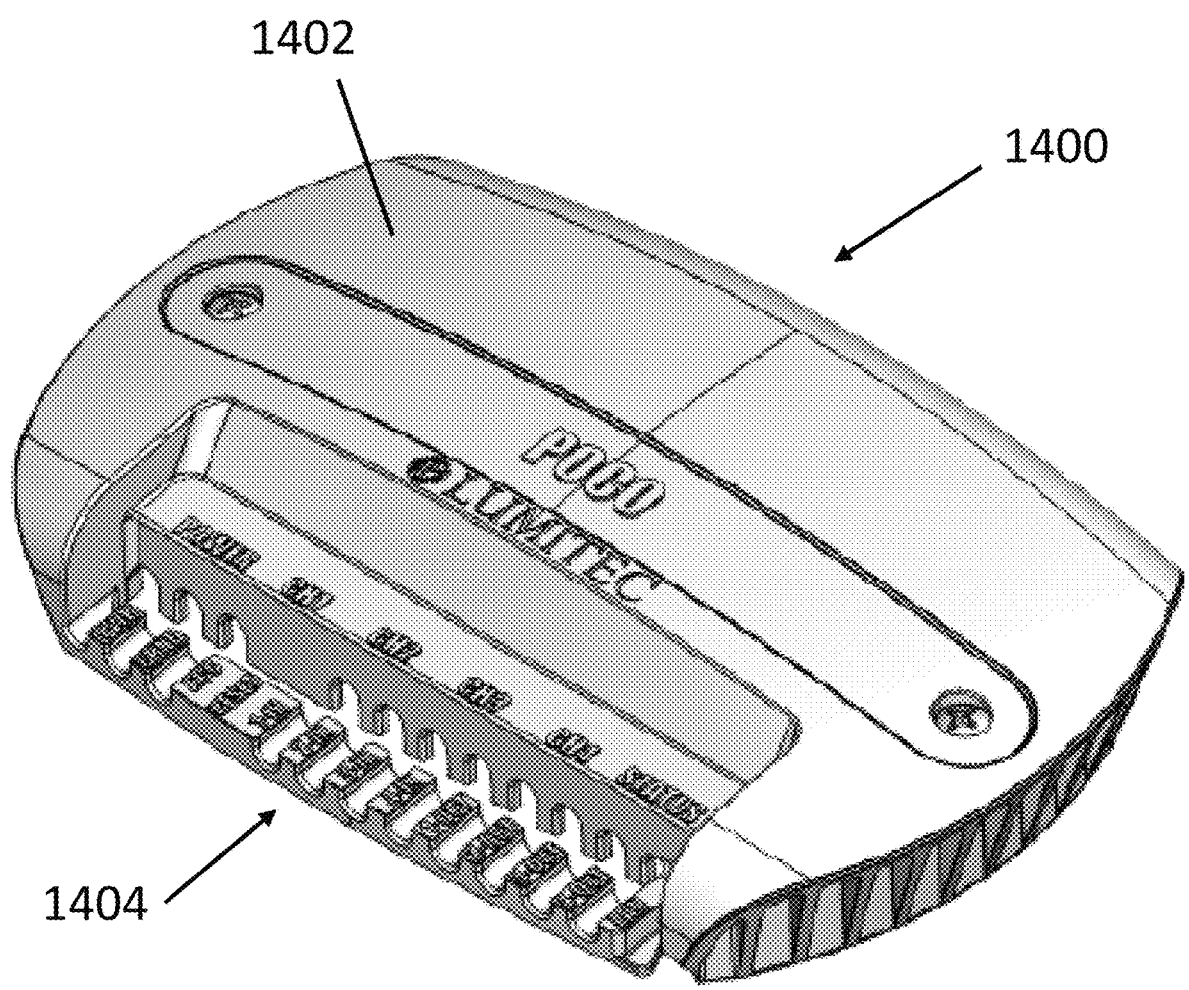
FIGS. 13-14 illustrate perspective views of an exemplary lighting control device.
Figure 14:
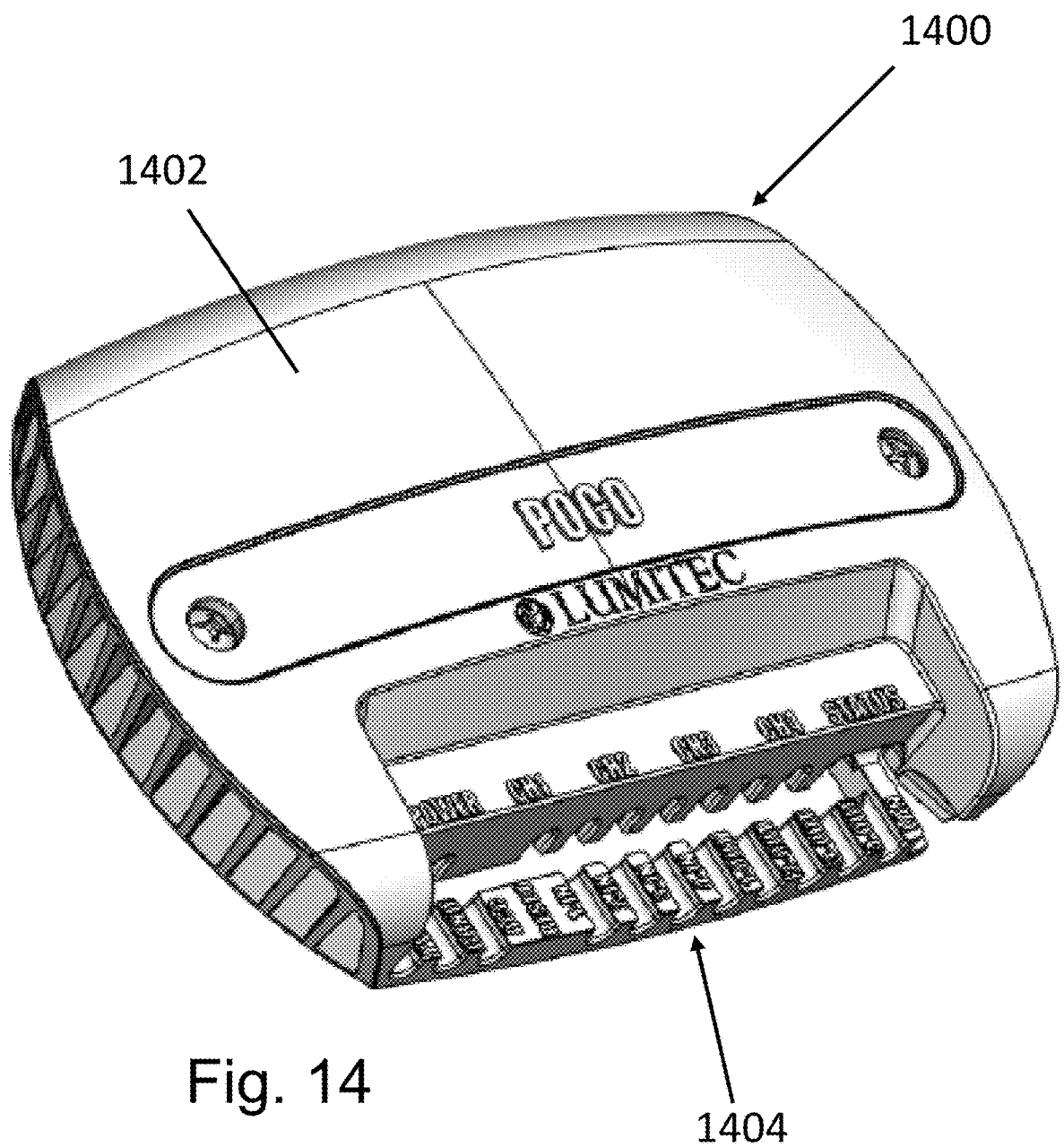
Figure 15:
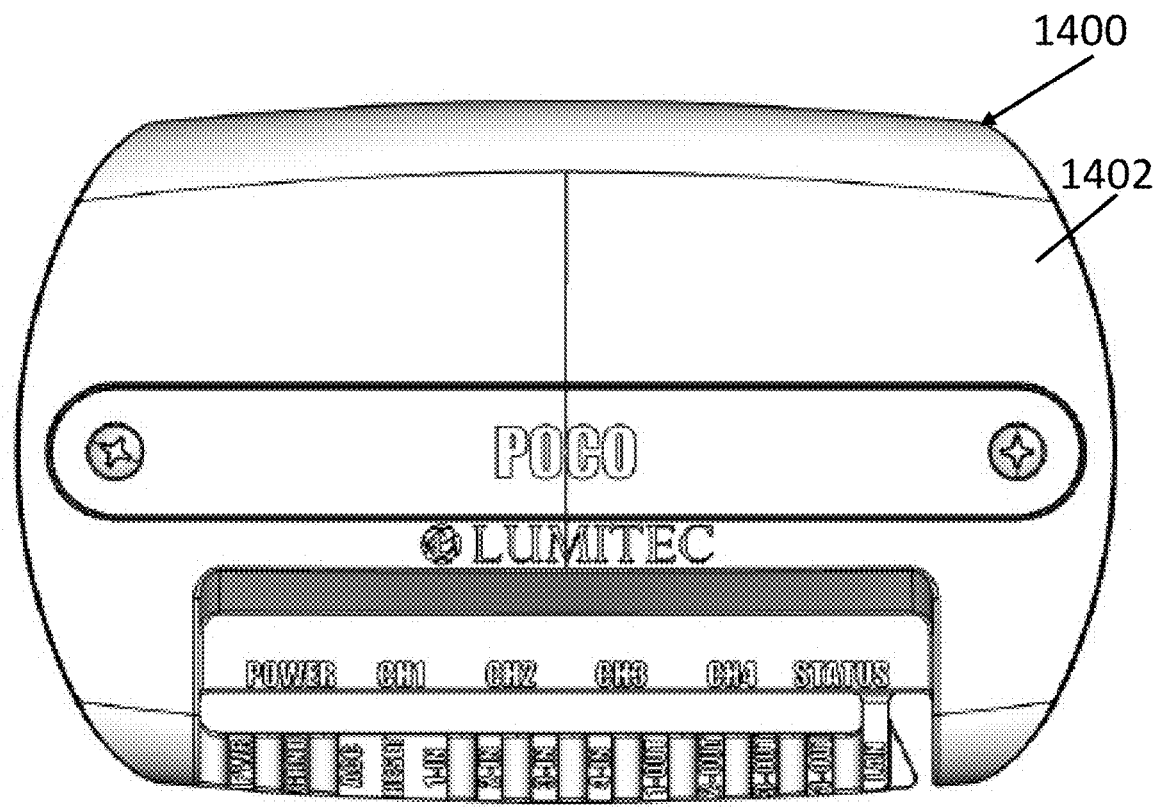
FIGS. 15-18 illustrated top, front, and bottom views of an exemplary lighting control device.
Figure 16A:
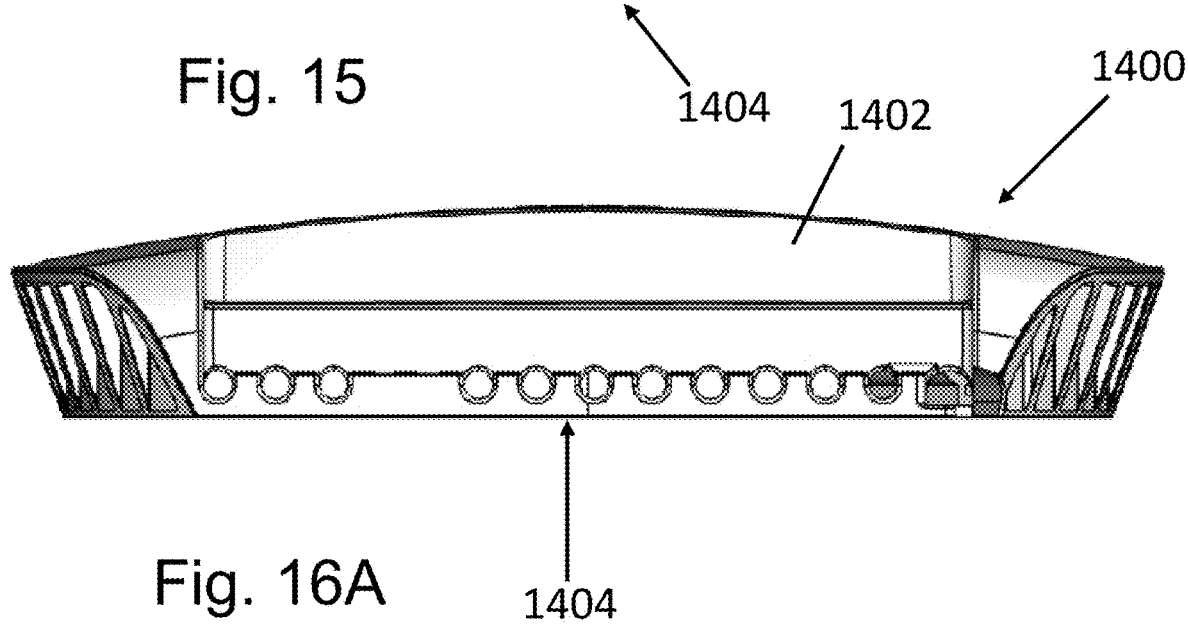
Figure 16B:
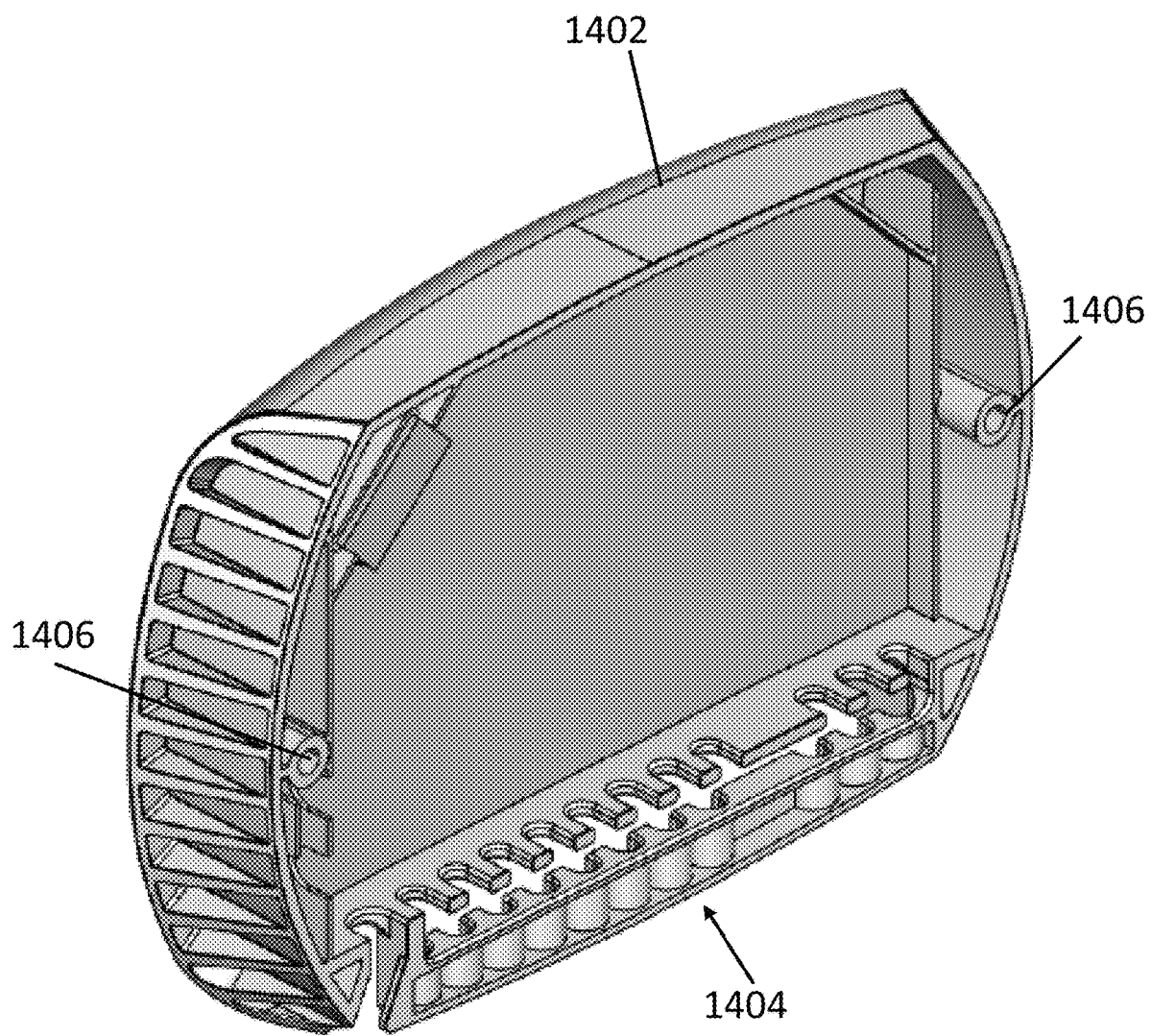
Figure 17:
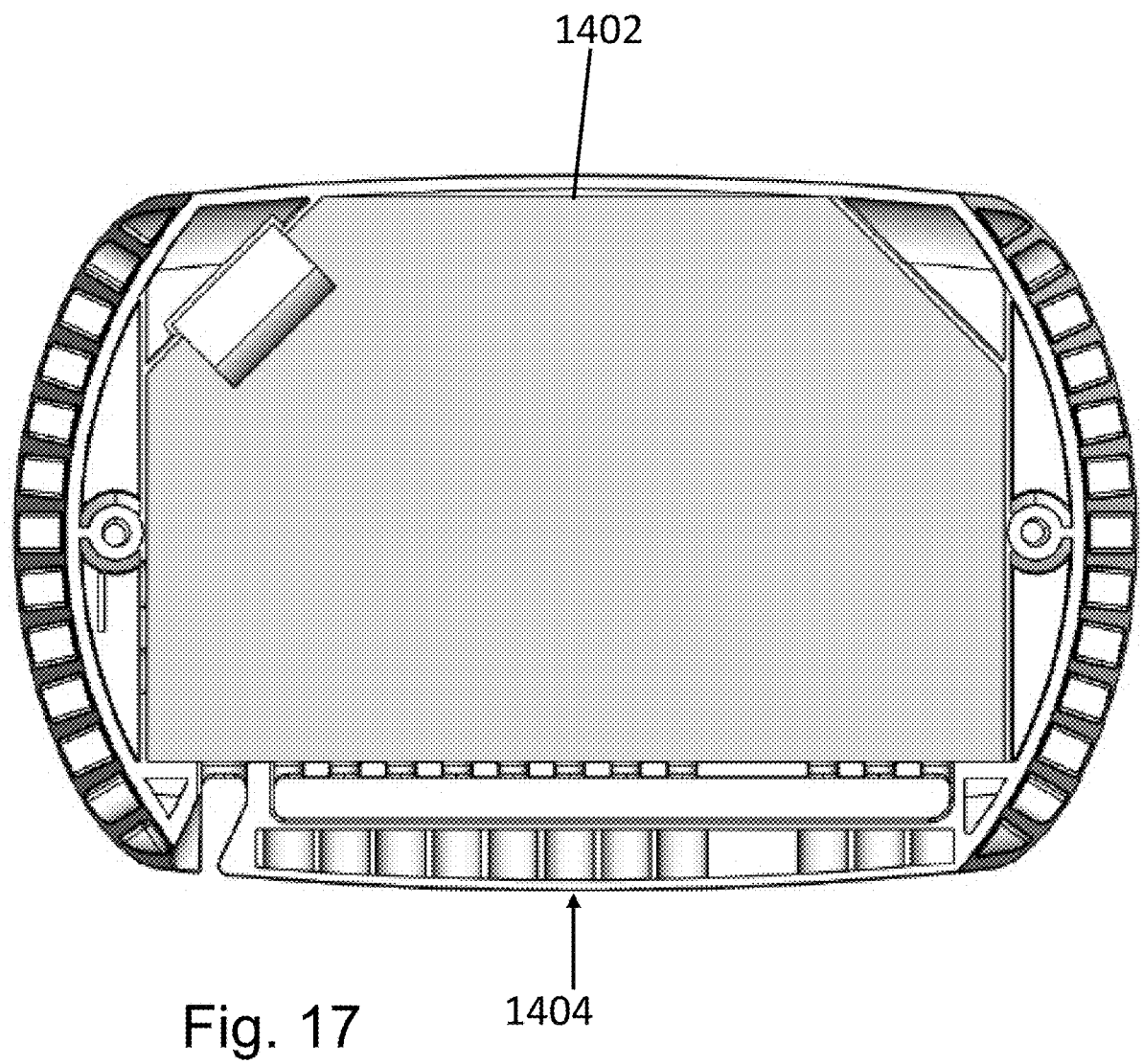
Figure 18:
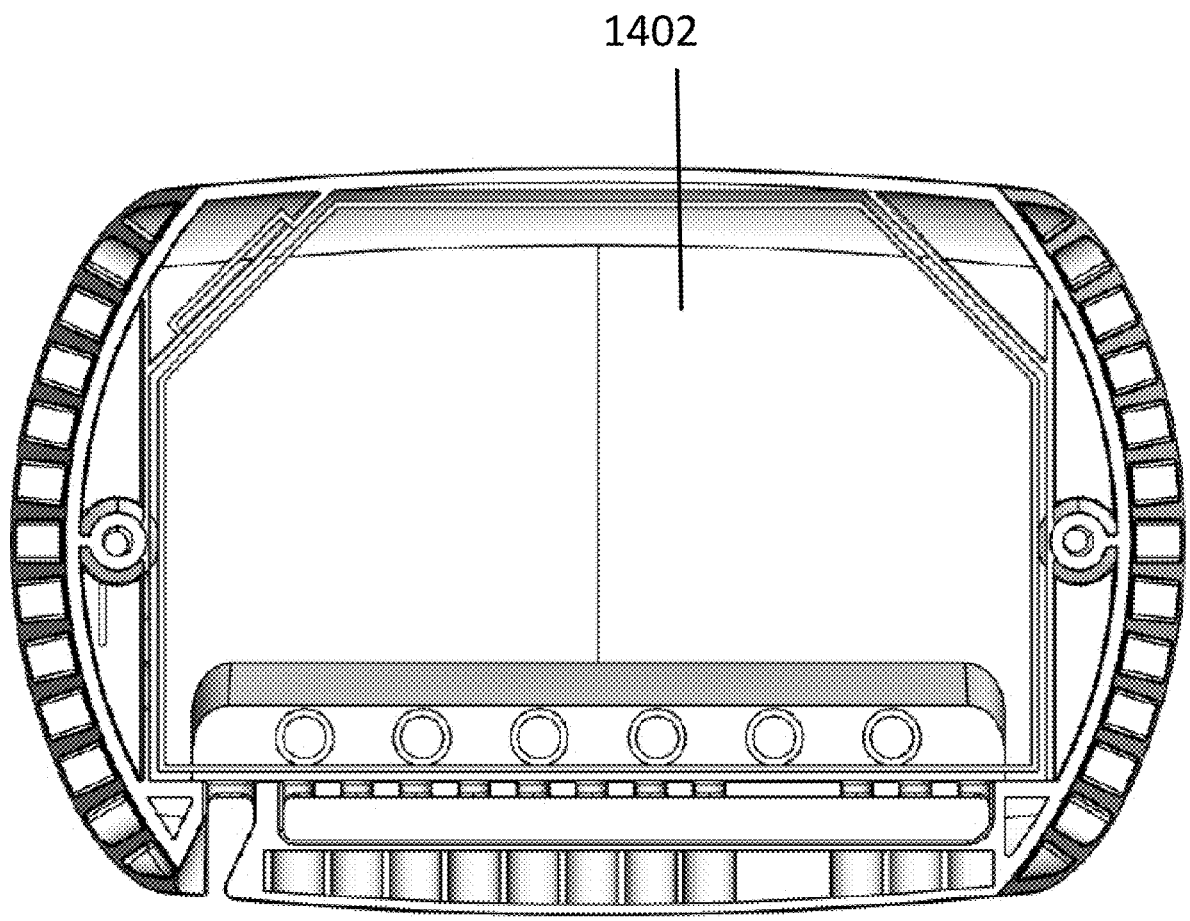

For the following discussion, please reference the tables of FIGS. 8 and 9. In some examples, the PLI controller 102 can be configured to generate a given power line instruction according to FIGS. 8-9. In some other examples, the PLI controller 102 can be configured to generate a given power line instruction according to FIG. 11. The given power line instruction can be a 32-bit instruction. The PLI command can have the following message structure:

Each bit of data (e.g., the given power line instruction) can be sent across corresponding power wires to the lighting device 104, 106. Transmission of data can be sent as if the light is already powered on. The transmitted message (or data) can include a CRC-4Code with 2 start bits. For example, the lighting device 104, 106 can be driven at 12 volts direct-current (VDC). A data transmission can be sent through the power bus to the lighting device. ZERO (0) bits can keep the line high at 12 VDC. One (1) bits can cause the line to be momentarily driven to 0 VDC for 100 μs, as illustrated in the exemplary voltage-timing diagram of FIG. 7B. In the example of FIG. 7B, the period can be about 5 ms for low speed or about 1 ms for high speed and the pulse width can be about 0.1 ms. A time to complete one message can be calculated by multiplying a given period and a number of bits in a message. In the example of FIG. 7B, given a 32-bit message, a time to complete one message can be calculated as follows: 5 ms*32 bits=160 ms for low speed or 32 ms for high speed.

In some examples, the lighting device 104, 106 is switched to an off-state, or a state different than a PLI ready state. To switch the lighting device 104, 106 to the PLI ready state (or mode), the PLI controller 102 can be configured to transmit a PLI-Inhibit sequence. The luminaire controller 106 can receive the PLI message and a comparator at the luminaire controller 106 can trip and run a routine where a timer begins. This can be considered as the first START BIT and is a 1 (e.g., 1XXXXXXXXXXXXXXXXXXXXXXXXXXXXXXX). The timer can be configured to run for a given time (e.g., about 174.863 ms). The timer on comparator can be configured to monitor for a BIT to be received every 5 ms. In some examples, such a window can allow for ±1 ms. If the comparator does not trip, then it can be assumed the bit is a 0. If the comparator does trip, the bit can be assumed to be a 1. At the end of the timer, an OnCounterRestart interrupt can occur. At this time, the 32-bit message received can be sent to a LumitecPLl (globals.data_transmission) function executing on the lighting device 104, 106 for processing.

In some examples, the 32-bit message can be processed according to a CRC-4 error detection. The lighting device 104, 106 can be configured to pull out the 26 data bits that contain the PLI data. The luminaire controller 106 can be configured to retrieve the CLAN ID (address of light being called). The luminaire controller 106 can be configured to retrieve COMMAND data. Please refer to FIG. 10 for details with regard to cyclic redundancy error correction.

Figure 11:
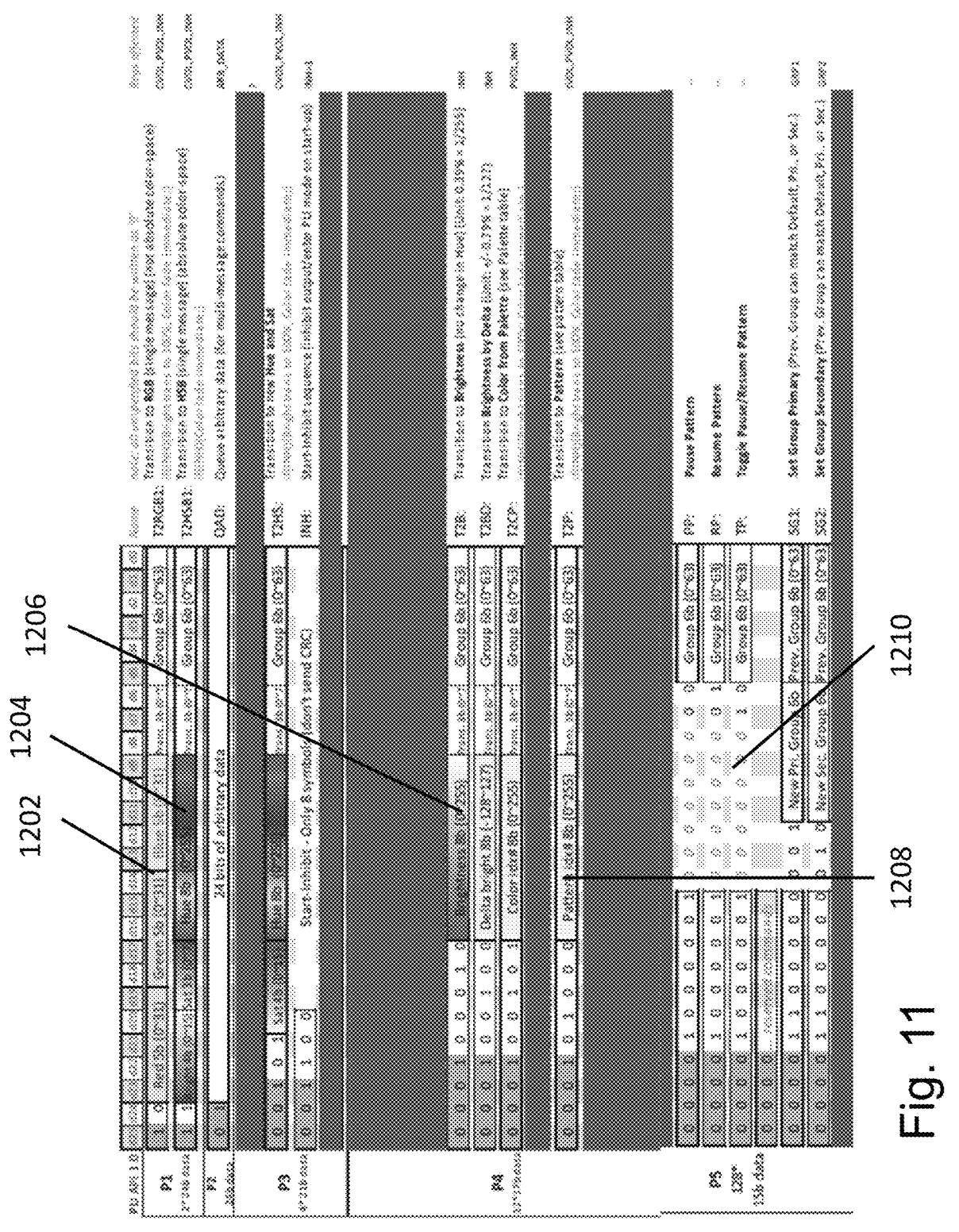
Figure 12:
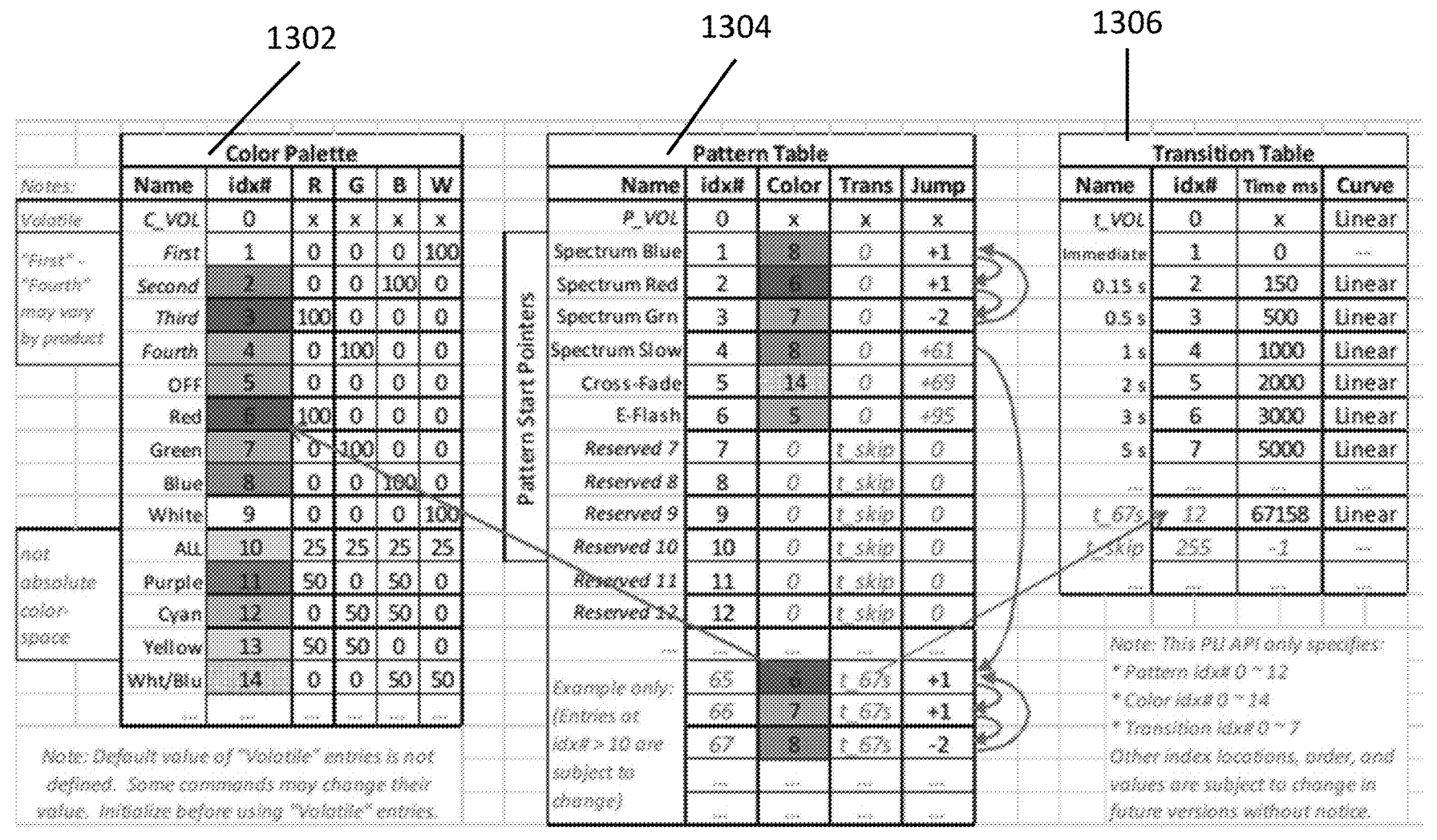

FIG. 11 provides example messages as well as indications of the result with regard to color 1202, hues 1204, brightness levels 1206, patterns 1208 and pattern "play/pause" commands 1210. FIG. 12 illustrates command data for color 1302, pattern 1304, and transitions 1306. Once command data is received, the PLI controller 102 checks to see how to interpret the remaining bits based on the command (e.g., COLOR command, COLOR+BRIGHTNESS command, BRIGHTNESS command, SYNC'D FLASHERs command, LED OFF COMMAND, etc.). The colors can be read by the luminaire controller 106 as White (WHT), Red (RED), and Blue (BLU). Green (GRN) can be calculated by the difference between 100% and the sum of WHT, RED and BLU. In some examples, a brightness level can be interpreted, dim up or down commands can be defined, sync pattern information can be provided, and spectrum and spectrum lock commands can be used based on sync flasher patterns. Additionally, luminaire controller 106 can set LED parameters (e.g., color, brightness, color levels, etc.)

Figure 19:
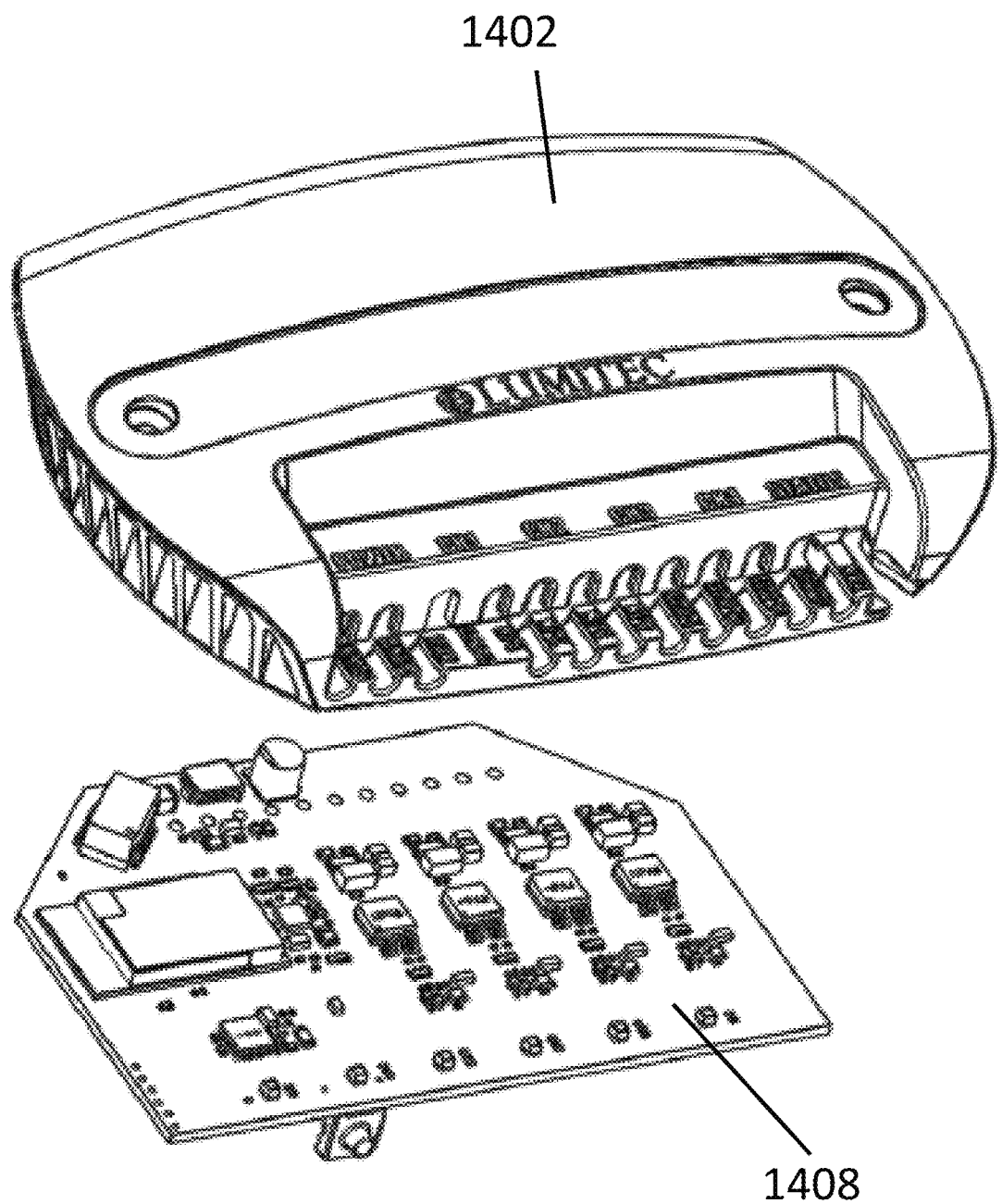
FIG. 19 illustrates an exploded perspective view of an exemplary lighting control device.

FIGS. 13-18 illustrate the physical arrangement of an exemplary lighting control device 1400. As illustrated in the figures, the lighting control device 1400 comprises a cover 1402 and a wire management tray 1404. As is illustrated in the bottom right perspective view, the cover 1402 includes screw holes 1406 for securing a bottom cover (not illustrated) and a circuit board 1408 shown in the exploded view of FIG. 19. In certain exemplary embodiments, the lighting control device 1400 can correspond to the PLI controller 102, as illustrated in FIG. 1. In other exemplary embodiments, the lighting control device 1400 can include the PLI controller 102, as illustrated in FIG. 1. The lighting control device 1400 can be configured according to the systems and methods described herein to control one or more lighting devices. In some exemplary embodiments, the one or more lighting devices can correspond to the lighting devices 104, 106, as illustrated in FIG. 1.

Figure 20:
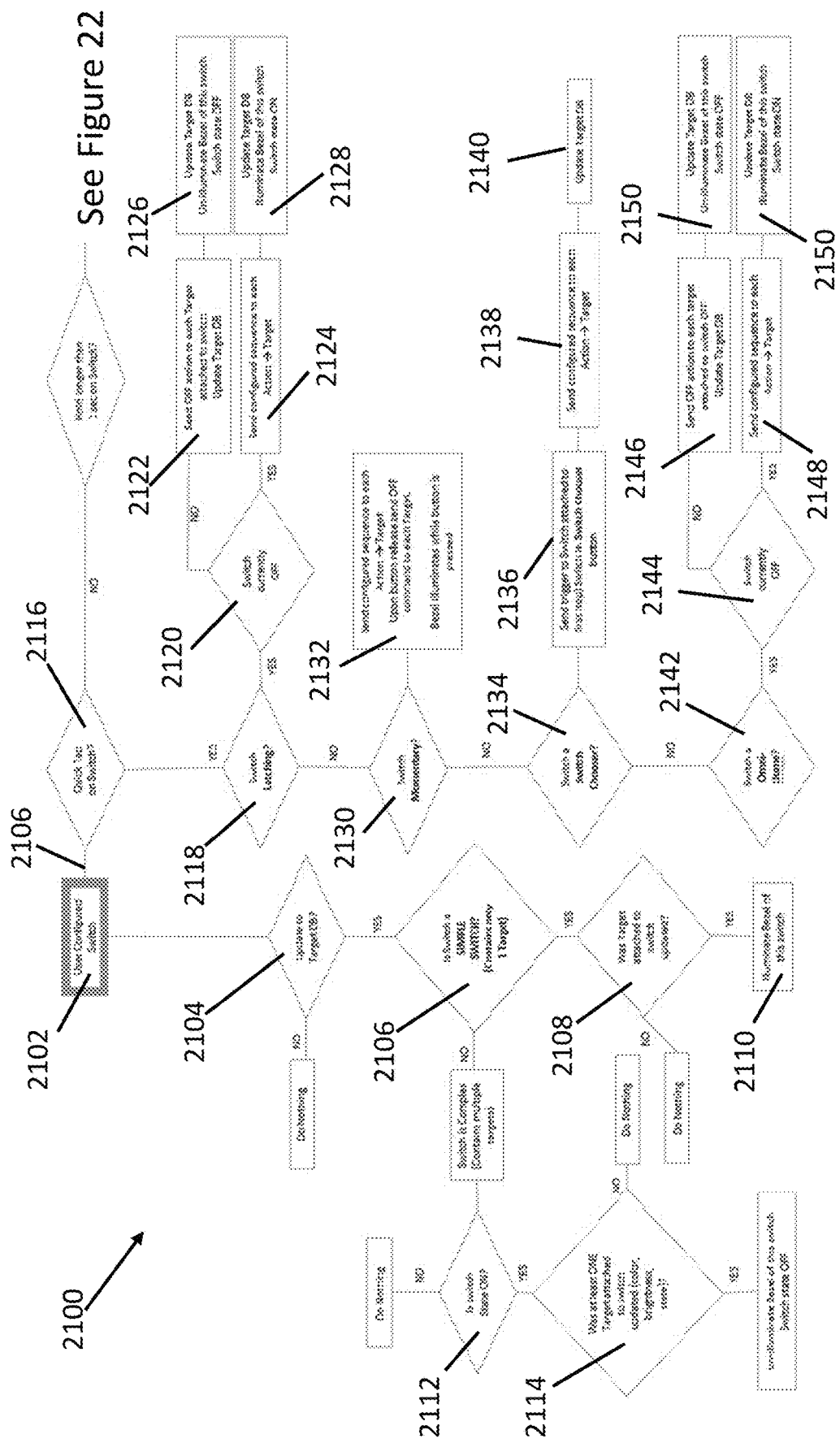
FIG. 20 depicts an example of a flow diagram illustrating an exemplary method according the systems and methods described herein.
Figure 21:
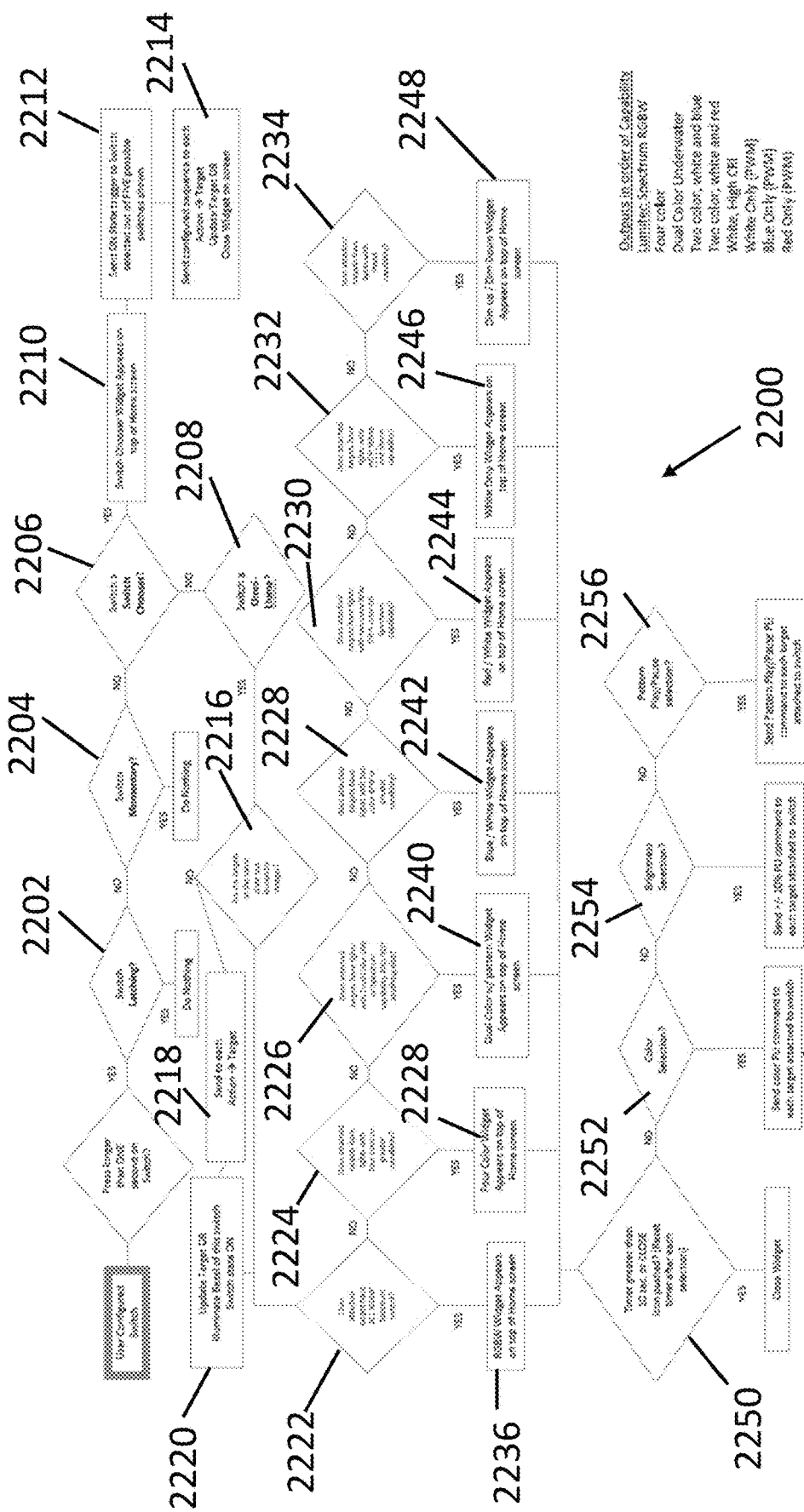
FIG. 21 depicts an example of a flow diagram illustrating an exemplary method according the systems and methods described herein.

In order to simplify explanation, the method of FIGS. 20-21 is shown and described as executing serially. However, it is to be understood and appreciated that such methods are not limited by the illustrated order, as some aspects could, in other examples, occur in different orders and/or concurrently with other aspects from that shown and described herein. Moreover, not all illustrated features may be required to implement the method of FIGS. 20-21. The method or portions thereof can be implemented as instructions stored in one or more non-transitory storage media as well as be executed by a processing resource (e.g., the PLI controller 102, as illustrated in FIG. 1). FIG. 20 depicts an example of a flow diagram illustrating an exemplary method 2100 according the systems and methods described herein. FIG. 21 depicts an example of a flow diagram illustrating an exemplary method 2200 according the systems and methods described herein.

Starting at point 2102 of FIG. 20 which illustrates the interaction between a user interface displayed on a computer display and a user, path 2104 represents a case in which the icon representing a virtual switch responds to updates made when a user changes the state of any configured switch. The target device database tracks the on/off state of the configured light groups and when an update occurs a determination for every switch is then made in step 2106 depending upon whether the switch is a simple switch or a complex switch. In the case of the switch being a simple switch, where the switch represents only one target action. In step 2108, if the target (configured device or set of devices associated with a light group) associated with the switch is updated, a bezel associated with the display of the virtual switch is illuminated in step 2110. If in step 2106, it is determined that the switch is a complex switch (which is defined as being associated with multiple target actions), the switch is currently in an "on" state 2112, and at least one target is updated, then it is determined that the bezel should be "off" in step 2114. Path 2106 represents actions determined by the characteristics of the virtual switch. At 2116, a determination is made as to whether the user has pressed the switch with a quick press or a long press to bring up the $2^{nd}$ stage widget. If the virtual switch is depressed for an extend time (1 second in the illustrated embodiment), the process continues as illustrated in FIG. 21. If the switch is of the tap type, it is determined if the virtual switch is latching in step 2118, a determination is made as to the current state of the switch (on or off) in step 2120 whereupon an off action is provided to the target in step 2122 or an on action is provided to the target in step 2124 as appropriate. The target is updated, and the bezel turned off in step 2126 or on in step 2128 in order to represent the resultant state of the target. If the switch is a momentary switch as determined in step 2130, a command sequence is provided to the target and the bezel is illuminated in step 2132 while the switch remains activated. If the virtual switch is configured as a switch chooser, a trigger is sent to the first switch in a switch chooser button in step 2136 and a configured command sequence is provided to the target in steps 2138 and 2140. If the virtual switch represents an Omni-Llume 2142, which means that the switch has been configured to have additional control functionality through the sending of PLI commands for color and intensity changes or additional control by adjusting the duty cycle of a pulse width modulated powered light. Omni-Llume switch types open second stage widgets with a long press and hold to enable this additional control. a determination is made as to the current state of the switch (on or off) in step 2144 whereupon an "off" action is provided to the target in step 2146 or an "on" action is provided to the target or actions in step 2148 as appropriate. The target device is updated, and the bezel turned off in step 2150 or on in step 2152 in order to represent the resultant state of the target. In exemplary embodiments, there are single stage virtual switches and 2 stage virtual switches. The single stage does not do anything different than a normal momentary or latching switch. If you press and hold a single stage switch no additional widget pops up. There are two types of 2 stage switches, Omni-Llume and switch chooser. If you press and hold a second stage switch a popup widget "window" will be displayed, as explained herein. For Omni-Llume switches the 2nd stage widget allows you to modify the light output from what was the default color and intensity activated with the quick press of the switch (the 1st stage portion). The Omni-Llume widget allows you to modify the light output of PLI lights for both color and intensity and just intensity on standard non-PLI lights that have the capability of PWM dimming control. Some embodiments have a widget that displays a spectrum wheel, as shown; sometimes it will display 4 colors or 2 color or something else.

Referring to FIG. 21 which continues from step 2116 of FIG. 20, in steps 2202, 2204, 2206, and 2208, a determination is made as to whether a long press (longer than 1 second in the described exemplary embodiment) is applicable to the virtual switch type. As is shown, latching switches 2202 and momentary switches 2204 do not recognize a long press. However, in step 2206, if a virtual switch is configured as a switch chooser, a long press results in the display of a switch chooser widget in step 2210 whereupon a user can select one of five selections in step 2212 resulting in a sequence of commands being sent to the target in step 2214. If the virtual switch is determined to be an Omni-Llume in step 2208, the state of the targets are determined in step 2216. If the state of the targets does not correspond to the last known state recorded by the Omni-Llume widget, the actions are sent to the targets in step 2218 and the bezel illumination is set to "on" in step 2220. If the target does correspond to the last known state recorded by the Omni-Llume widget, the capability of the target is determined in steps 2222-2234. Depending upon the capability of the target, various widgets are displayed as detailed in steps 2236-2248. Step 2250 determines if a user has not made a selection from a displayed widget within ten seconds (in an exemplary embodiment) or a "Close" control icon is selected, if so, the widget displayed by steps 2236-2248 is closed. If a selection is made, step 2252 determines if a color selection is made and in step 2258 sends a color PLI command to each target attached to or electronically associated with the switch. Step 2254 determines if a brightness selection is made and in step 2260 sends a brightness PLI command (+/−10% in an exemplary embodiment) to each target attached to or electronically associated with the switch. Step 2256 determines if a pattern play or pause selection is made and in step 2262 sends a pattern play or pause PLI command to each target attached to or electronically associated with the switch.

Figure 22:
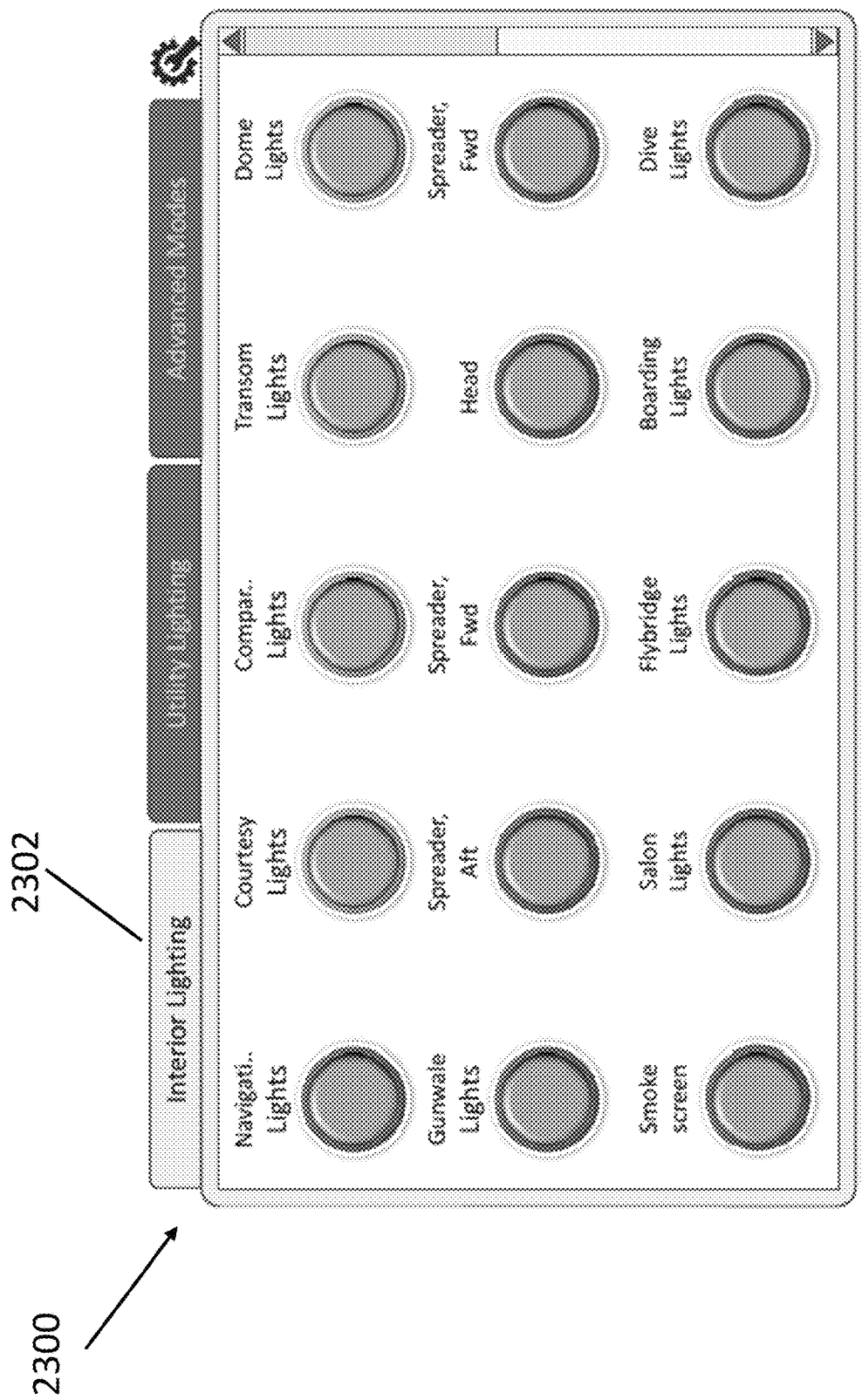
FIGS. 22-23 illustrate exemplary simulated user interfaces according to the systems and methods described herein.
Figure 23:
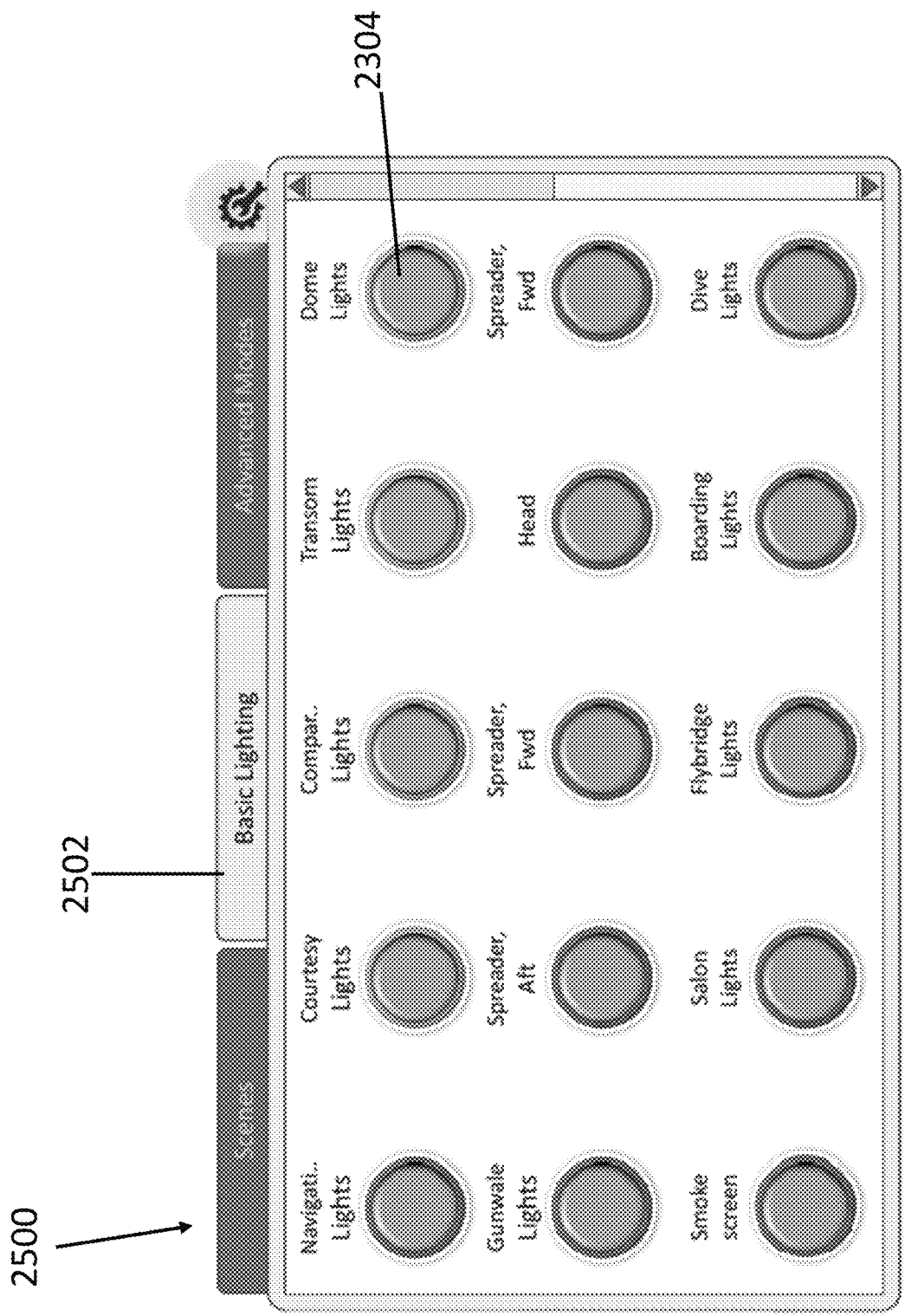
Figure 25:
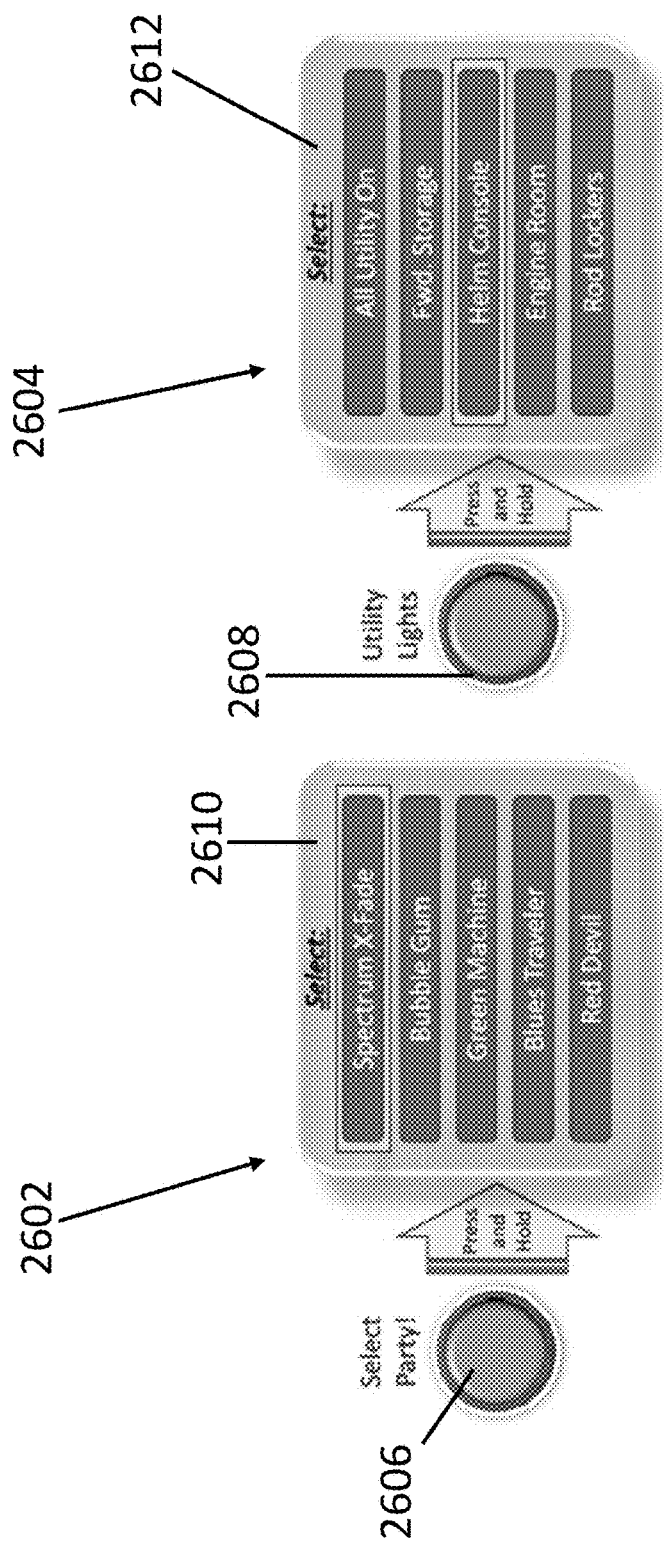
FIGS. 25-27 show exemplary widgets used by a graphical user interface according to an exemplary embodiment.
Figure 26:
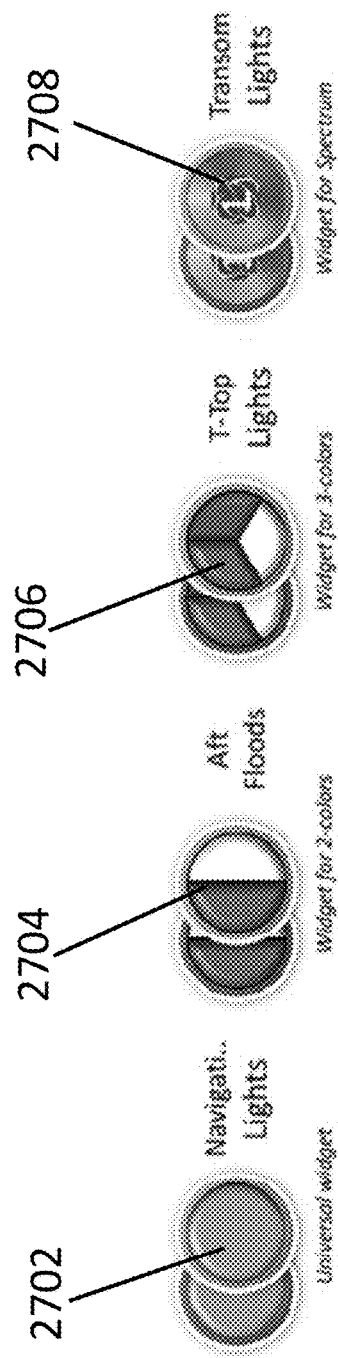

FIGS. 22-36 illustrate various user interface screens that perform according to the steps described in FIGS. 20-21. FIG. 22 shows a user interface screen 2300 displaying virtual switches for lighting that are identified as interior lighting 2302. For example, a virtual switch for dome lights 2304 is positioned in the upper right of the user interface screen 2300. FIG. 23 illustrates a user interface screen 2400 displaying commands that are identified as basic lighting 2502. These two screens 2300 and 2400 illustrated that virtual switches can be assigned to multiple groupings as the virtual switch for dome lights 2302 is also displayed on the basic lighting screen 2400. As illustrated in the interior lighting display 2500 of FIG. 24, a long press of the Gunwale Lights virtual switch 2502 as described in FIGS. 20-21 results in the display of a pop-up icon 2504. As illustrated, the pop-up icon 2504 can present a user with a play/pause control 2506, an increase/decrease control 2508, a selection wheel 2510, and a close button 2512. Using such a pop-up icon 2504, a user can modify the color or display characteristics of the light associated with the selected virtual switch (illustrated as the Gunwale Lights virtual switch 2502). FIG. 25 illustrates two exemplary embodiments of a switch chooser function 2602 and 2604. As shown, a long press of a virtual switch 2606 and 2608 results in the display of a pop-up 2610 and 2612 that presents the user with additional selections. A user can then select one of these additional selections to perform a desired action related to the virtual switch 2606 or 2608. In addition to the pop-ups 2610 and 2612, other pop-ups may be displayed. Examples of such pop-ups are illustrated in FIG. 26. For example, widgets may include a universal widget 2702 (e.g., a generic icon or a placeholder icon used until a color is selected), two-color 2704 and three-color 2706 widgets that allow a user to select between colors or a spectrum widget 2708 that permits a user to select a color along a spectrum of colors reproducible by the lamp being controlled by the widget 2708.

Figure 24:
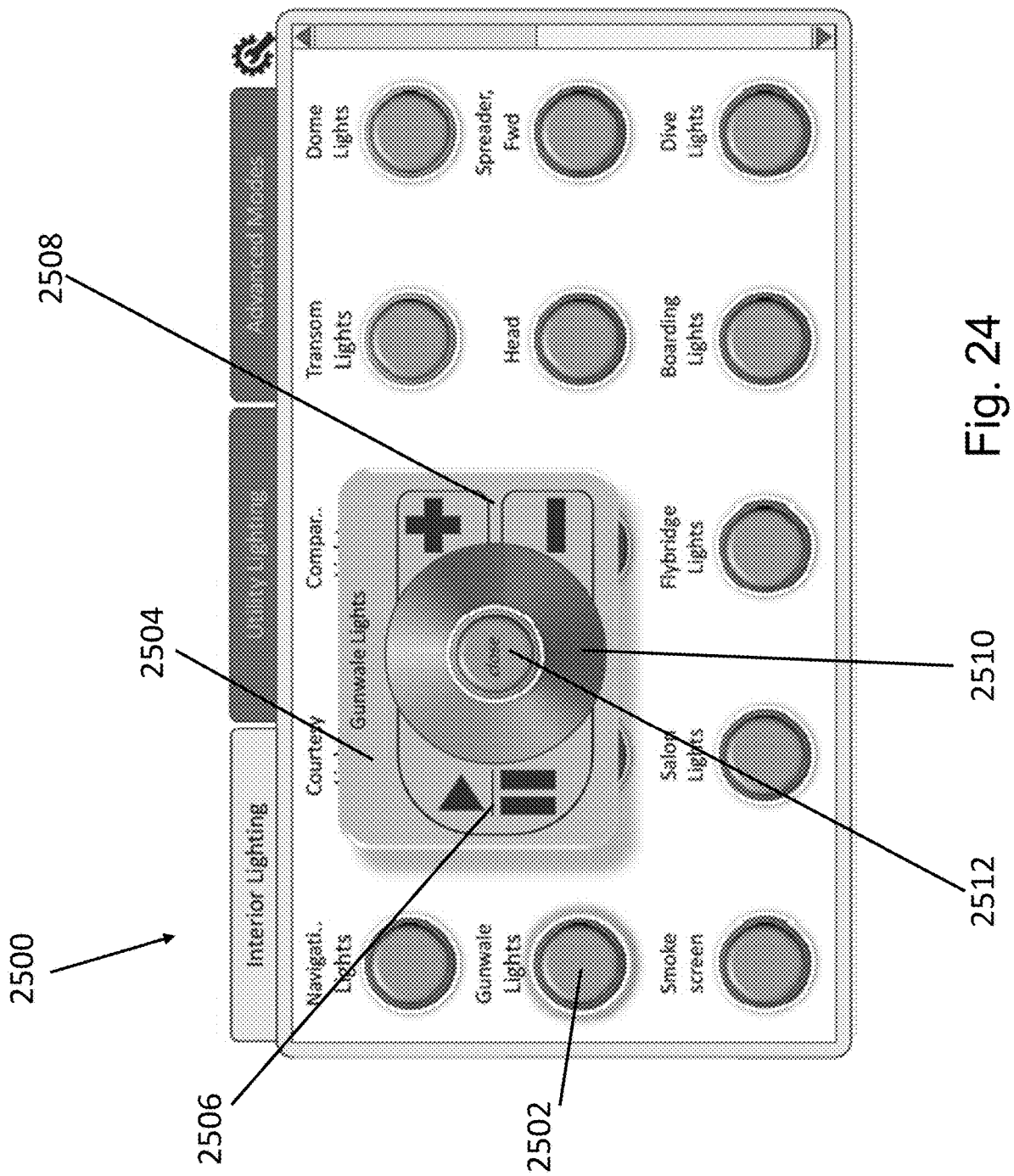
FIG. 24 illustrates interactions with a graphical user interface according to an exemplary embodiment.
Figure 27:
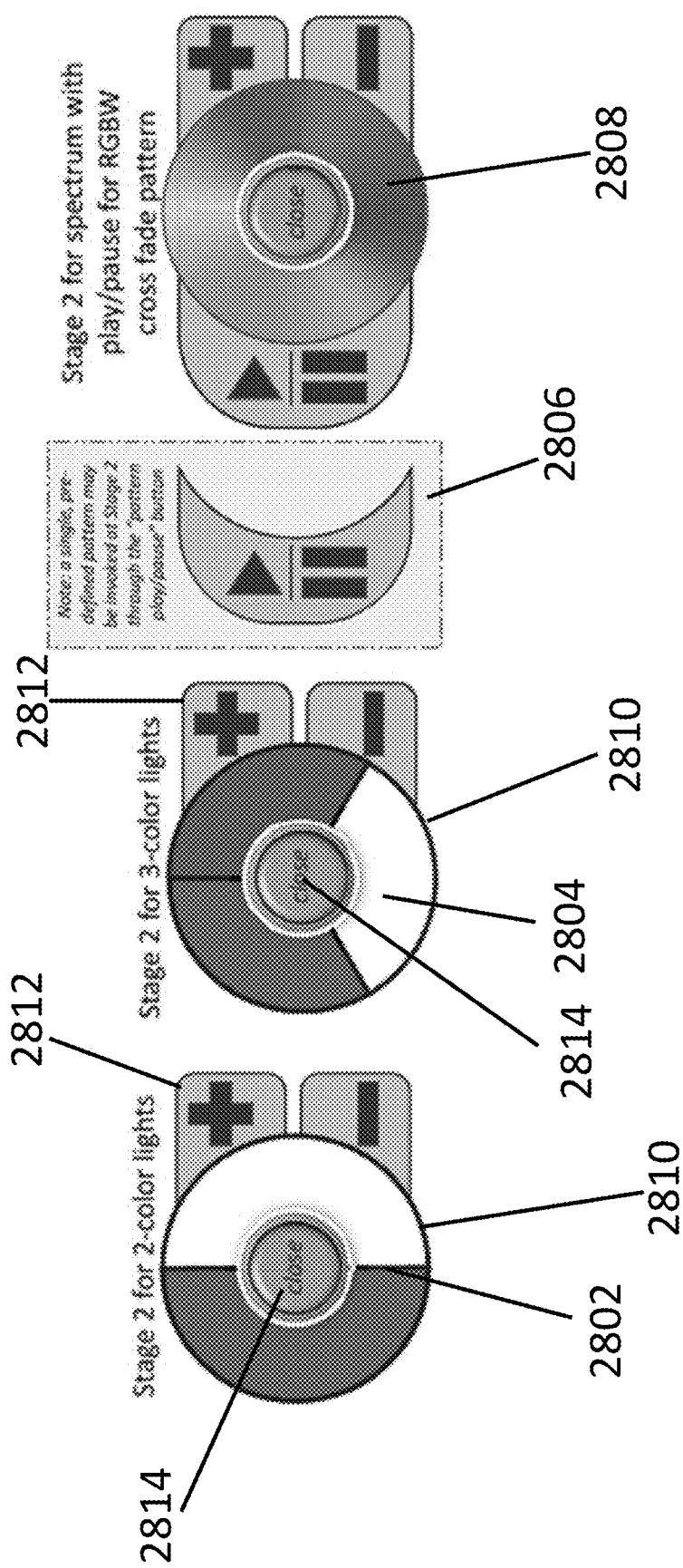

FIG. 27 illustrate exemplary embodiments of the pop-up 2504 of FIG. 24. As illustrated at 2802 and 2804, two- and three-color lights may be controlled via the pop-up 2802 or 2804. These pop-ups comprise a selection portion 2810, an up/down control 2812, and a close button 2804 that closes the pop-up when selected. In certain exemplary embodiments, a light may have a predefined series of actions associated with the light. For example, the light may slowly increase in brightness until maximum brightness is reached and then slowly decrease in brightness, the process being repeated until cancelled by the user. 2806 represents a "play/pause" control that can be included in pop-ups to which predefined actions are associated. An example of such a pop-up is illustrated at 2808 where the play pause control 2806 is displayed with a spectrum widget.

Figure 28:
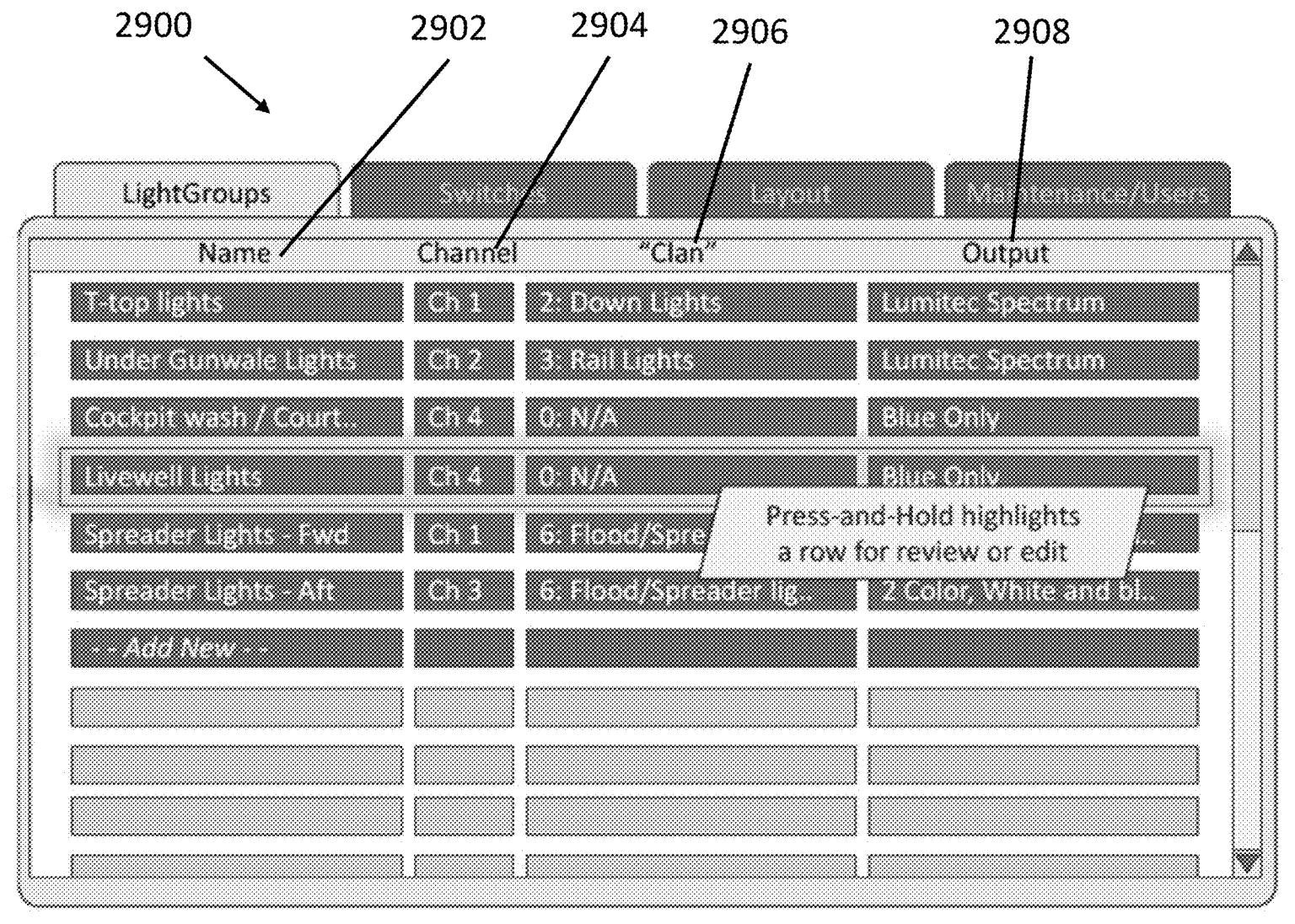
Figure 29:
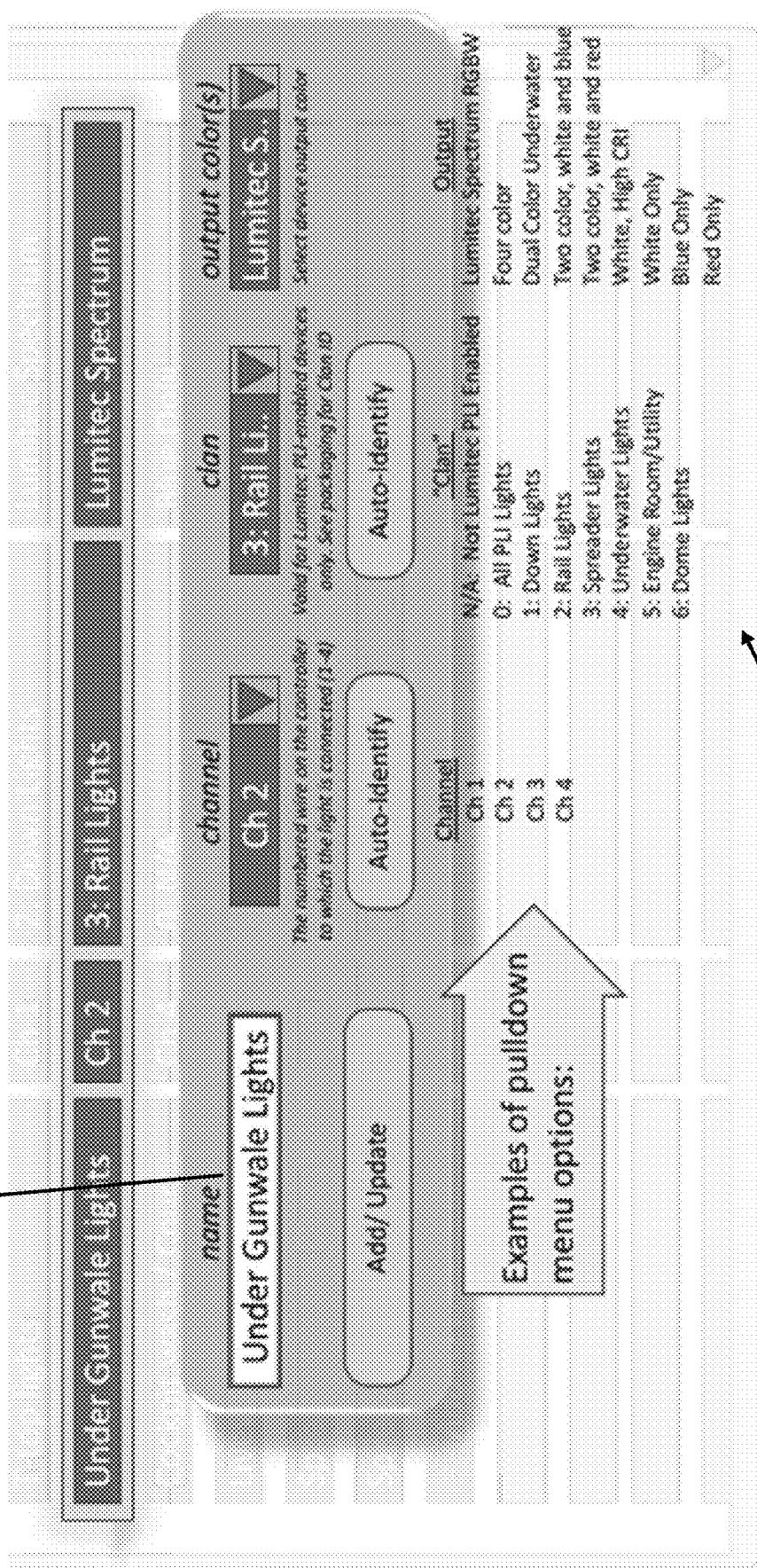
FIGS. 29 illustrate the process of creating or modifying a light group according to an exemplary embodiment.
Figure 30:
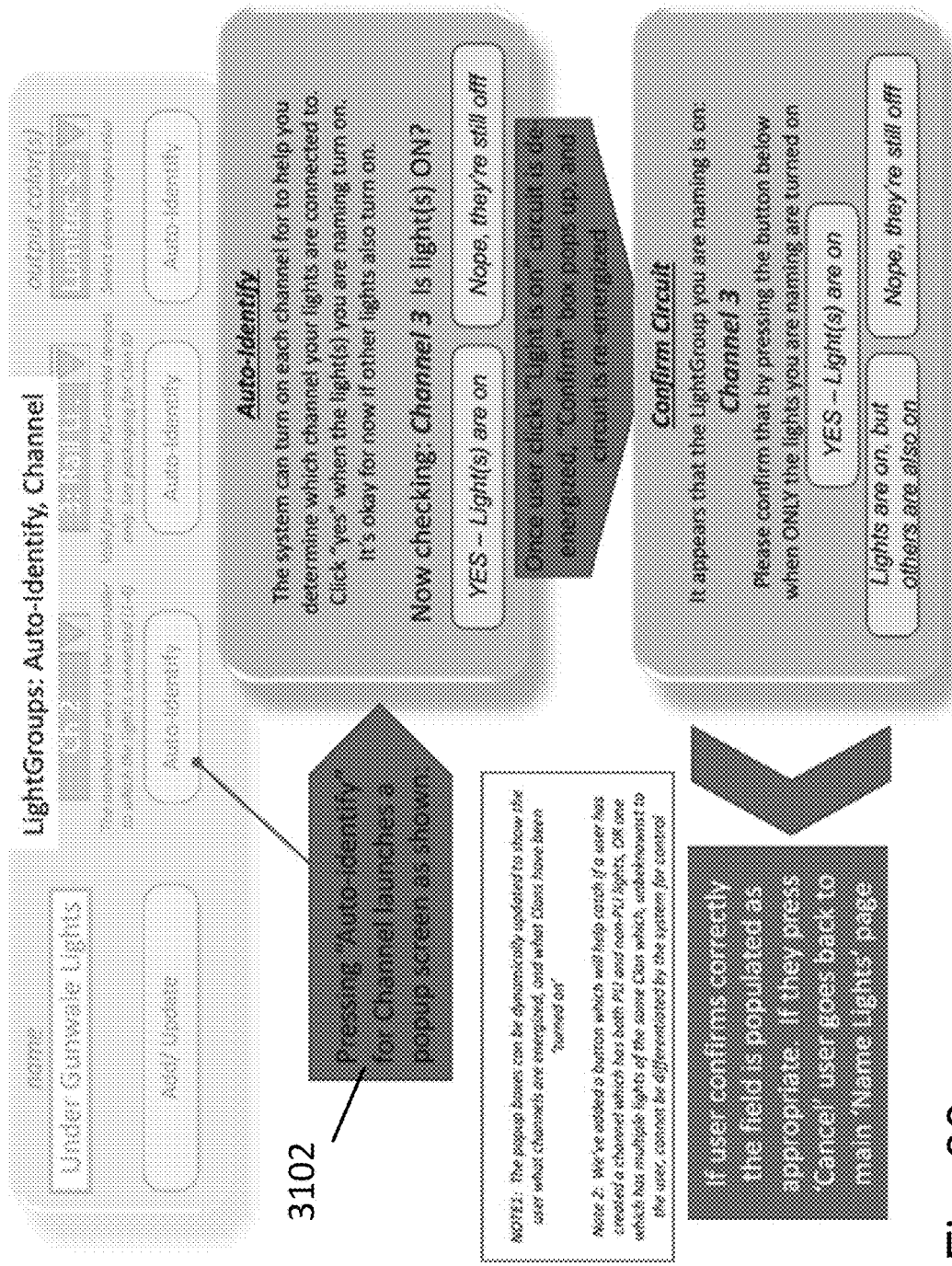
FIGS. 30-35 illustrate the process of creating or modifying the characteristics of a virtual switch according to an exemplary embodiment.
Figure 31:
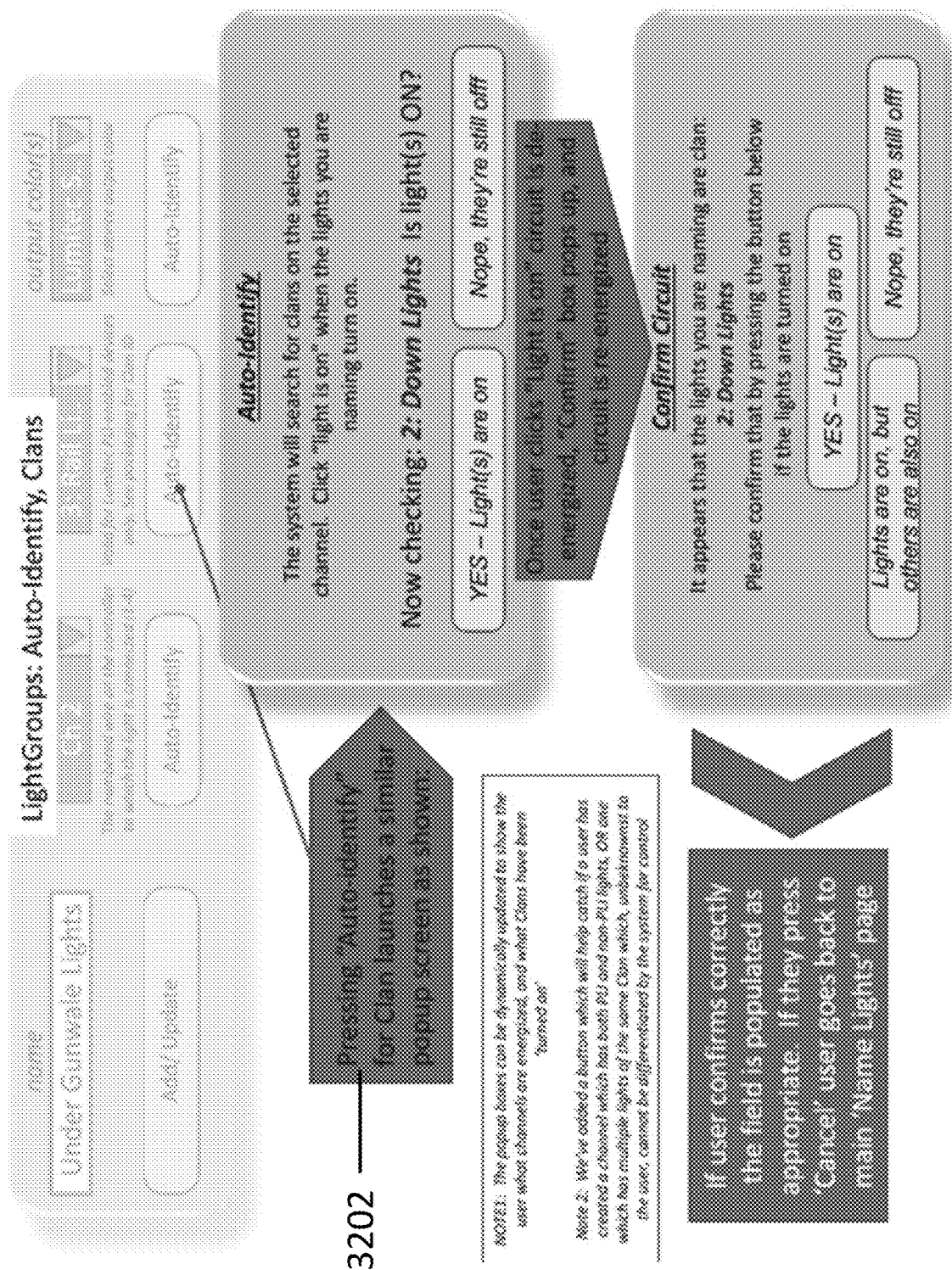

FIGS. 28-36 illustrate user configuration and maintenance functions that can be performed using exemplary embodiments. FIG. 28 illustrates a light grouping interface 2900. As shown, individual lights are displayed and comprise characteristics such as a name assigned to the light 2902, a channel with which the light is associated 2904, a "clan" or group to which the lights are assigned 2906, and the output type associated with each light 2908. FIG. 29 illustrates a sub-menu 3002 that appears when a light from FIG. 28 is selected. As illustrated, a light may have a number of characteristics that are selectable or configurable by a user. The controls may be provided with a drop-down list, examples of which are shown at 3004 of the figure. A user can configure the characteristics of a particular light by selecting the light from the light grouping interface 2900 and adjusting the characteristics of the light in FIG. 29. FIG. 30 illustrates the process 3100 of identifying a channel for a particular light. As shown, the user can select "auto identify" 3102 and proceed through a series of pop-ups to configure the various lights found on an installation. FIG. 30 illustrates a process for identifying a "clan" or group to which the lights are assigned which is initiated by pressing the auto-identify button as described at 3202.

Figure 32:
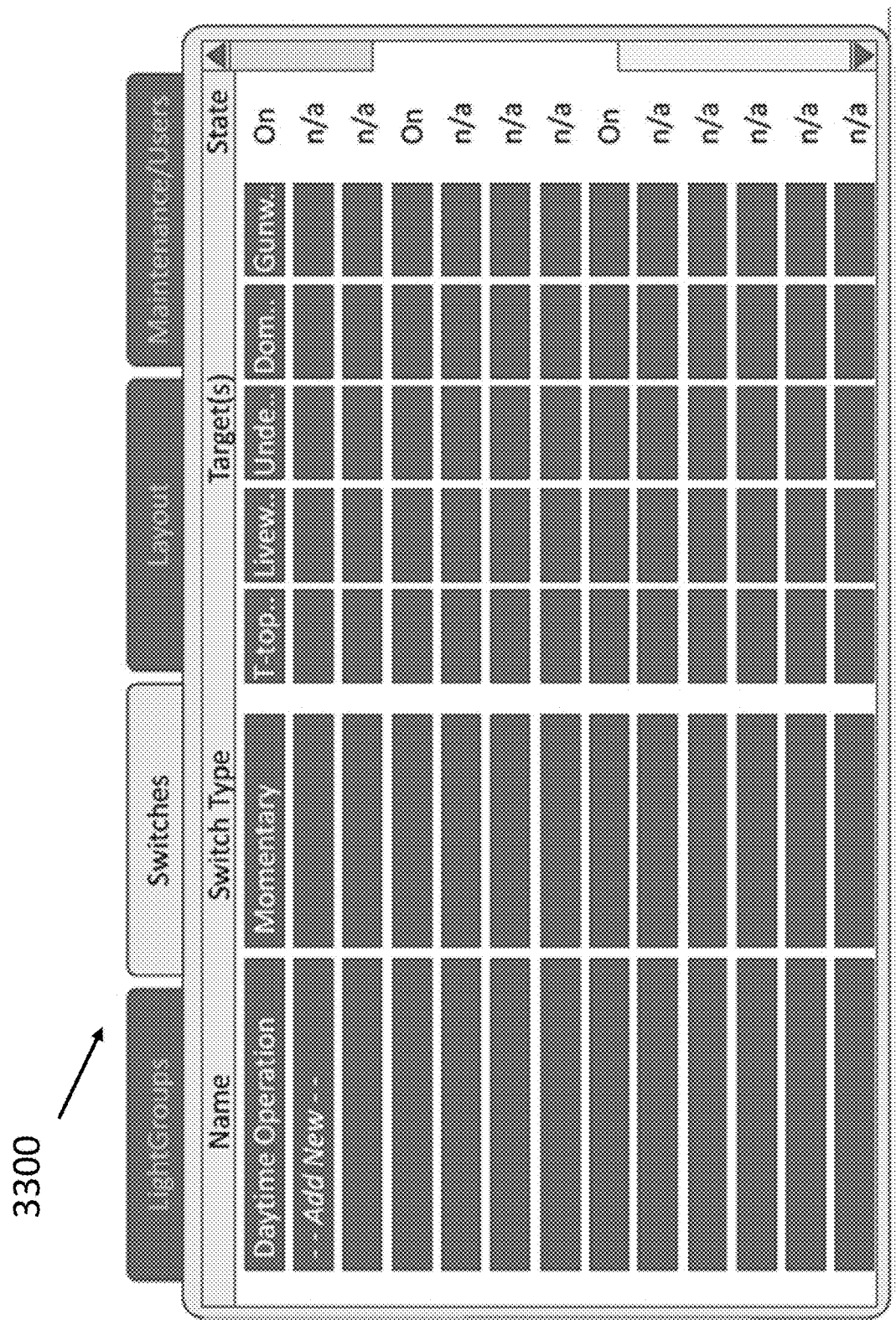
Figure 33:
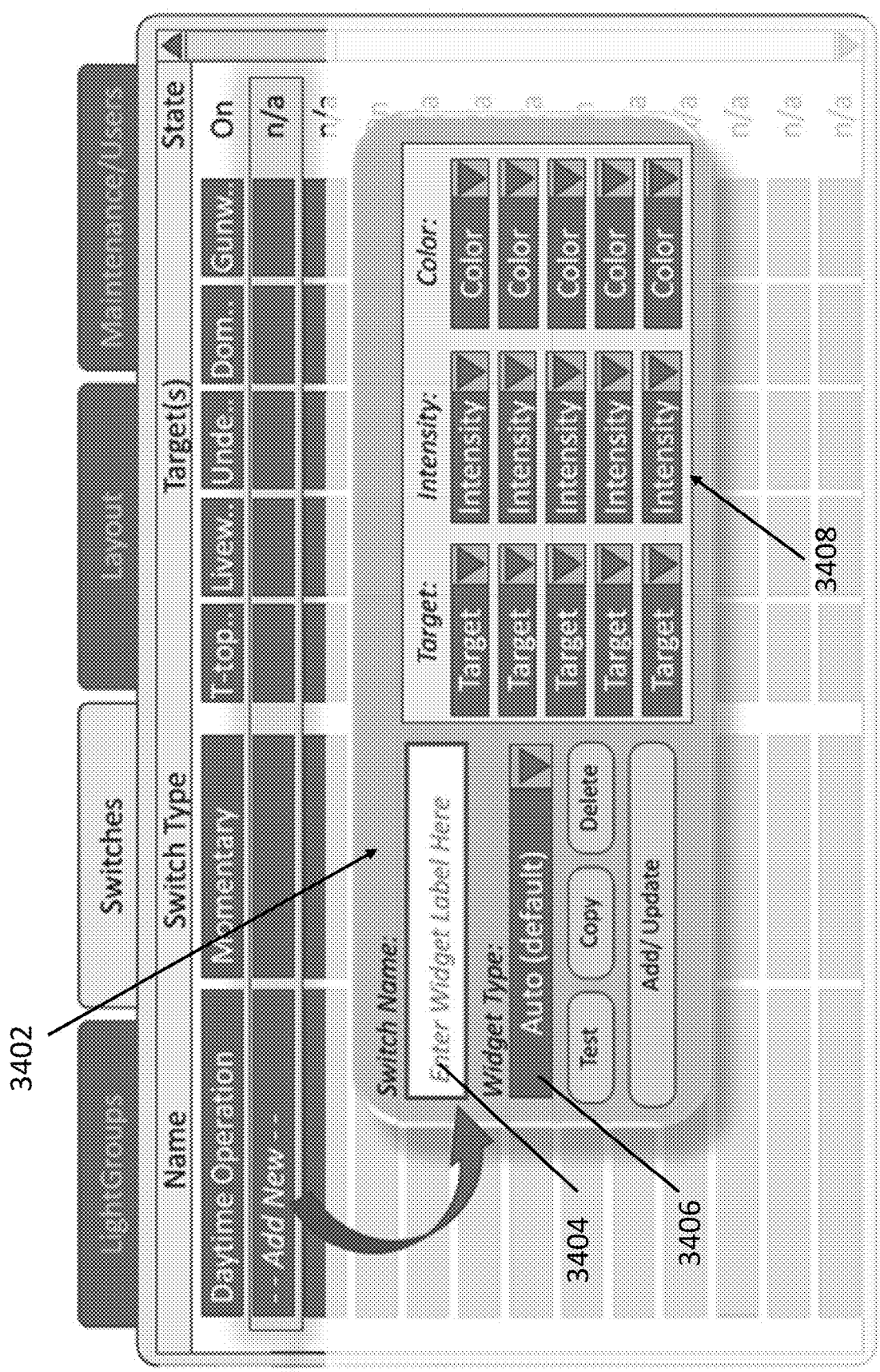
Figure 34:
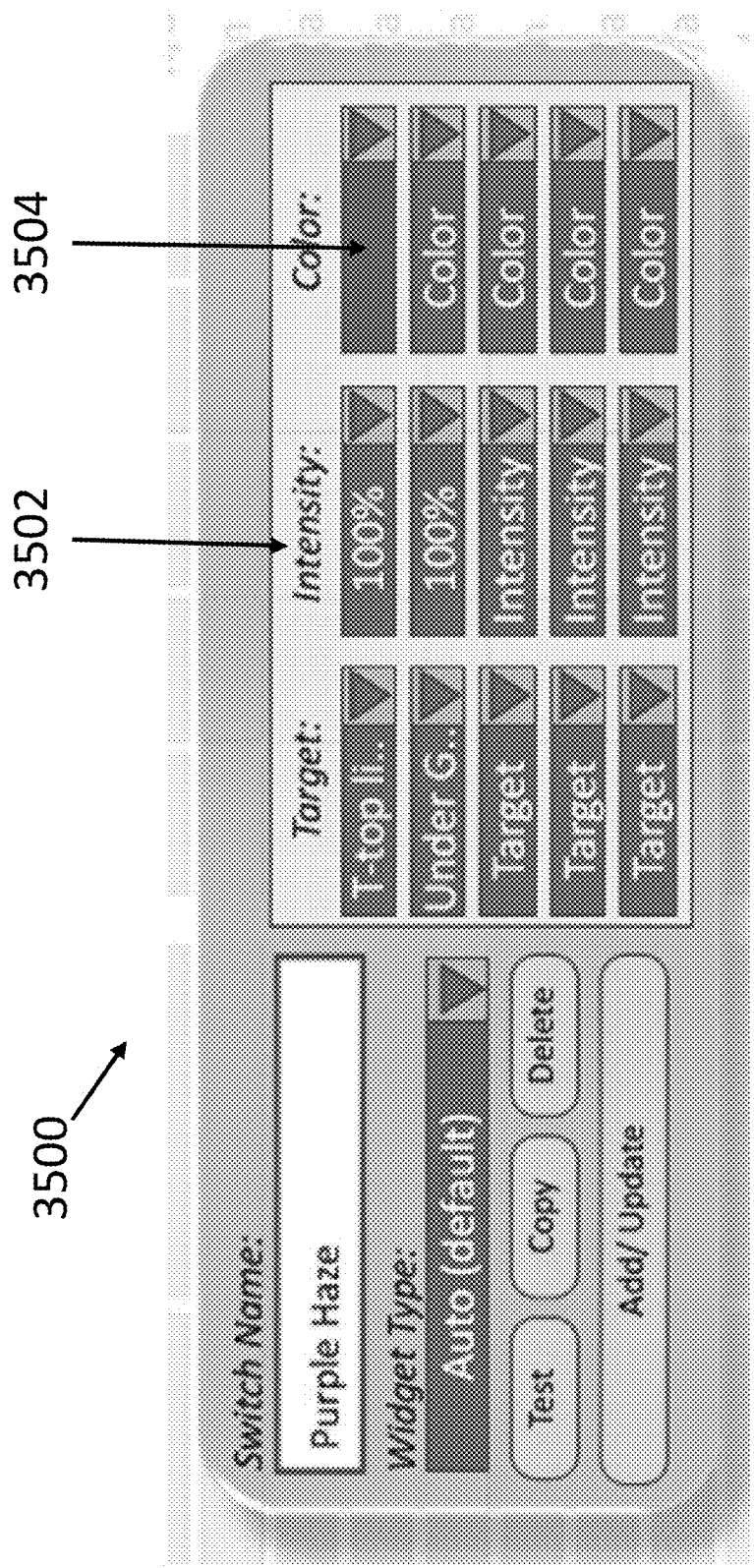
Figure 35:
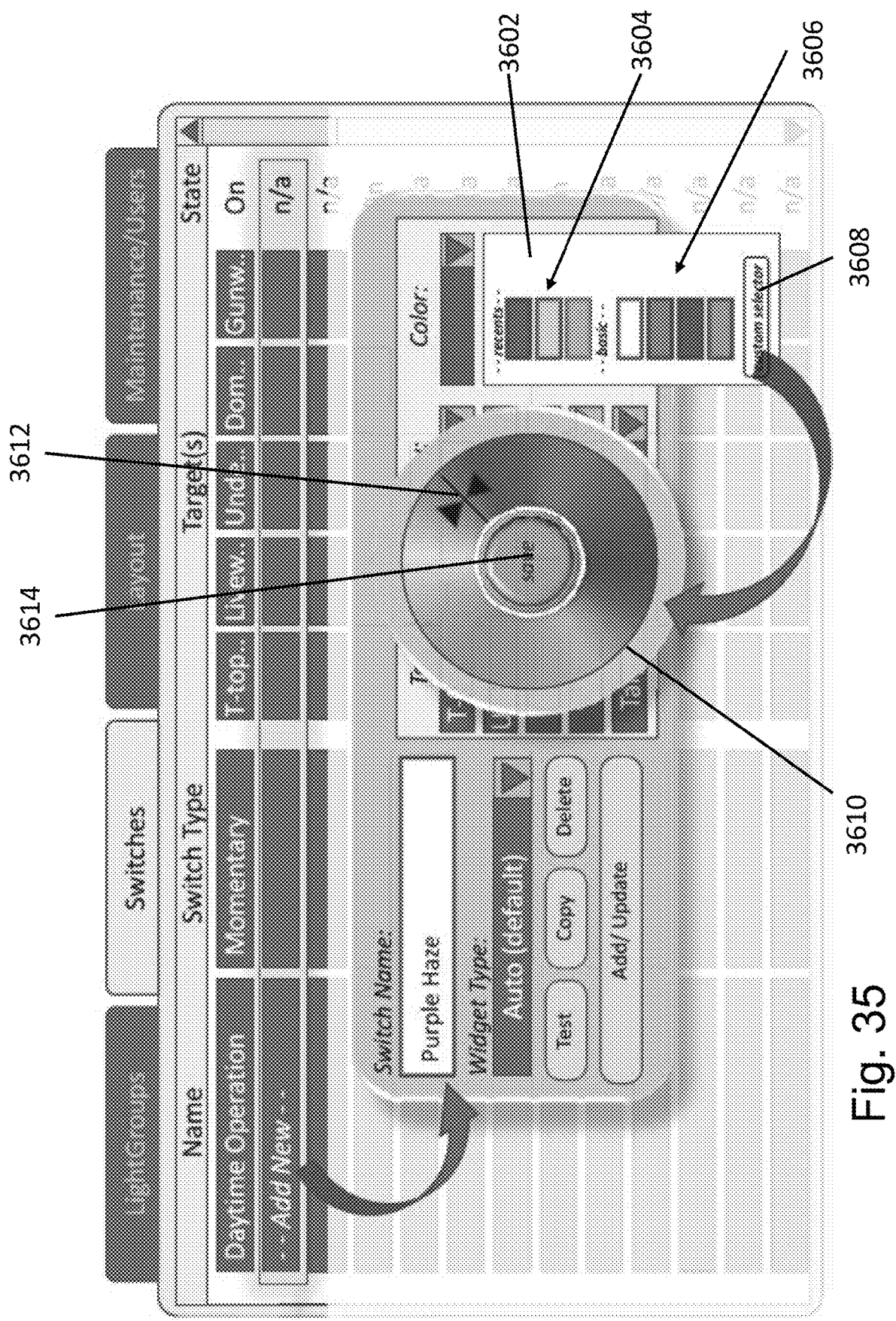

As was previously described, a virtual switch can be configured to control a plurality of lights. FIG. 32 illustrates the menu 3300 that appears when configuring a switch. FIG. 33 illustrates a sub-menu 3402 for adding a new virtual switch. As illustrated, the switch can be assigned a label 3404, a type 3406, and a plurality of targets can be assigned at 3408. FIG. 34 illustrates the sub-menu 3402 after being completed with a label of "Purple Haze" 3500. As shown, a target "T-top li.." is assigned an intensity of 100 at 3502. When a user selects the color selector 3504, a dropdown 3602 appears as illustrated in FIG. 35. As illustrated, an exemplary embodiment of such a dropdown 3602 might include a selection of recently used colors 3604, a selection of basic colors 3606 such as white, red, blue, etc., and a custom selector option 3608. Selecting the custom selector option 3608 may result in the appearance of an additional color selector 3610. The additional color selector 3610 illustrated includes a color selector control 3612 and a "save" button 3614 which stores the selected color and closes the color selector 3610. Thus, a user may customize the behavior of virtual switches.

Figure 36:
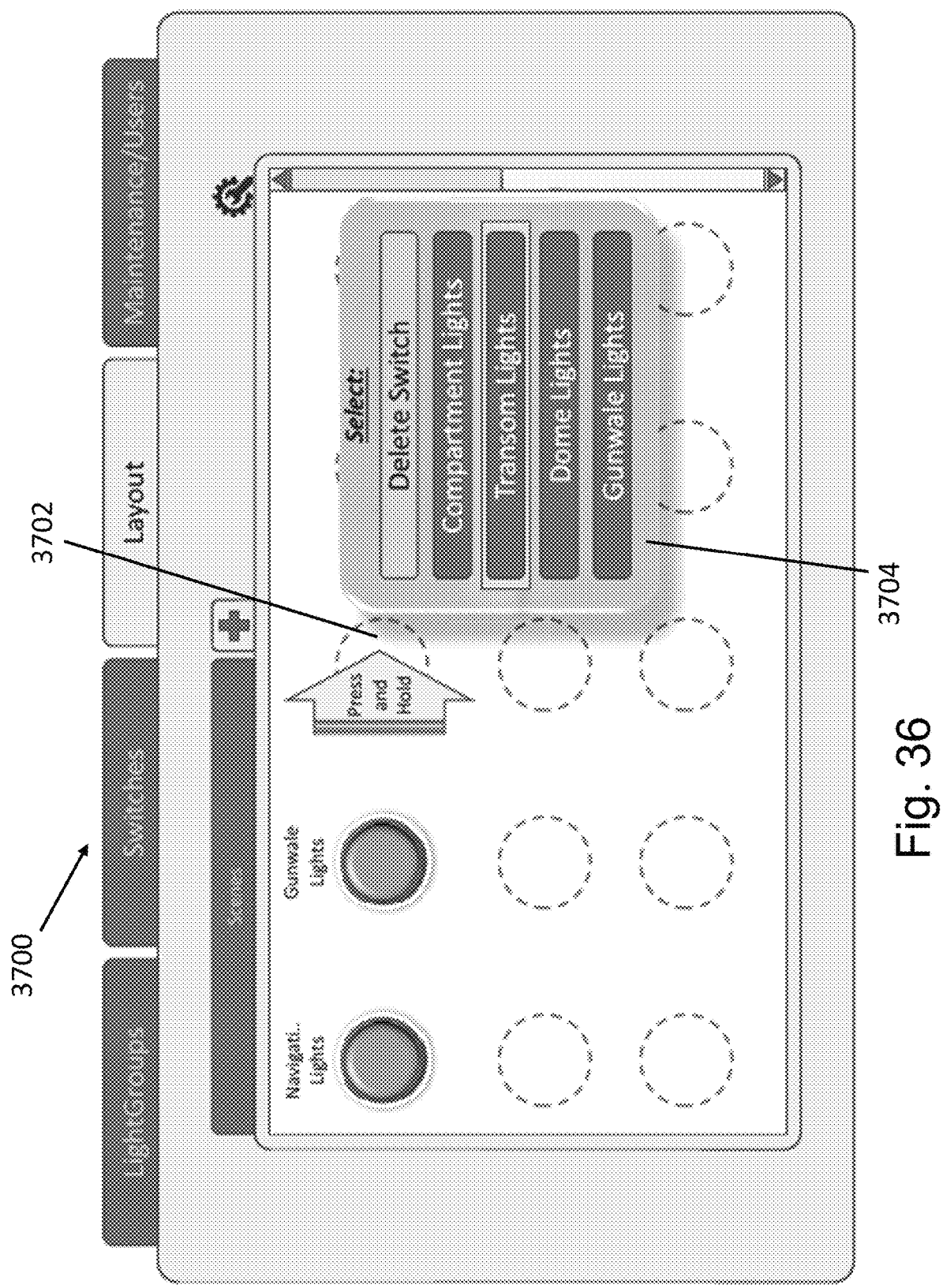
FIG. 36 illustrates the process of creating or modifying the widgets in an interface screen according to an exemplary embodiment.

FIG. 36 illustrates a layout customization interface 3700. As illustrated, a user may select an available position 3702 by pressing and holding the position 3702. After performing the press and hold selection, a sub-menu popup 3704 appears in an exemplary embodiment. In the illustrated sub-menu popup 3704, a plurality of options are available. For example, and without limitation, the options may include deleting a virtual switch or assigning the switch a name from a list of presented options. Thus, a user can customize an interface by adding or subtracting virtual switches.

Figure 37:
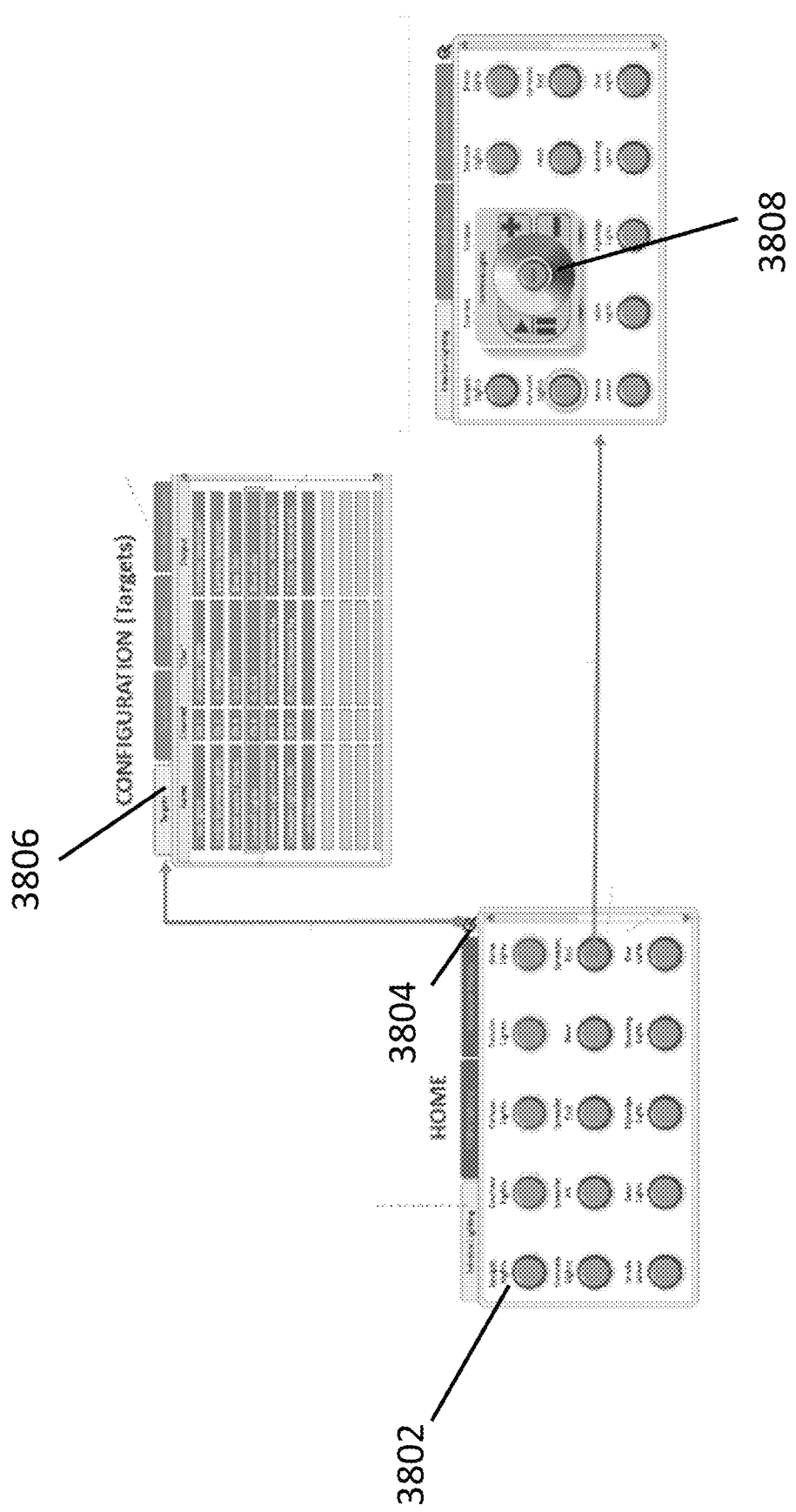
FIG. 37 illustrates a chart of the steps that may be taken during an interaction with the interface screen according to an exemplary embodiment.

FIG. 37 illustrates the relationship between the user interface screens described in the previous paragraphs. As shown, from a home screen 3802, a user can select an edit icon 3804 to enter a configuration screen 3806 as was described starting on FIG. 32. From the home screen 3802, a user can scroll up and down to view additional virtual switches if there is more than one screen of virtual switches. When a user selects a switch, the switch will behave in ways that are defined by the type of virtual switch as described in FIGS. 20-21. If a user selects a switch and holds the switch for a period of time, a pop-up appears as shown at 3808. This behavior was illustrated in FIG. 24 and described in the accompanying description.

Figure 38:
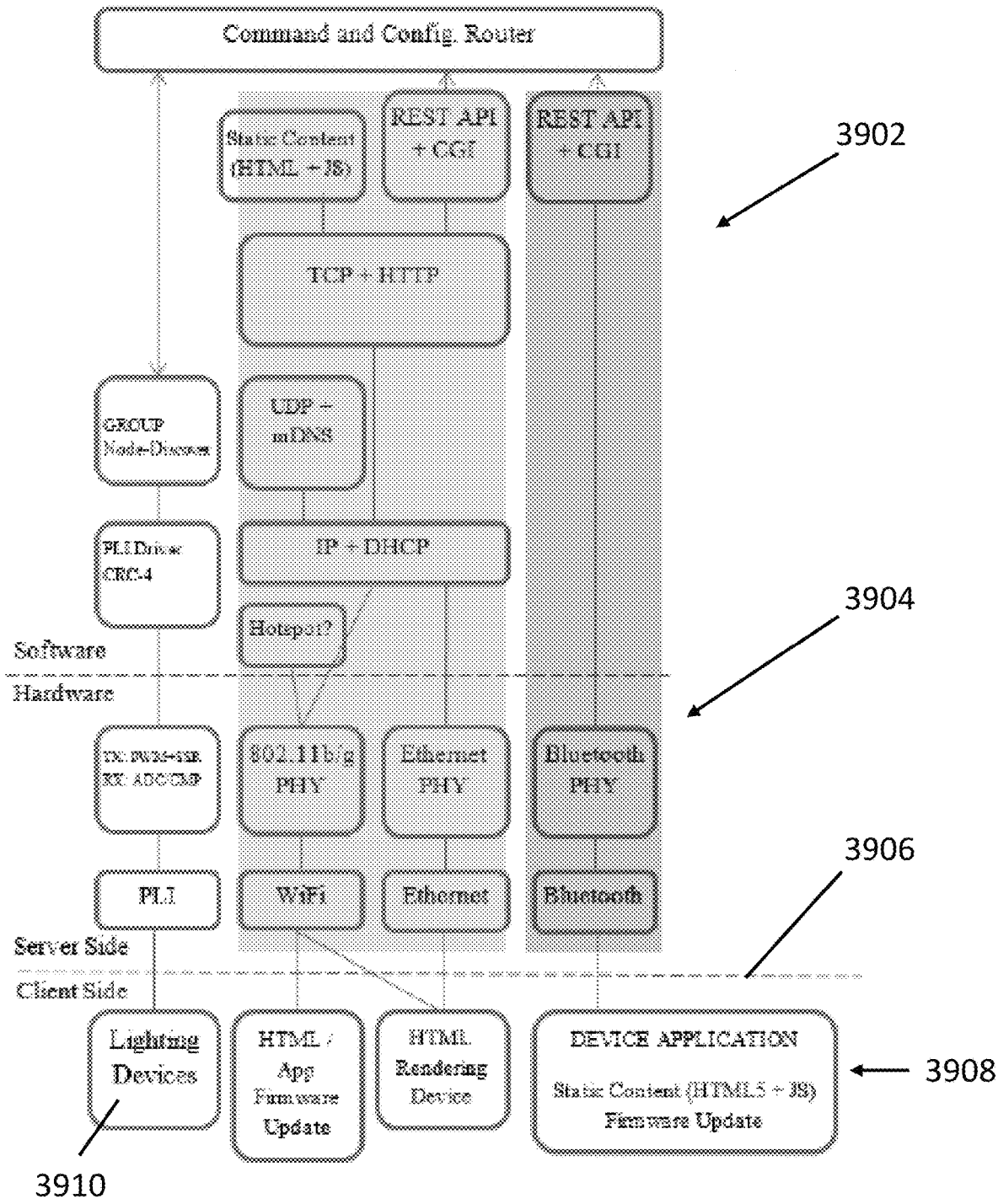
FIG. 38 illustrates a high-level chart of the interactions between components of the system according to an exemplary embodiment.

FIG. 38 illustrates a system overview including an indication of where particular functions are derived. As is illustrated, the overview represents an exemplary embodiment of the system including software component 3902, hardware components 3904, and information or controls 3908 provided from the system to sources/recipients and lighting devices. The line located at 3906 represents the interface between the system and the outside world (client side). As shown, one or more lighting devices 3902 are in communication with the system. These lighting devices are the primary recipient of control derived from the system. In addition to communications with lighting systems and other devices, an exemplary embodiment may have additional communication technologies such as, without limitation, Wi-Fi, Ethernet, and Bluetooth. These technologies can be used to provide control, provide system and device status, enable system software updates, and communicate with control or monitoring hardware as required.

Figure 39:
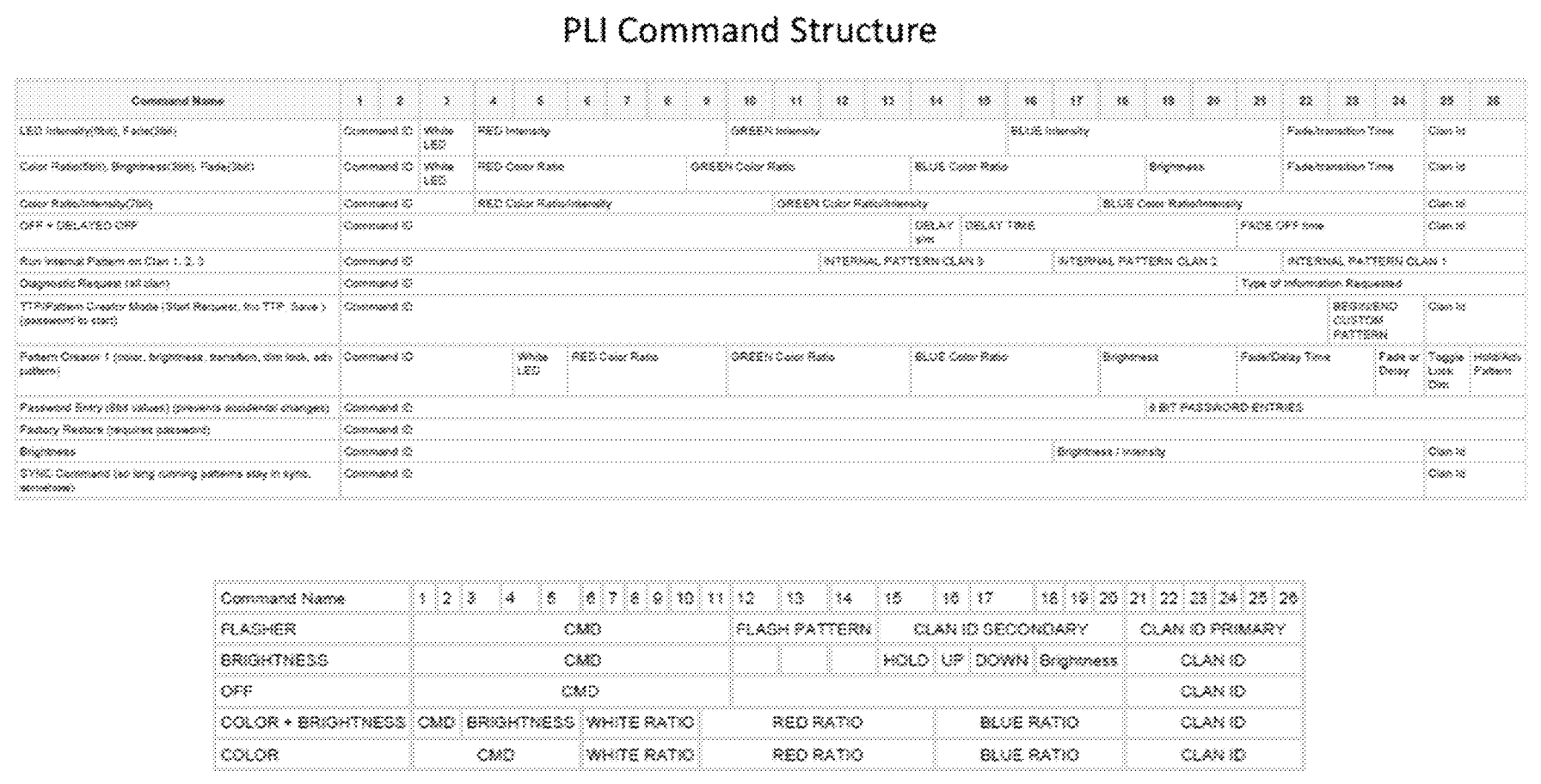

FIG. 39 illustrates an alternative exemplary power line instruction command structure.

Figure 40:
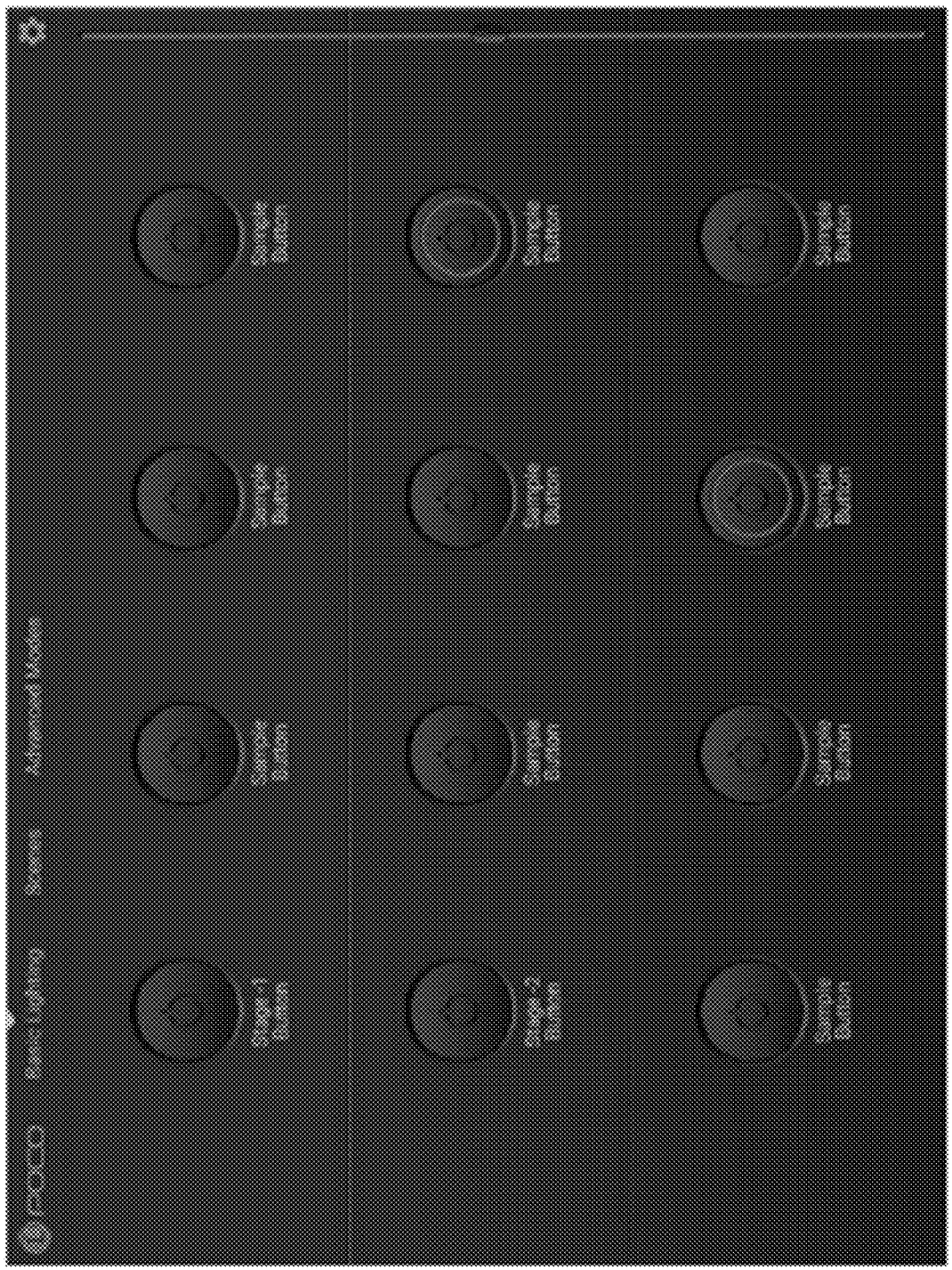
FIGS. 40-56 illustrate a plurality of user interfaces used by exemplary embodiments to interact with a user of the invention.
Figure 41:
Figure 42:
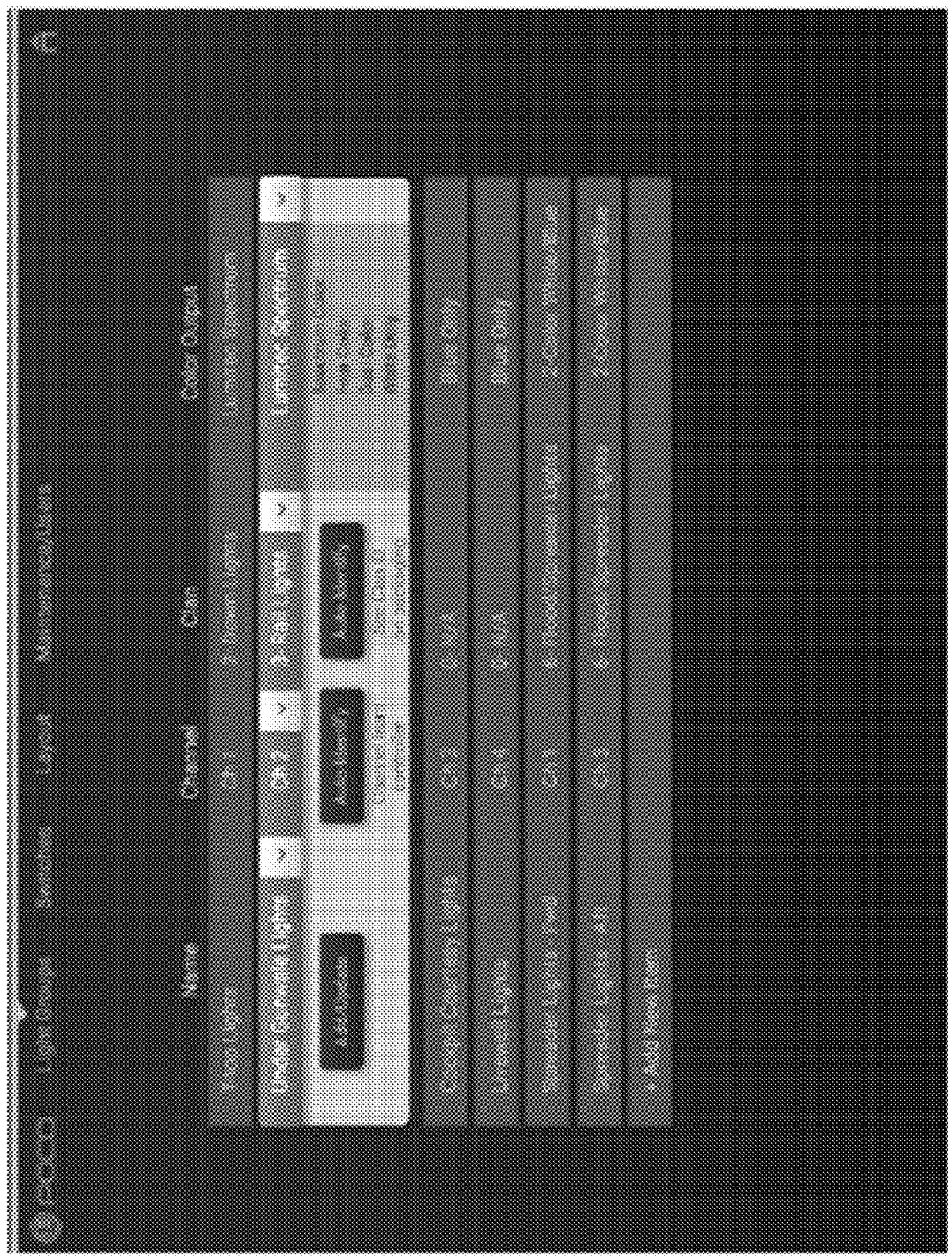
Figure 43:
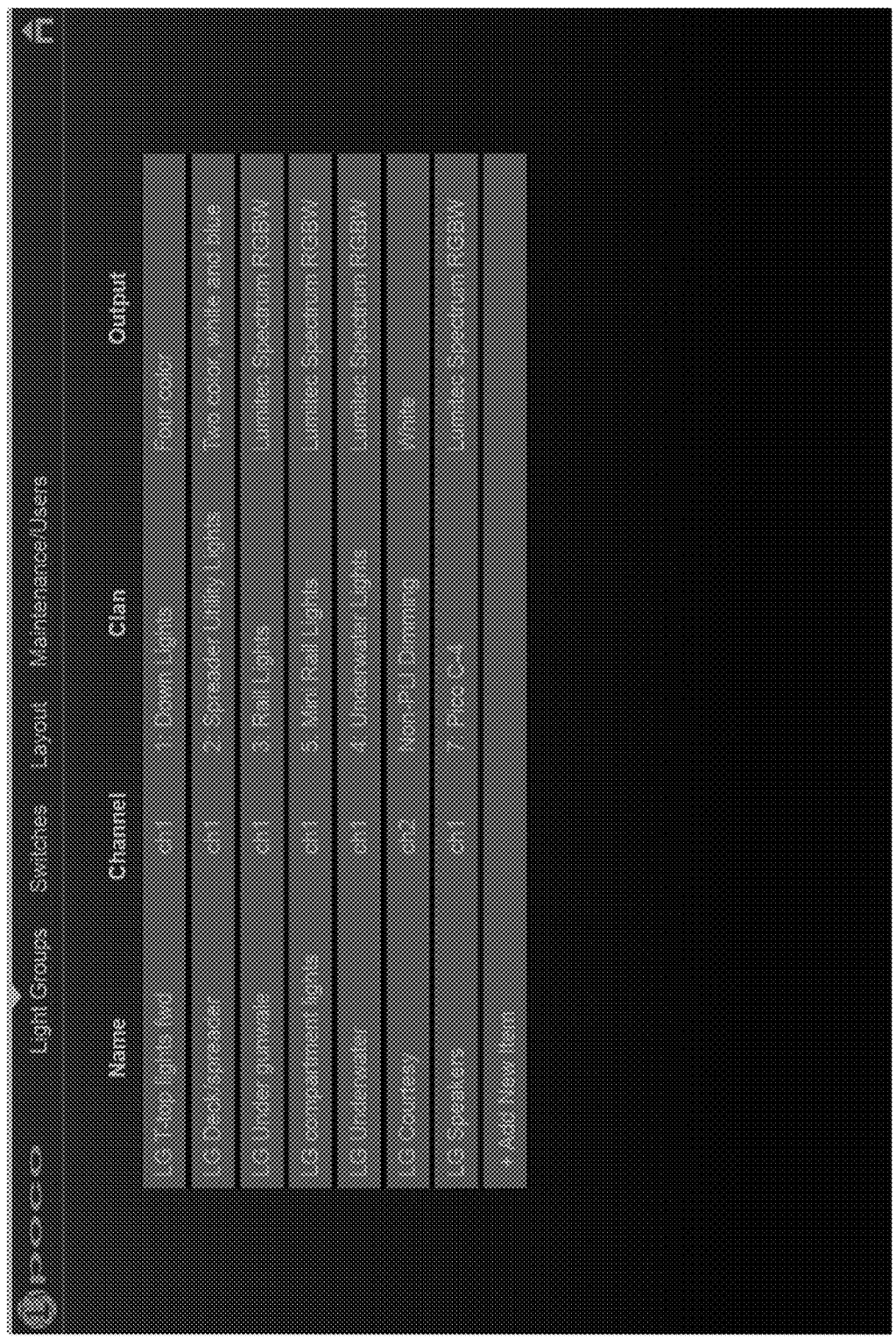
Figure 44:
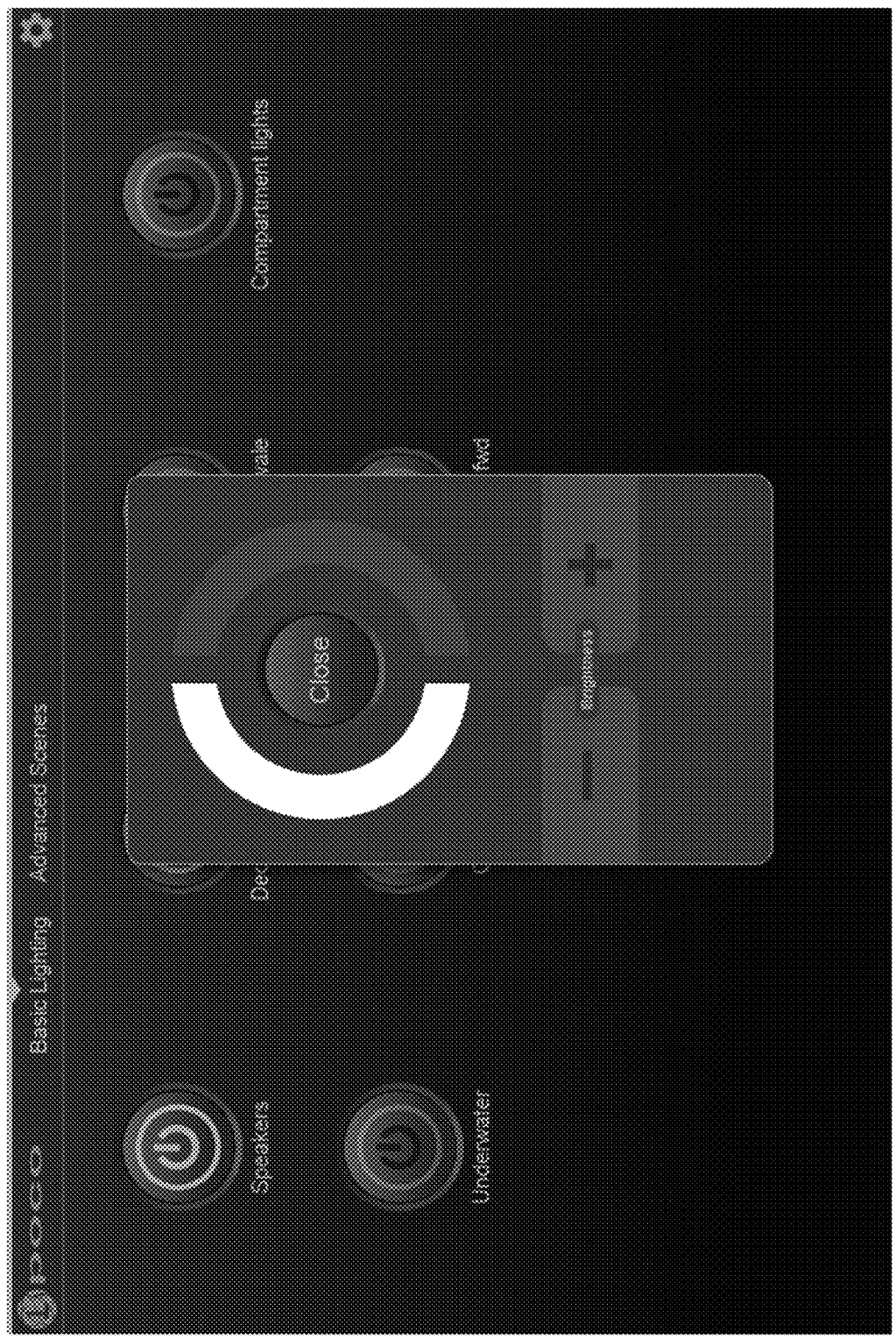
Figure 45:
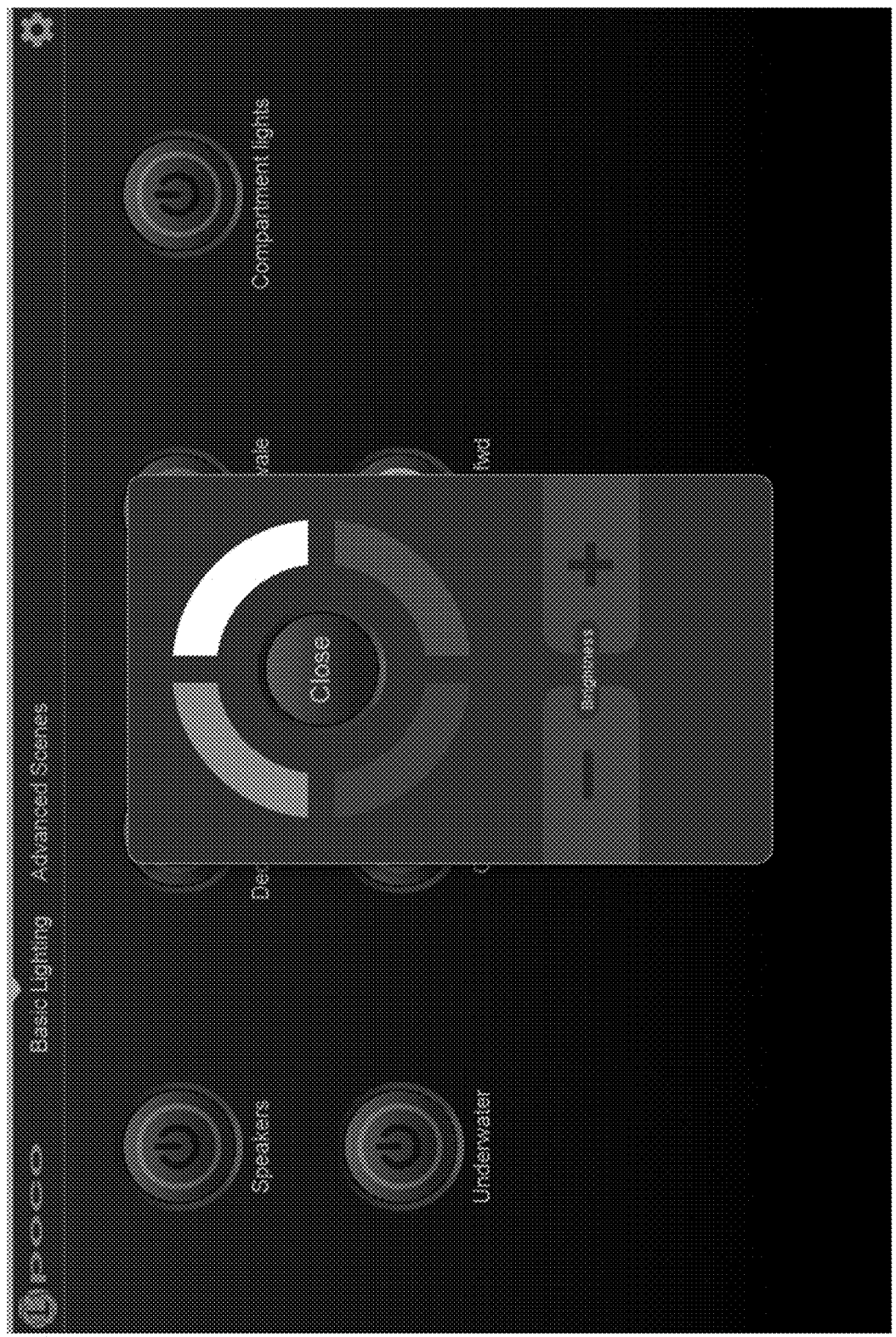
Figure 46:
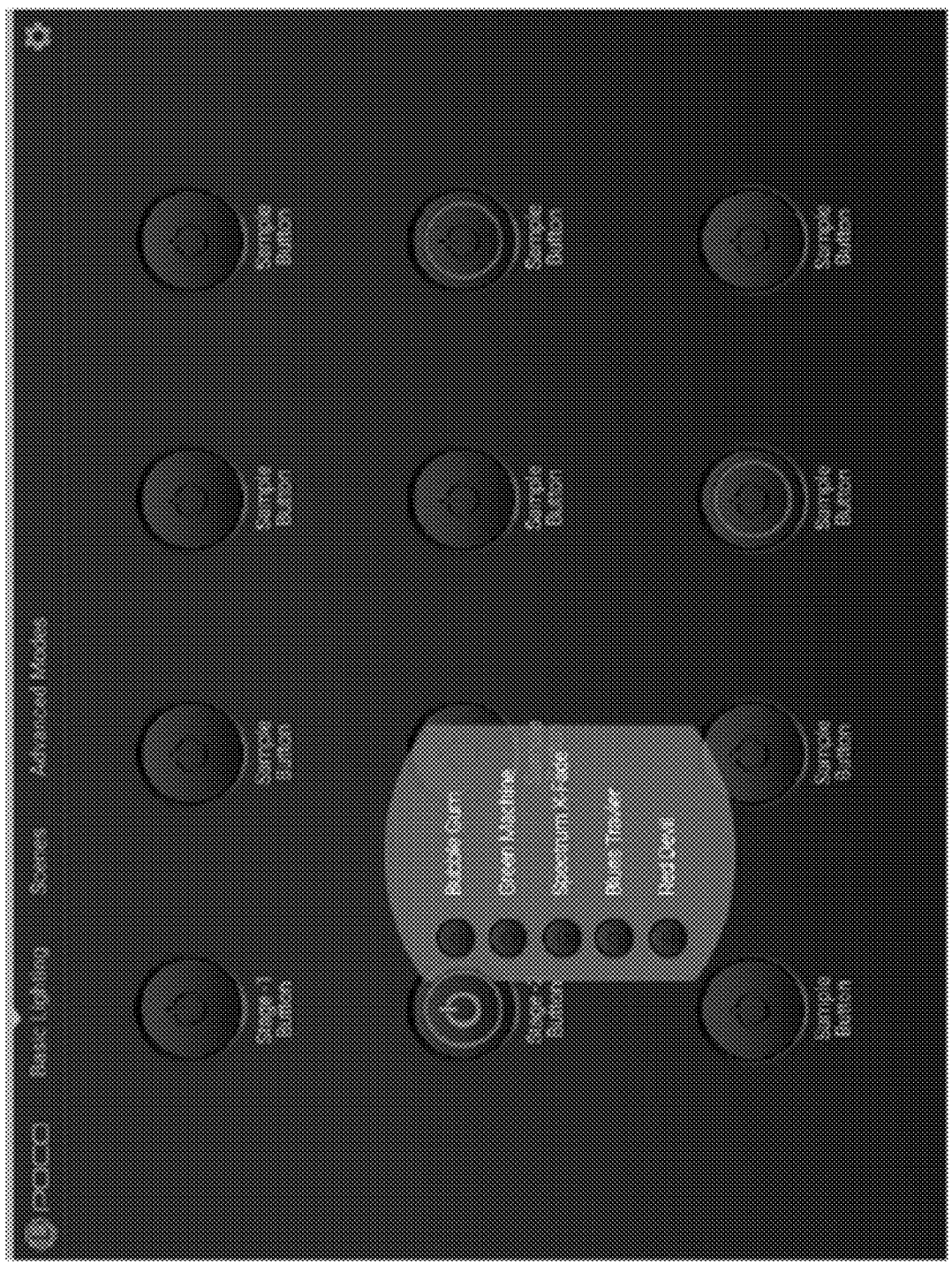
Figure 47:
Figure 48:
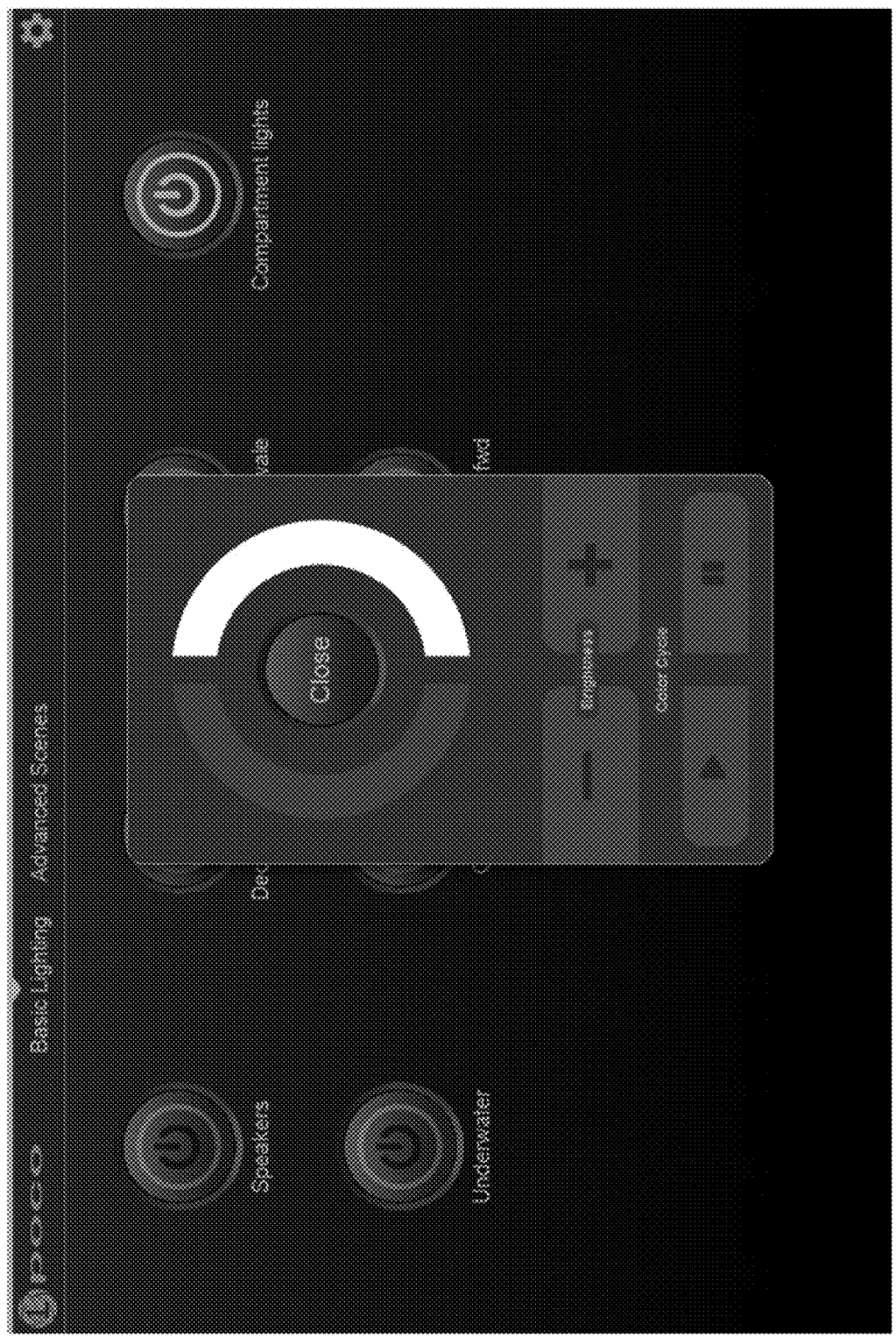
Figure 49:

FIGS. 40-62 illustrate exemplary graphical user interfaces according to the systems and methods described herein. FIG. 40 illustrates an initial user interface screen image, FIG. 41 illustrates the user interface screen of FIG. 40 with a stage 1 and stage 2 button selected as indicated by the button face being highlighted. FIG. 42 illustrates a light group editing user interface image, FIG. 43 illustrates the light group display interface of FIG. 42 after the editing interface has been closed. FIG. 44 illustrates a two-color selection popup display that appears in an exemplary embodiment after a virtual switch is selected and held for a period of time. FIG. 45 illustrates a four-color selection popup display that appears in an exemplary embodiment after a virtual switch is selected and held for a period of time. FIG. 46 illustrates an image of a user interface displaying a switch selector popup interface and FIG. 47 illustrates a selection being made from options presented on the switch selector popup interface. FIG. 48 illustrates alternate embodiment of two-color selection popup display that appears in an exemplary embodiment after a virtual switch is selected and held for a period of time. A similar popup was illustrated in FIG. 44, but the popup of FIG. 48 adds a selection control for starting and pausing a color cycling display option. FIG. 49 illustrates an exemplary embodiment of a popup display that permits a user to select a first and second color with a selection control for starting and pausing a color cycling display option. In such cycling displays, the color of a light may be caused to cycle from a first color to a second color according to a defined schedule. For example, a light might be caused to slowly cycle from green to blue according to a selected rate of change.

Figure 50:
Figure 51:
Figure 52:
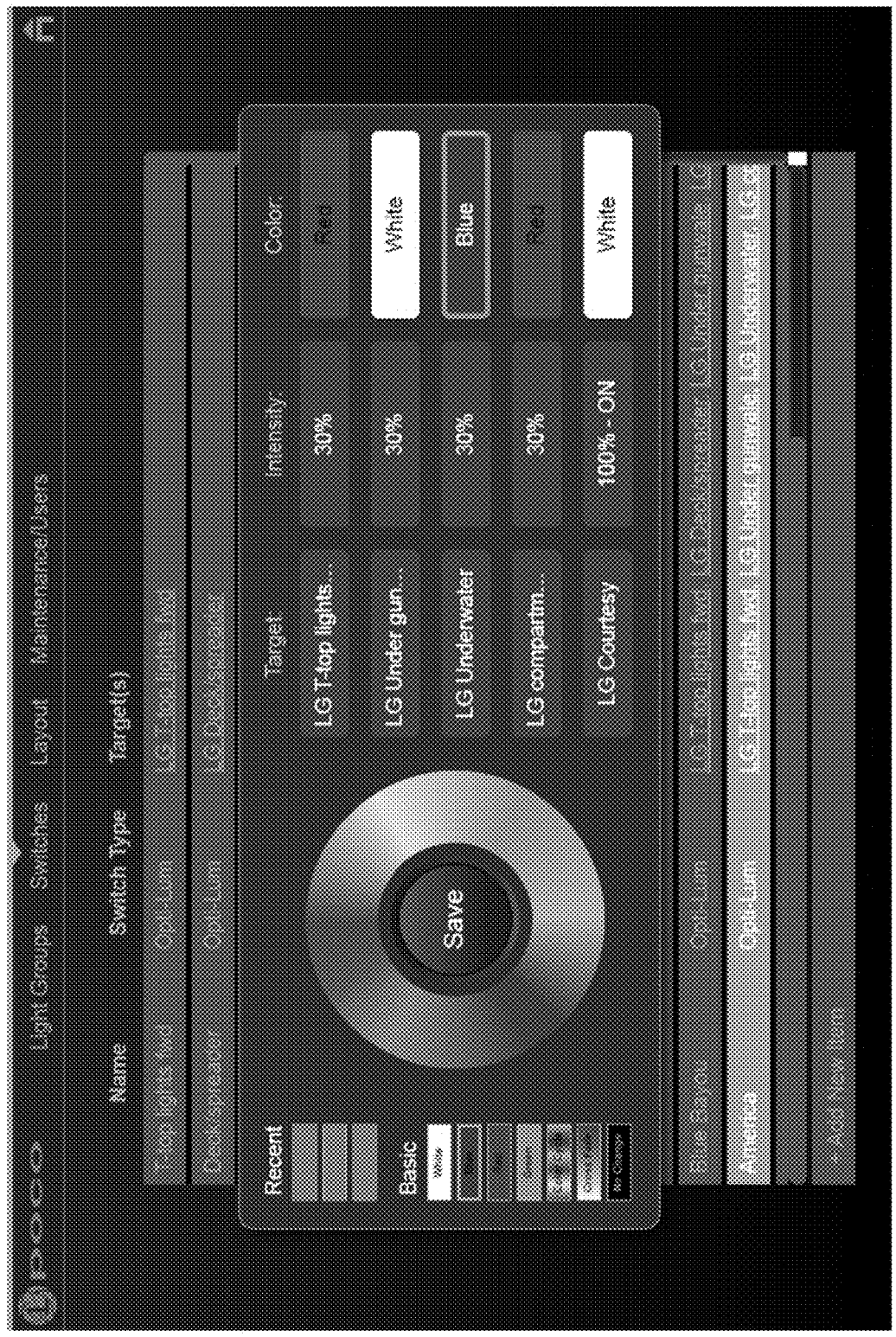
Figure 53:
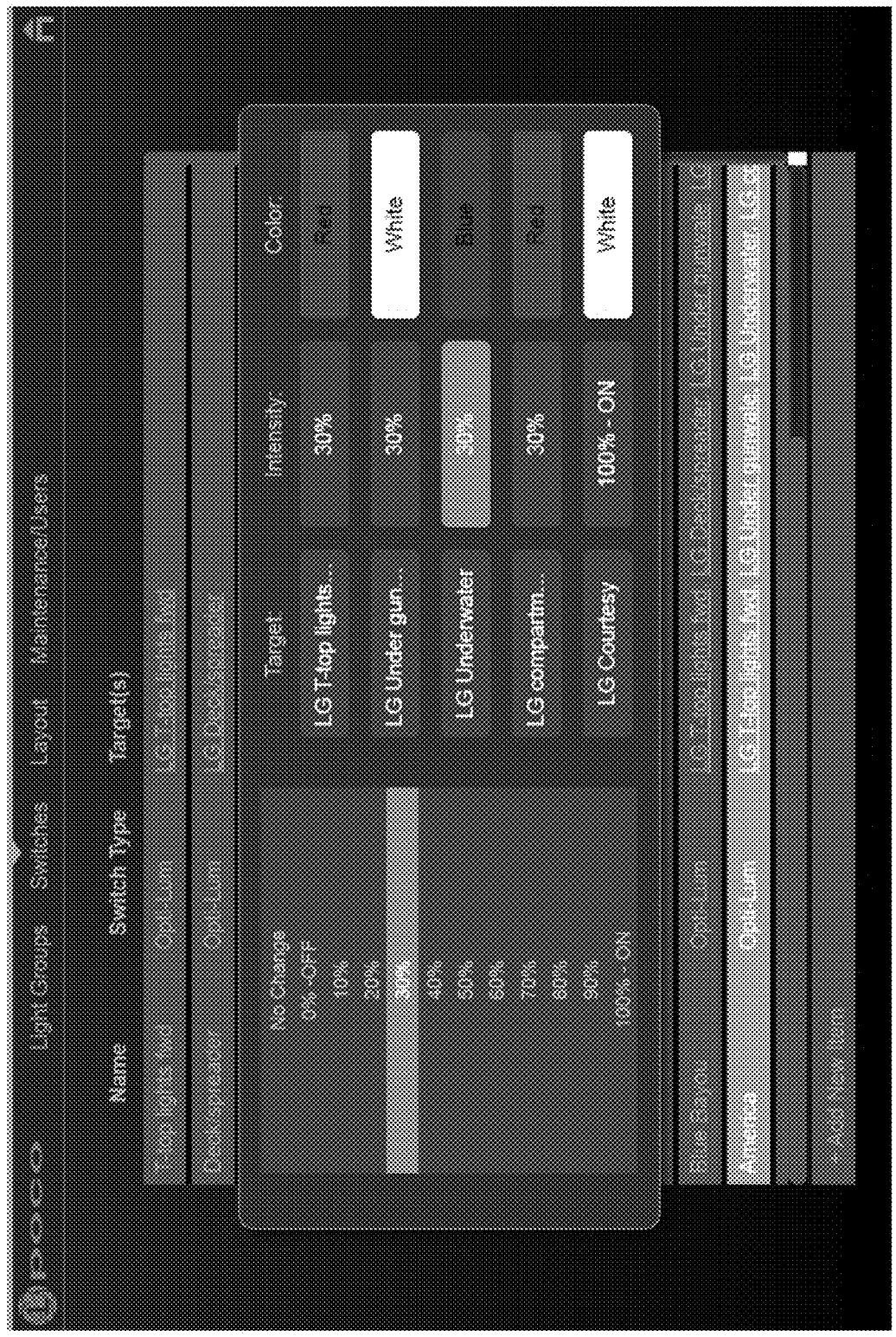
Figure 54:
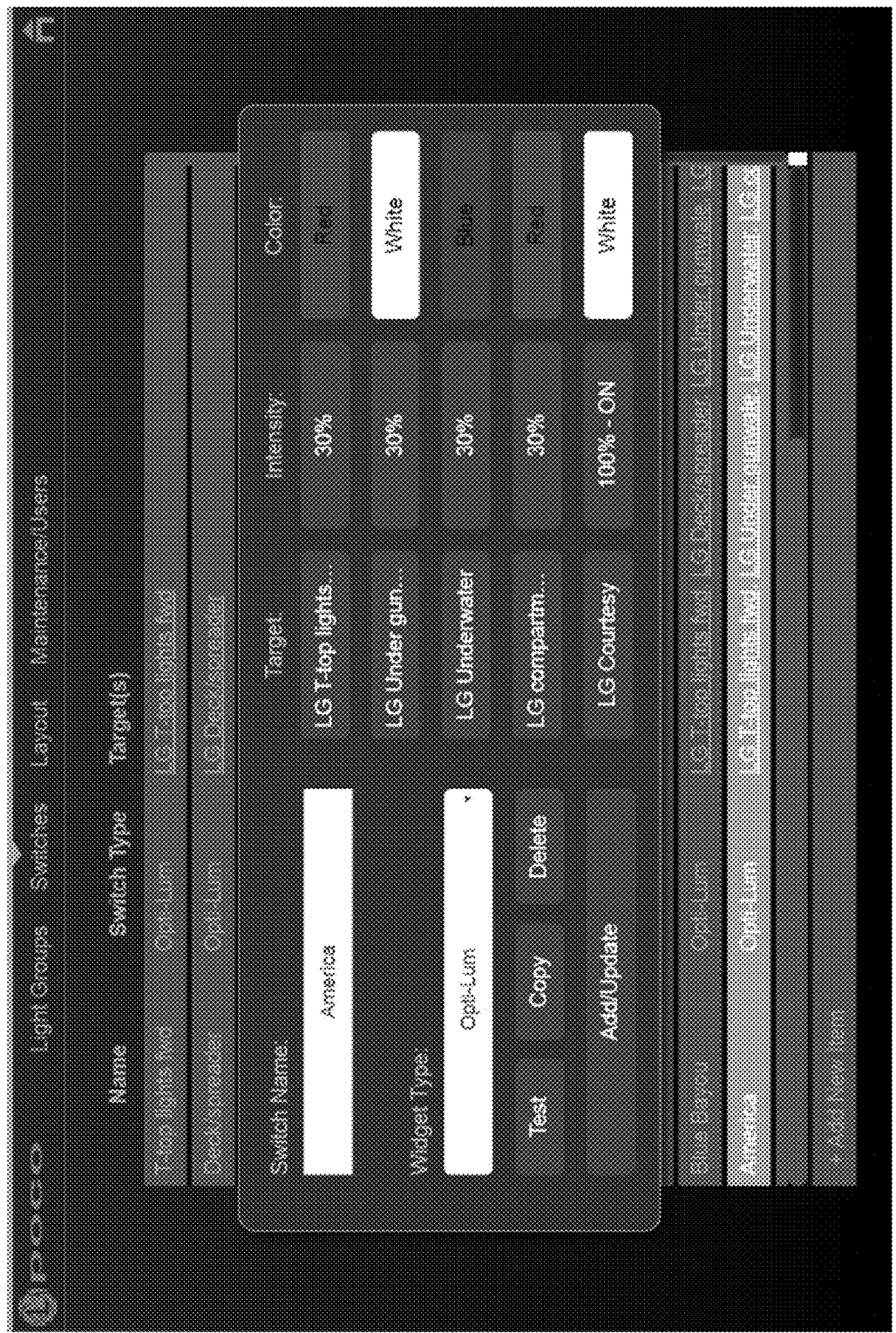

FIG. 50 illustrates an exemplary user interface that comprises additional configurations. These configurations are labeled as advanced scenes and might comprise user or predefined configurations of some or all lights available to an exemplary system. For example, one of the virtual switches in FIG. 50 is labeled "night fishing." Selecting this switch might cause lighting in a watercraft to transition to a soft red glow to preserve the night vision of occupants while turning on a white light under the waterline to attract fish to the boat if such a configuration is permitted.

Figure 55:
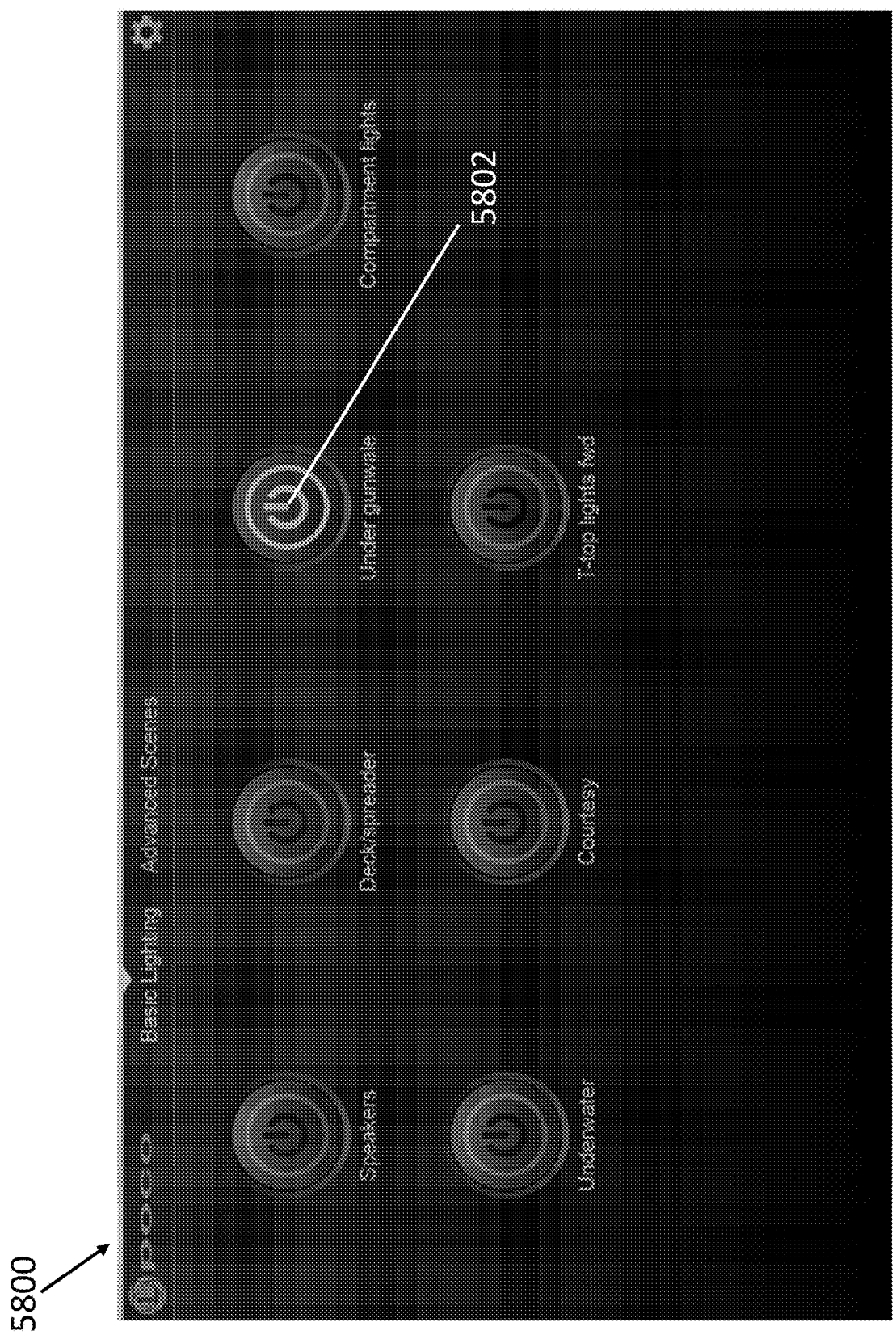
Figure 56:
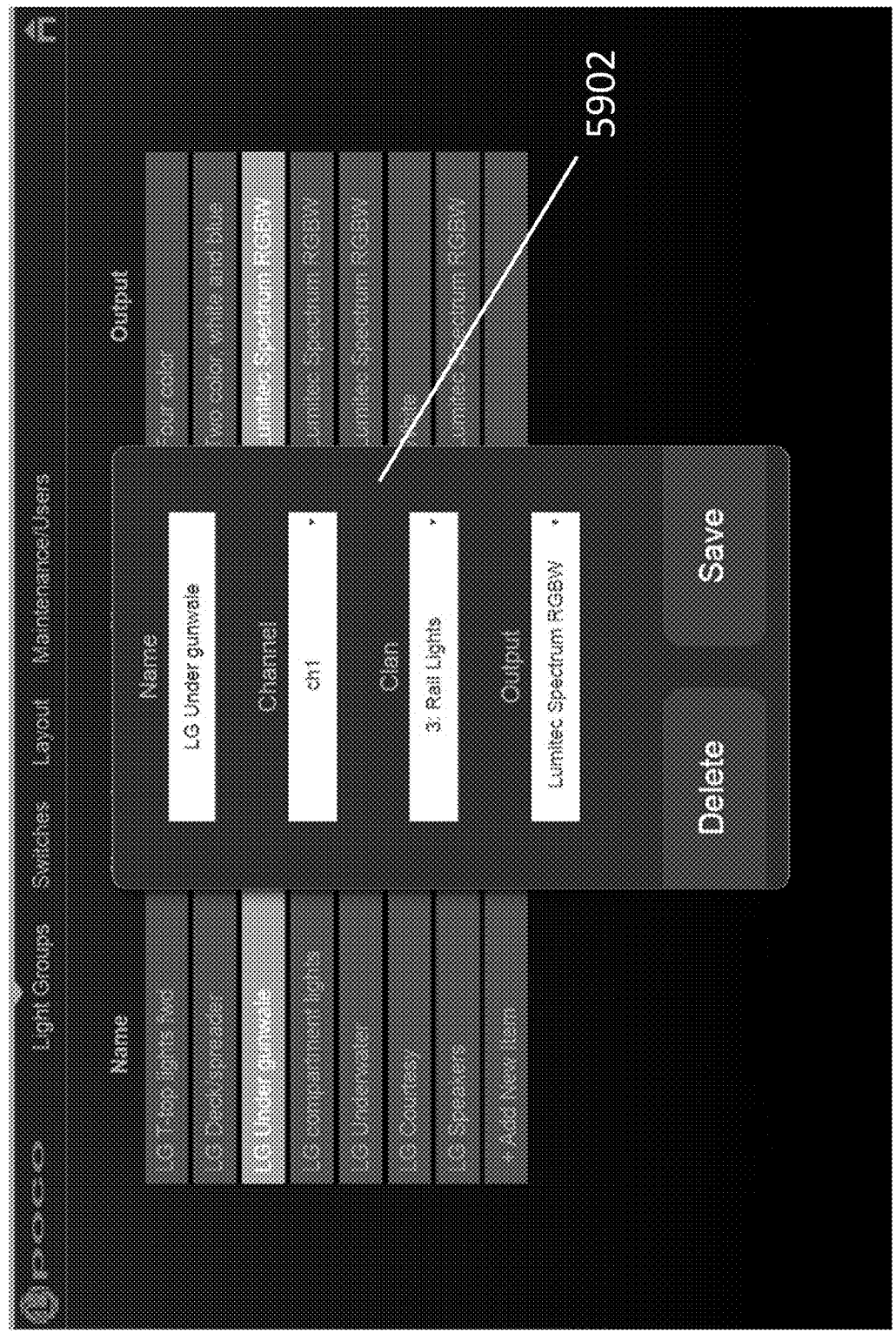
Figure 57:
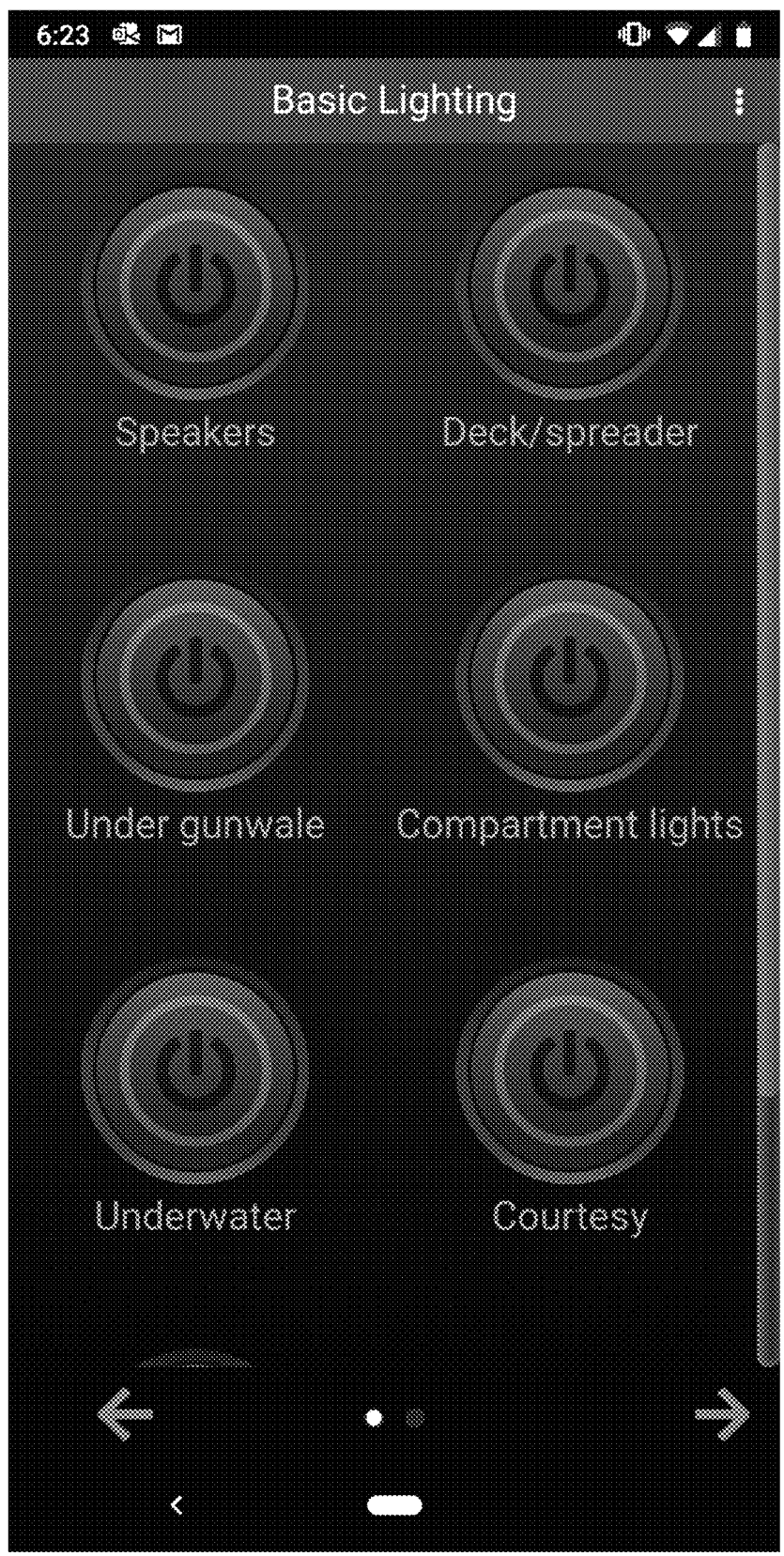
FIGS. 57-65 illustrate user interfaces displayed on a personal communication device such as a smartphone, tablet or other such devices according to an exemplary embodiment.
Figure 58:
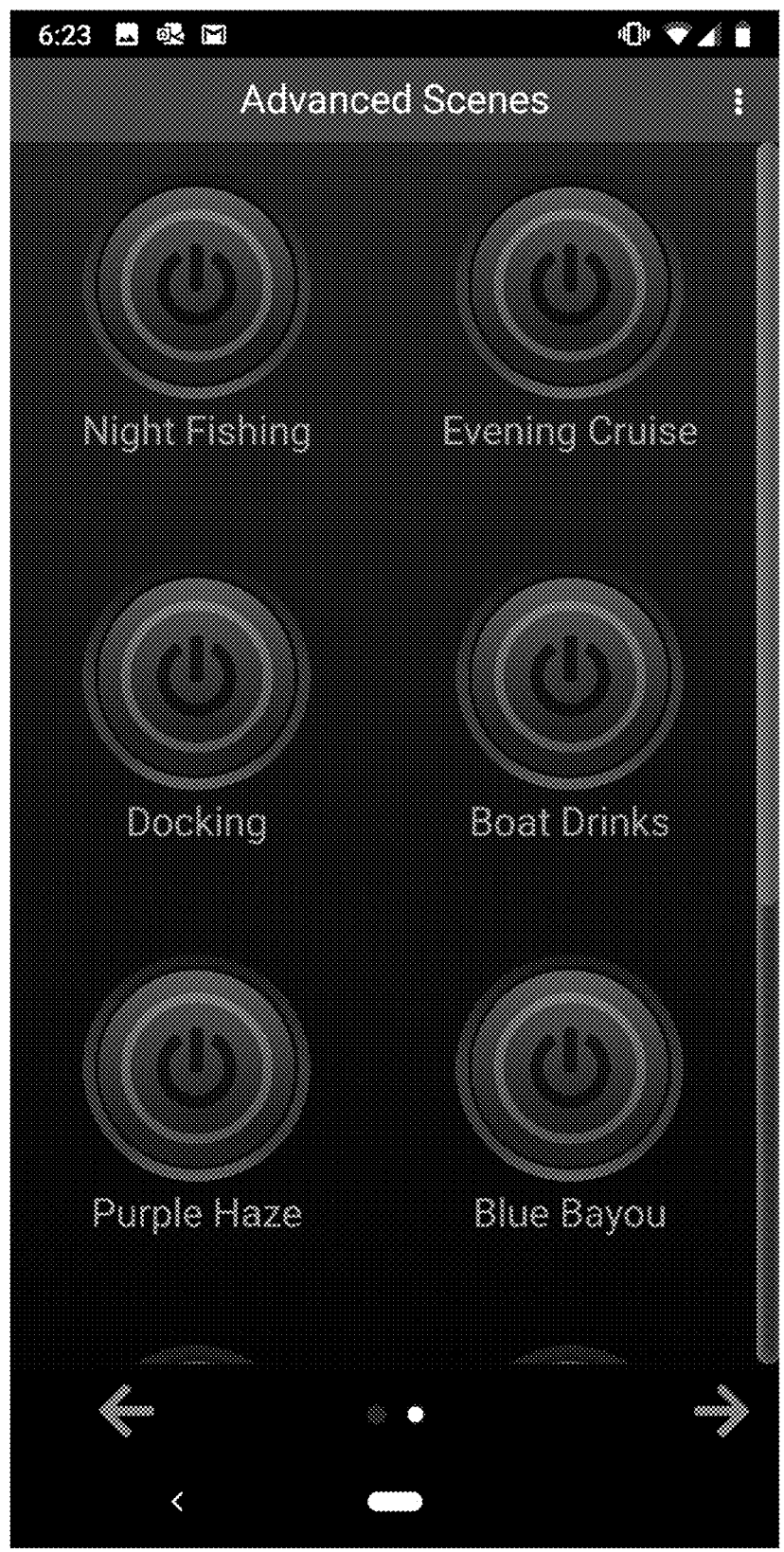
Figure 59:
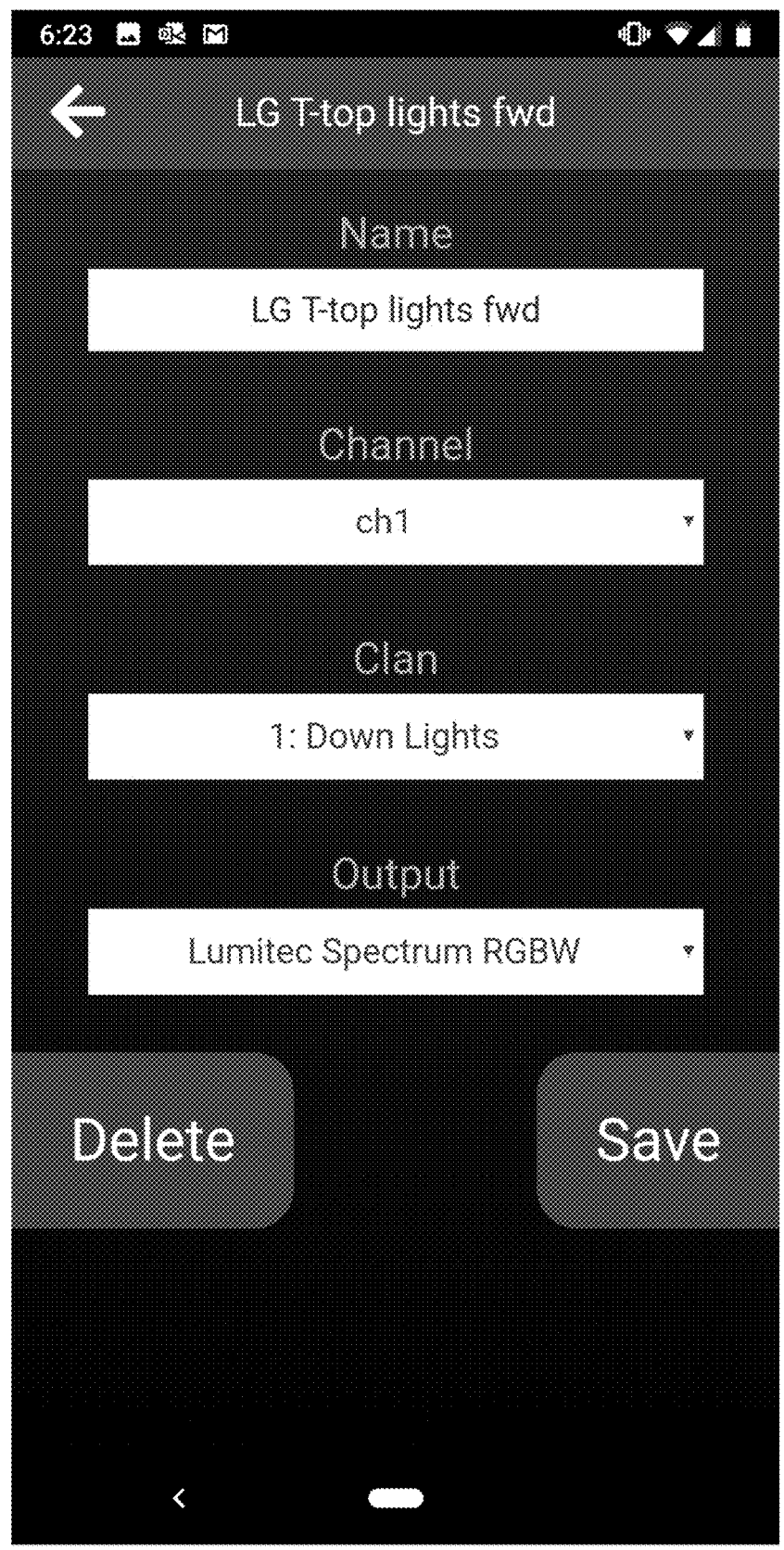
Figure 60:
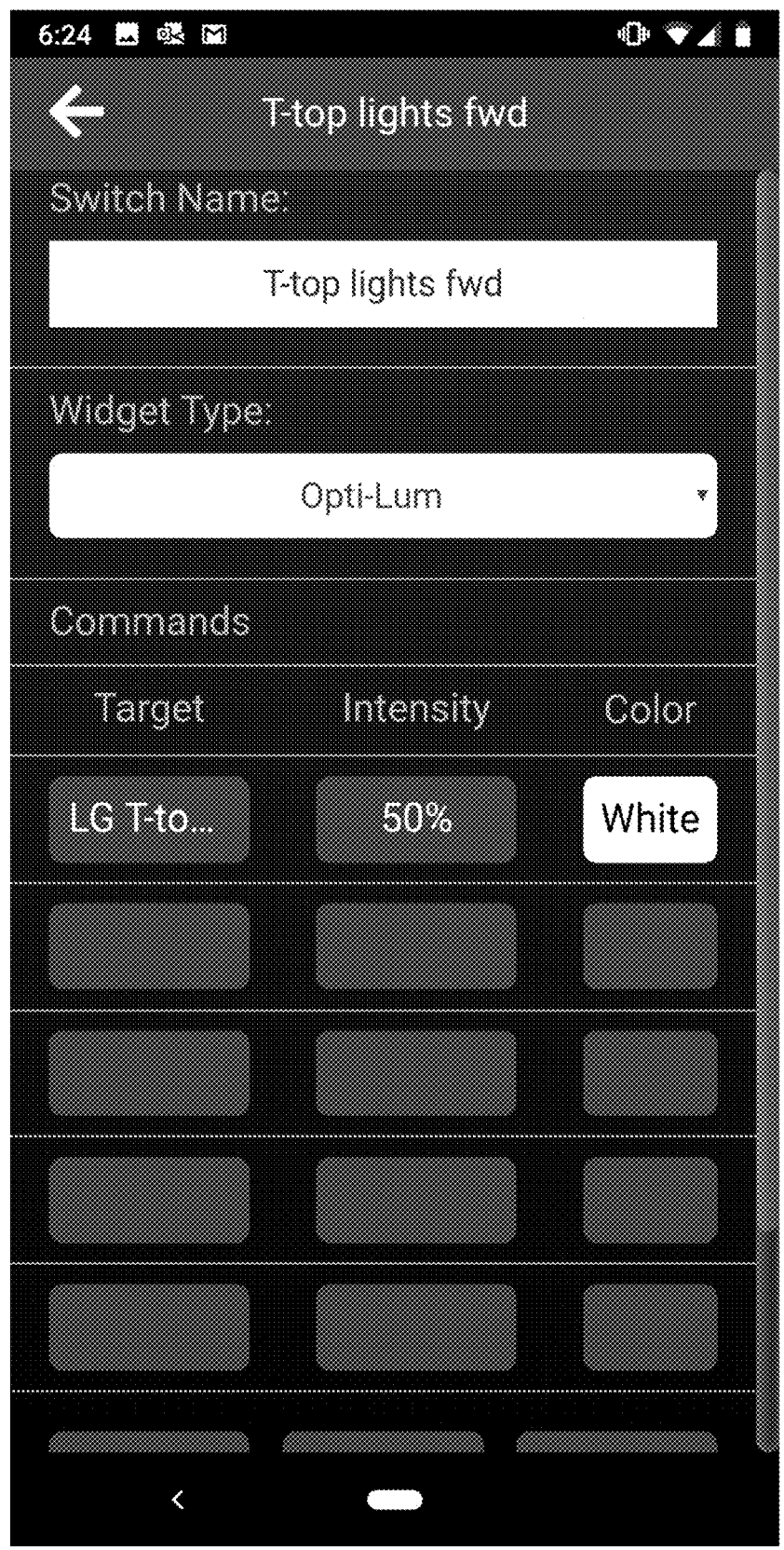
Figure 61:
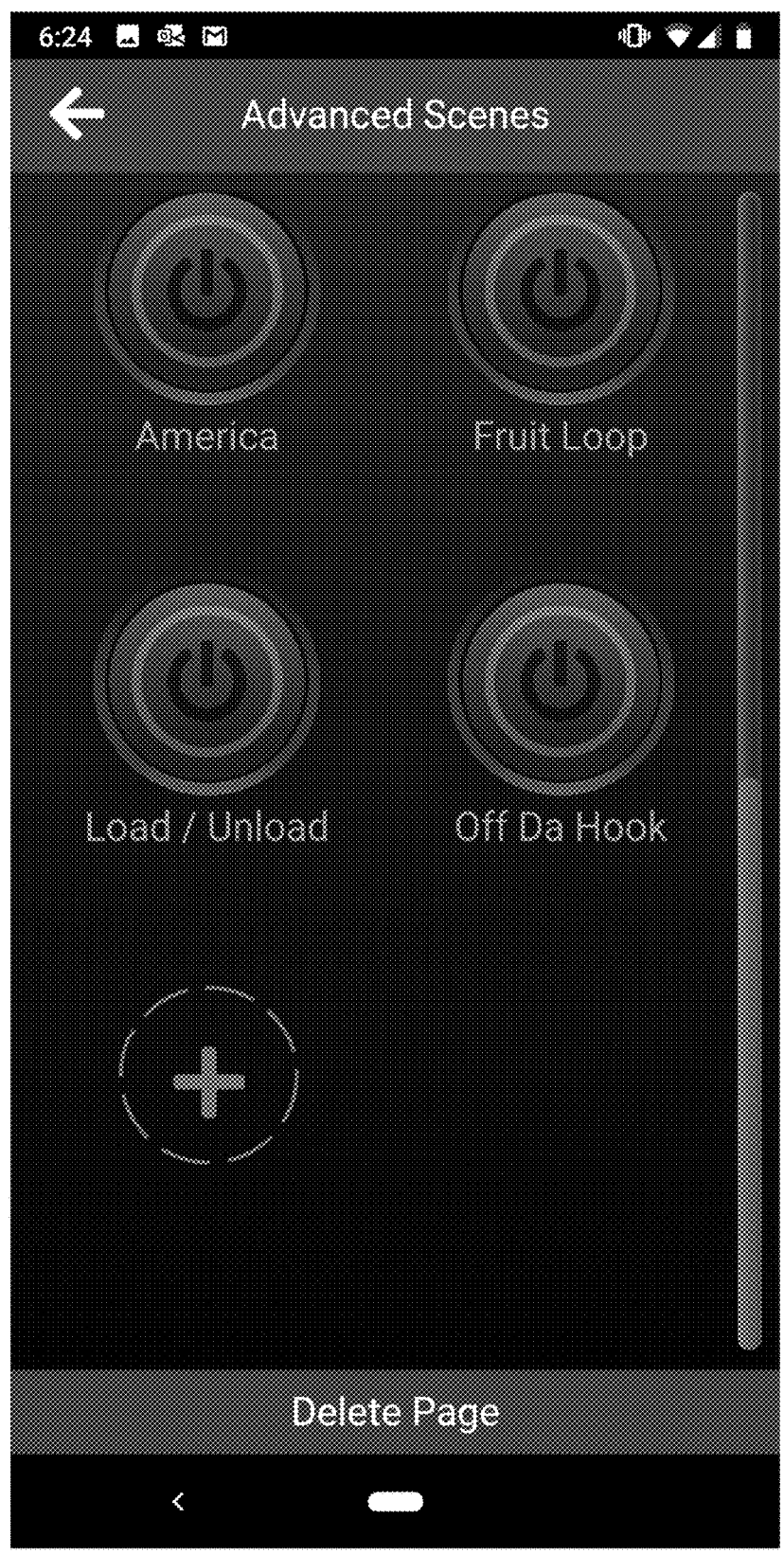
Figure 62:
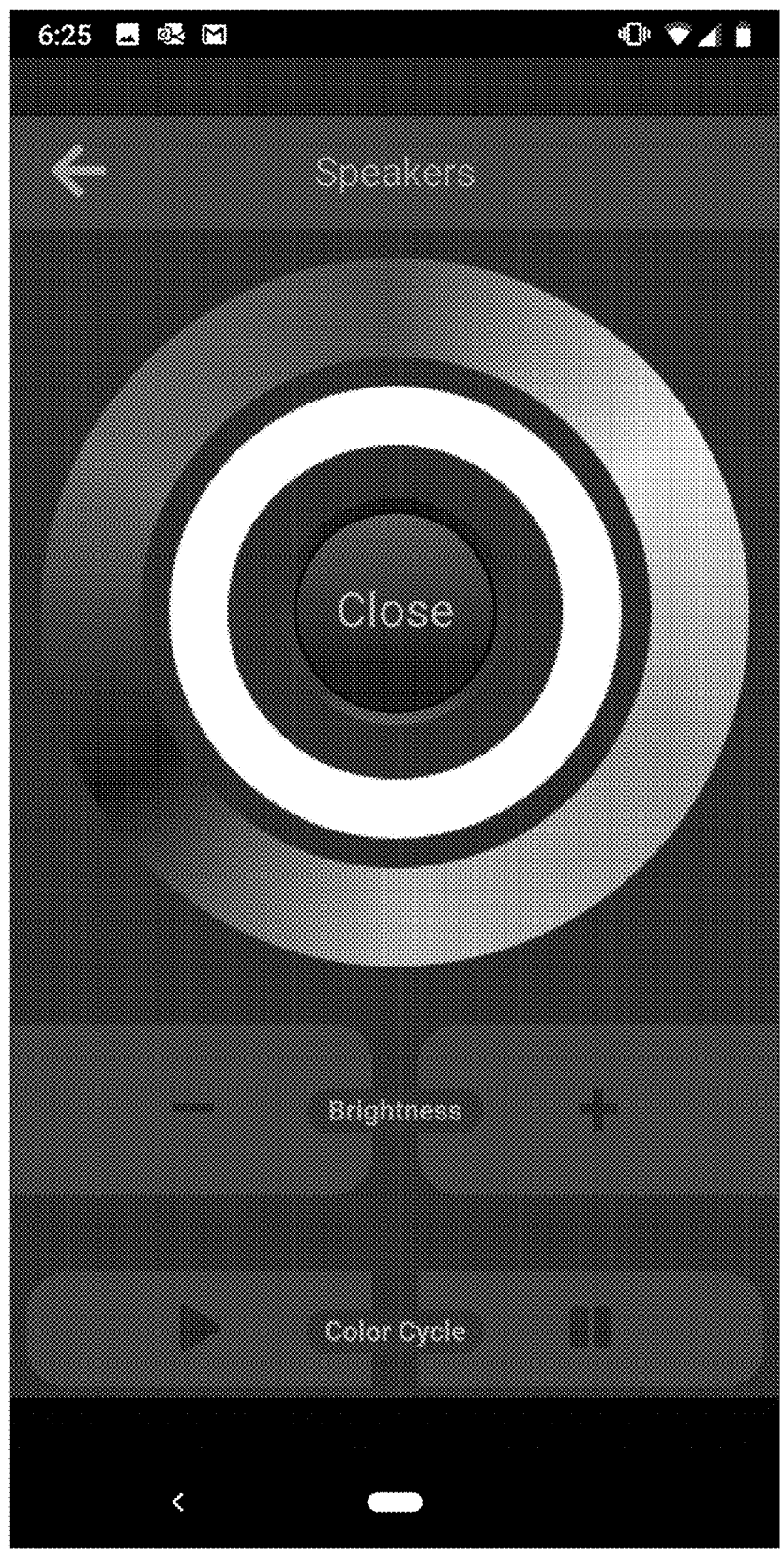
Figure 63:
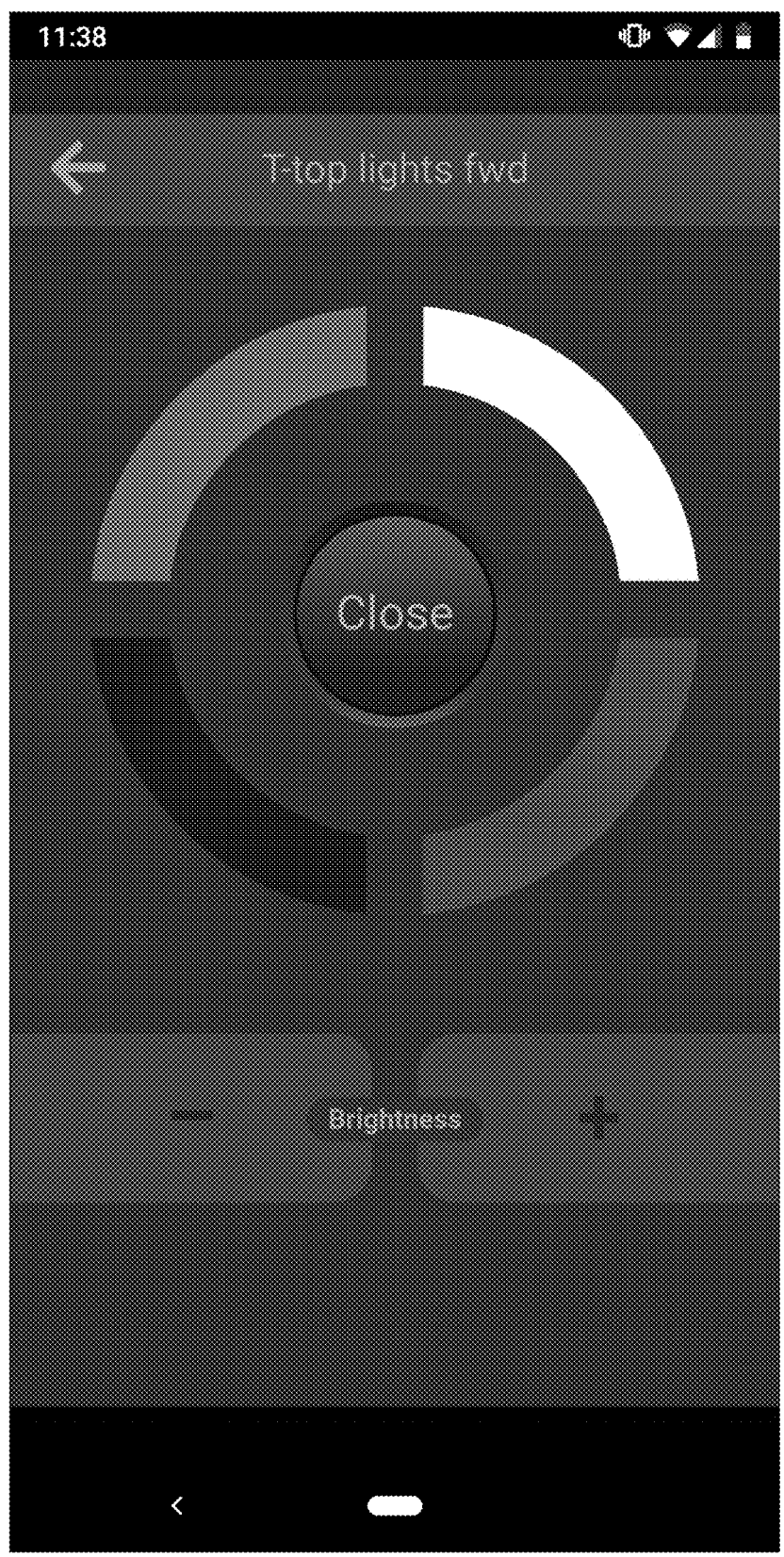
Figure 64:
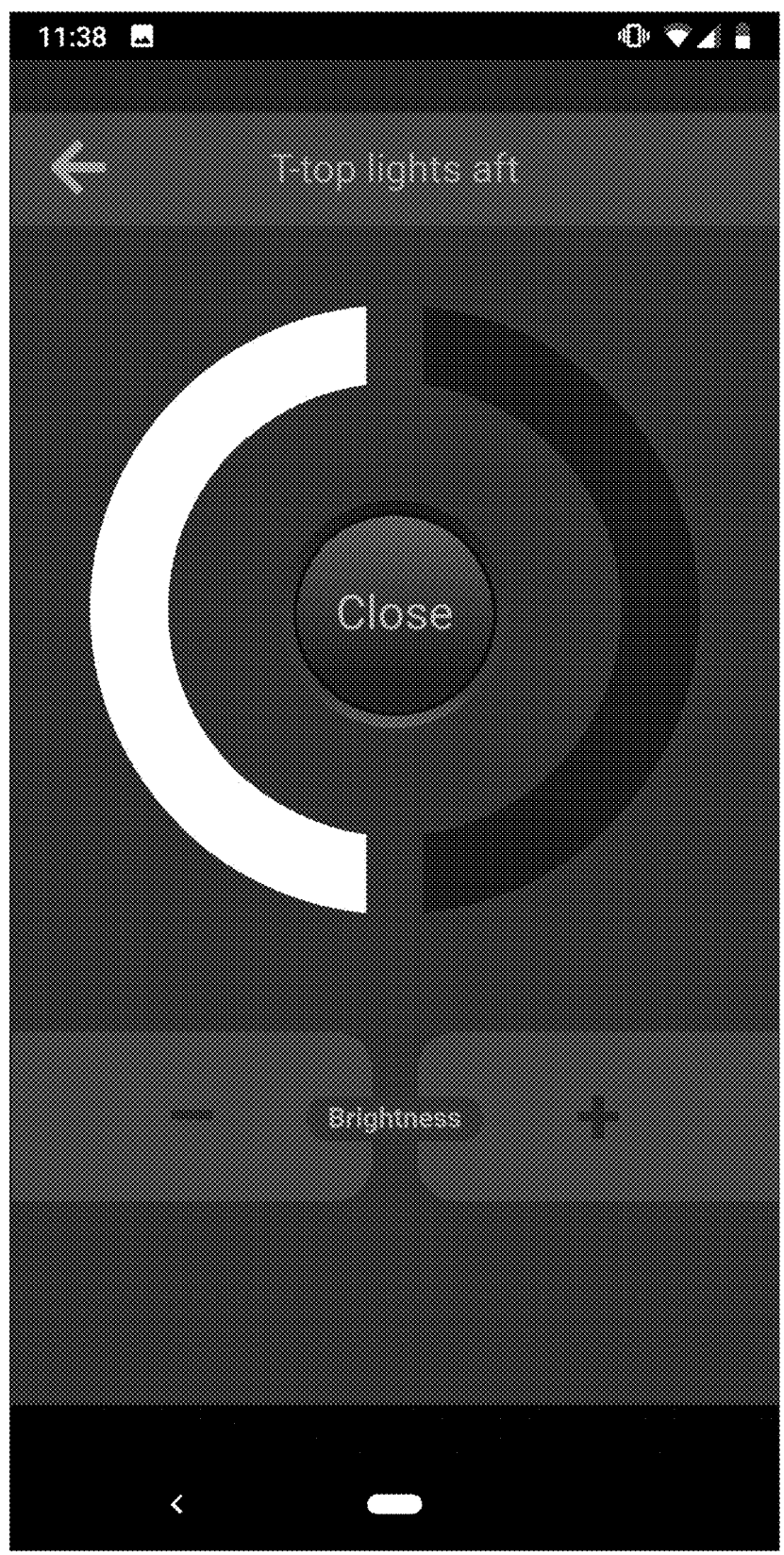
Figure 65:
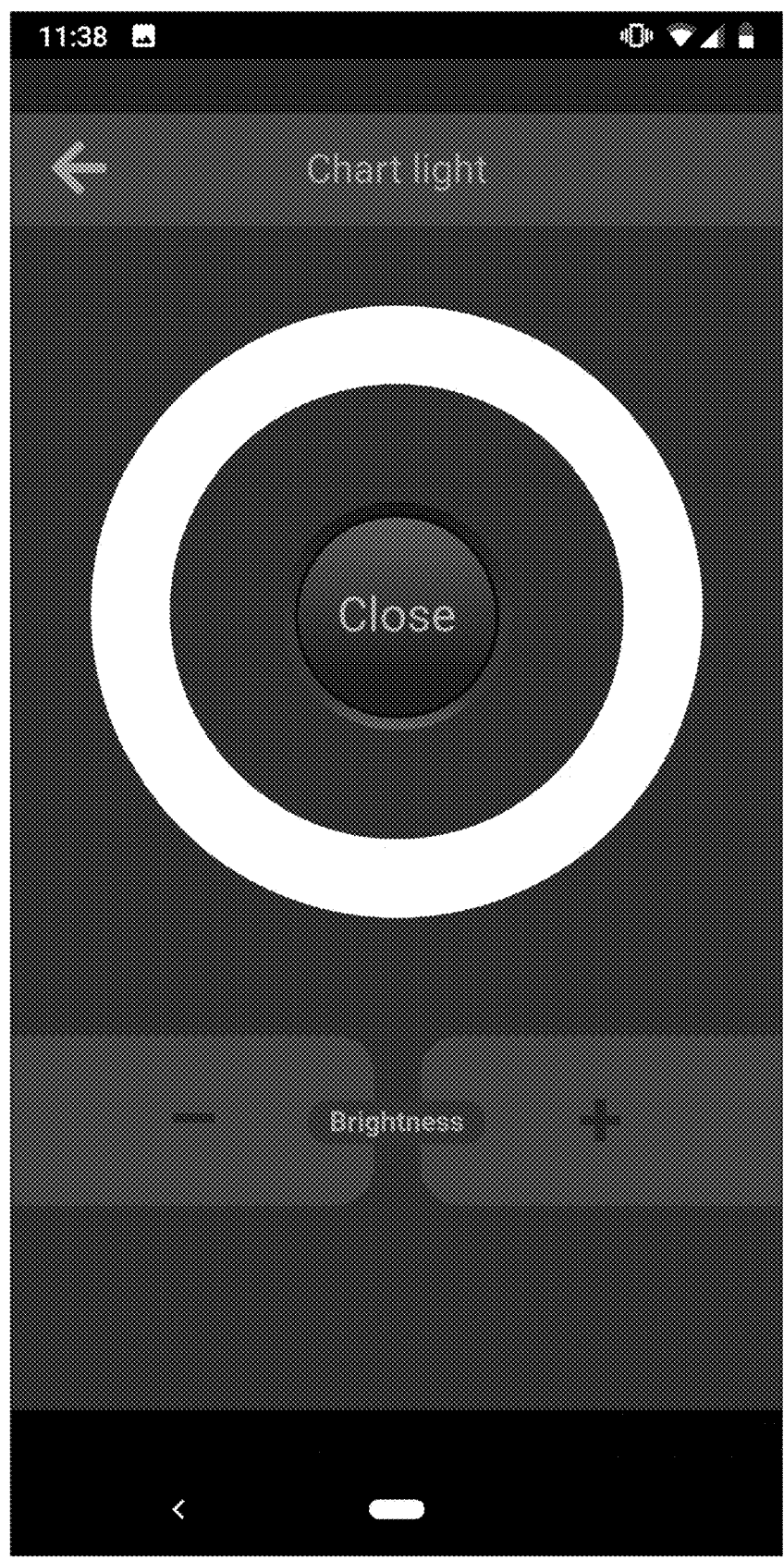

FIGS. 51-54 illustrate exemplary user interfaces that show the creation of a virtual switch as earlier illustrated FIGS. 32-35 and described herein. FIGS. 55-56 illustrate exemplary user interfaces that show the creation of a virtual switch as earlier illustrated in FIGS. 28-31 and described herein. FIG. 55 illustrates the selection of a virtual switch 5802 from the user interface 5800 for editing as shown in editing popup 5902 of FIG. 56.

FIGS. 40-56 were illustrated using a format that might be used in a conventional touch screen vehicle control interface. However, as was noted in FIG. 38, exemplary embodiments may also comprise Wi-Fi and Bluetooth interface components. In such embodiments, a mobile device such as a smartphone may be used to interface and control the lighting control system. FIGS. 57-65 illustrate a series of user interface displays that are used in an exemplary embodiment of such an implementation. This type of implementation may permit a user to adjust lighting characteristics without having to access the conventional touch screen vehicle control interface.

The PLI systems and methods herein, which power lighting devices with a lighting power line and also provide lighting commands via the same power line, can also be used to control loads other than light sources, e.g., motors, actuators, etc. In some exemplary embodiments, a device accepts PLIs to control a non-lighting load that is powered by the lighting power line. For example, in some exemplary embodiments, a device accepts PLIs to control LEDs and control motors/actuators to control pan and/or tilt of the luminaire and/or focus of an optic associated with the LEDs (with the motors/actuators being powered by the lighting power line). In exemplary embodiments, such PLI devices are connected to a lighting power line and ground line and comprise: one or more LEDs, LED drivers connected to a controller, the controller for receiving and implementing PLIs, motors/actuators to control pan and/or tilt of the luminaire and/or focus of an optic associated with the LEDs, motor/actuator drivers, and a power supply powered by the lighting power line to power the circuitry (power the controller, LED drivers, LEDs, motors/actuators, motor/actuator drivers, etc.).

In other exemplary embodiments, a device accepts PLIs to control a lighting load and/or a non-lighting load that requires more power than a lighting power line can provide. For example, in some exemplary embodiments, a device accepts PLIs to control LEDs and control motors/actuators to control pan and/or tilt of the luminaire and/or focus of an optic associated with the LEDs (with the motors/actuators being powered by a different power line). In exemplary embodiments, such PLI devices are connected to a lighting power line a ground line, and an additional power line and comprise: one or more LEDs, LED drivers connected to a controller, the controller for receiving and implementing PLIs, motors/actuators to control pan and/or tilt of the luminaire and/or focus of an optic associated with the LEDs, motor/actuator drivers, and a power supply powered by the lighting power line to power the circuitry except for the motors/actuators (power the controller, LED drivers, LEDs, motor/actuator drivers, etc.).

In some exemplary embodiments, controlling the pan and/or tilt angles of the lighting device can comprise motors/actuators in or proximate the lighting device to physically move a portion of (or all of) the luminaire to physically change the pan and/or tilt angles of the lighting device. This can be commanded by the PLI controller 102 using PLIs transmitted via a power line, the PLI commands having command and data to change one or both angles; this is implemented by the lighting device controller controlling the motors/actuators. In the alternative, controlling the pan and/or tilt angles of the lighting device can comprise virtual control of pan and/or tilt angle. For example, exemplary embodiments include a plurality of light sources aimed at different angles to form a composite illuminated region; turning on a subset of those light sources will illuminate subset of the composite illuminated region. In such embodiments, adjusting the pan and/or tilt angle can comprise sequentially turning OFF one or more light sources illuminating at one edge of the composite region and turning ON one or more light sources illuminating at the opposite edge of the composite region to create an effect of physically adjusting the pan/tilt angle of the lighting device (or simply changing from one subset to the other to abruptly change from only illuminating one part of the composite illuminated region to only illuminating a different—perhaps overlapping—part of the composite illuminated region). This can be commanded by the PLI controller 102 using PLIs transmitted via a power line, the PLI commands having command and data to change one or both of the pan and tilt angles; this is implemented by the lighting device controller turning ON and OFF selected subsets of light sources.

Figure 66:
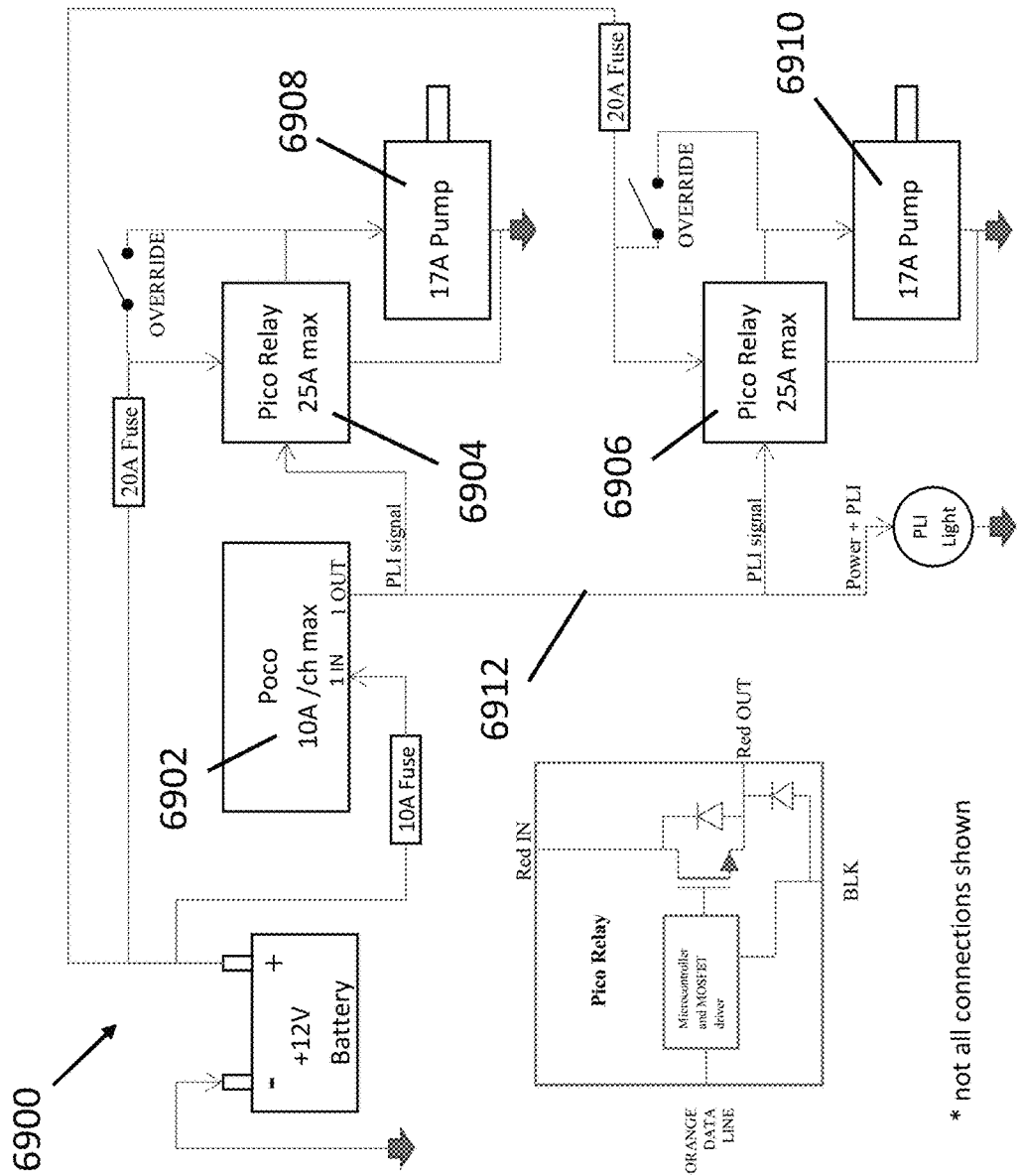
FIG. 66 is a block diagram of an exemplary device controller using components and communication methods employed by the lighting control systems herein.
Figure 67:
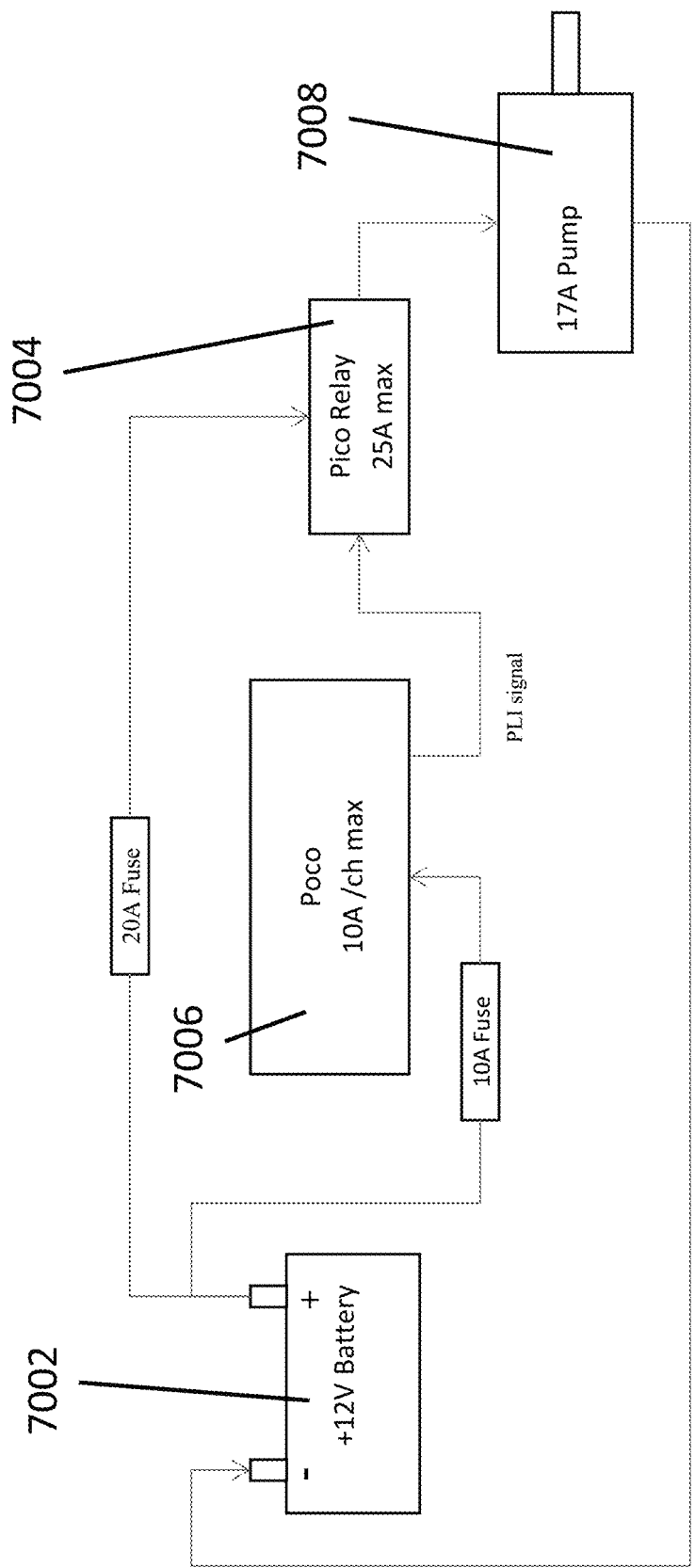
FIGS. 67-68 are block diagrams of alternate exemplary embodiments of the device controller of FIG. 66.

In exemplary embodiments, PLI-controlled relays are provided. In some exemplary embodiments, a PLI-controlled relay is connected to a lighting power line and controlled using that same lighting power line to switch power from a different power line. FIG. 66 represents an exemplary embodiment of the control system 6900 and relay in which the controller 6902 is used to control devices other than lighting. In the illustrated control system 6900, two relays 6904 and 6906 are used to control pumps 6908 and 6910. In the illustrated embodiment, a PLI signal is provided to the relays 6904 and 6906 through a control wire 6912 that is separate from the power supply to the pumps 6908 and 6910. This configuration may be used when the power provided to a load device (pumps 6908 and 6910 in the illustrated example) is larger than the controller 6902 can support directly. In such embodiments, the control wire 6912 containing the PLI signal could be routed to lighting circuits as described elsewhere herein. FIG. 70 provides another exemplary embodiment in which power from a battery 7002 is provided directly to the relay 7004. As shown, power from the battery 7002 is also provided to power the controller 7006. This allows for the implementation of load (a pump 7008) that requires more current than the controller 7006 can provide.

Figure 68:
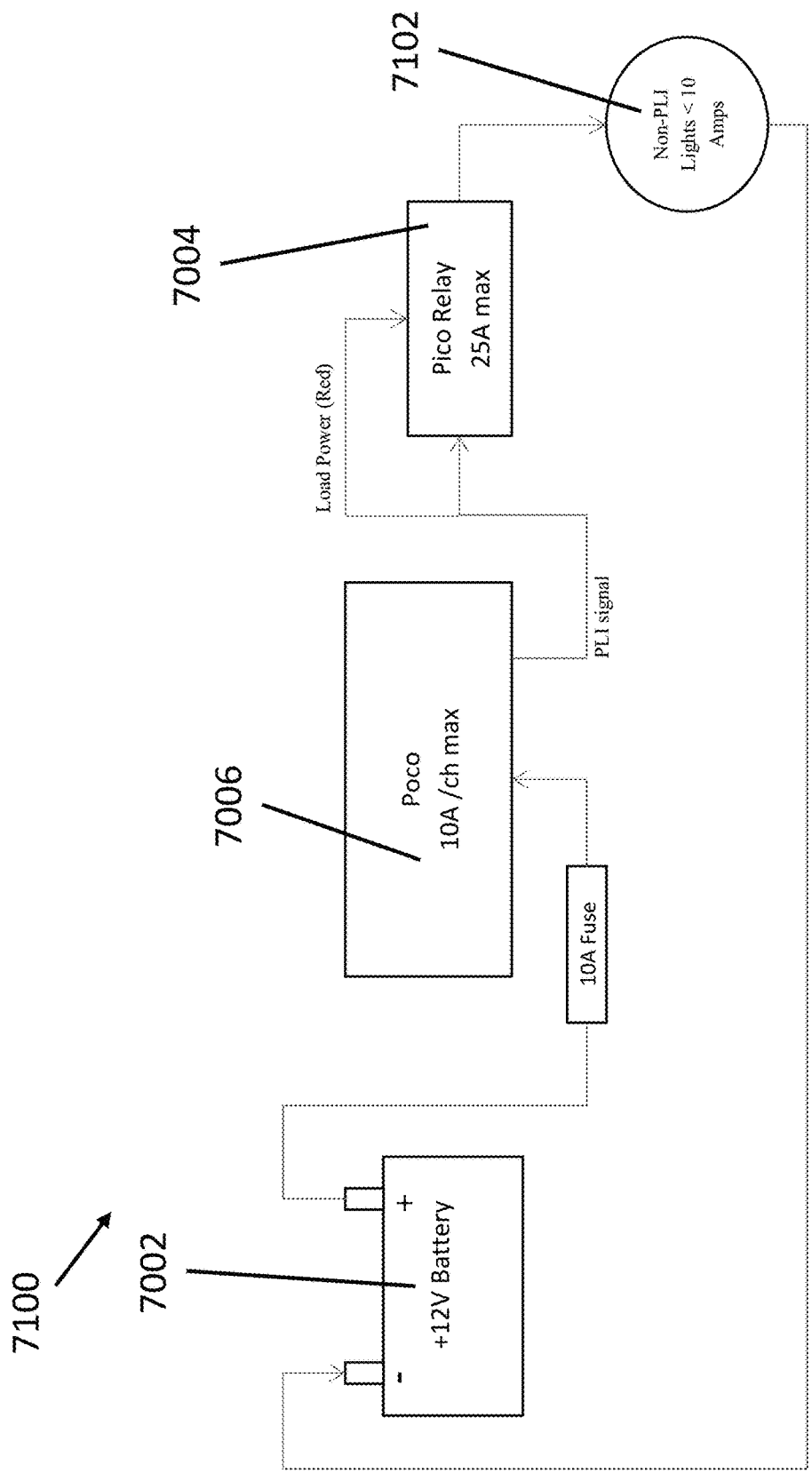

FIG. 68 illustrates a lighting control system 7100 that utilizes a controller 7006 to control a lighting load 7102 using a relay 7004 without the need for a lighting fixture that is PLI enabled.

What have been described above are examples. It is, of course, not possible to describe every conceivable combination of components for purposes of describing the examples of the disclosure described herein, but one of ordinary skill in the art will recognize that many further combinations and permutations of the examples are possible. Accordingly, the examples described herein are intended to embrace all such alterations, modifications and variations that fall within the scope of the appended claims and the application. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on. Moreover, although various aspects of the claimed subject matter have been described herein, such aspects need not be utilized in combination. It is therefore intended that the appended claims cover all such changes and modifications that are within the scope of the claimed subject matter.

Additional exemplary embodiments:

A. A method of controlling LED lighting devices, comprising:

providing a controller configured to transmit lighting control instructions comprising bits of a first bit polarity or bits of a second bit polarity, wherein a lighting control instruction to control the output color of a device comprises one or both of the following:

(a) two start bits of the first bit polarity; a plurality of bits comprising first and second sequential command bits, the first command bit being of the first bit polarity and the second command bit being of the second bit polarity; and a plurality of bits representing color data; and
(b) two start bits of the first bit polarity, a plurality of bits comprising first and second sequential command bits, the first command bit being of the first bit polarity and the second command bit being of the first bit polarity, and a plurality of bits representing saturation and hue data.

B. A method of controlling LED lighting devices, comprising:
providing a controller configured to transmit lighting control instructions comprising bits of a first bit polarity or bits of a second bit polarity, wherein a lighting control instruction causing an LED lighting device to inhibit output on startup comprises:
two start bits of the first bit polarity; and
then a plurality of bits comprising sequential command bits, the first command bit being of the second bit polarity, the second command bit being of the second bit polarity, the third command bit being of the first bit polarity, the fourth command bit being of the first bit polarity, the fifth command bit being of the second bit polarity, and the sixth command bit being of the second bit polarity.

C. The method of controlling LED lighting devices according to embodiment A:
wherein the lighting control instructions are power line instructions (PLIs) sent via a lighting power line, the lighting power line having a nominal voltage of 10-30 VDC;
wherein for bits of the first bit polarity, the controller temporarily causes the lighting power line to drop below its nominal voltage to below a voltage threshold set by the controller; and
wherein for bits of the second bit polarity, the lighting power line does not drop to below the voltage threshold set by the controller.

D. A method of controlling LED lighting devices using power line instructions (PLIs) sent via one or more power lines, comprising:
providing a controller configured to sequentially transmit lighting control PLIs via one or more power lines to control the pan and tilt angles of the lighting device; and
providing a controller configured to sequentially transmit lighting control PLIs via one or more power lines to control the pan and tilt angles of the light as well as the focus of the light (zoom) where the diameter of the light projected on a surface that is a plane perpendicular to the direction of propagation of the energy increases and decreases in diameter while decreasing and increasing respectively in light intensity (power per unit area).

E. A method of controlling devices with ON/OFF or PWM capability with power line instructions (PLIs) sent via one or more power lines, comprising:
providing a controller configured to sequentially transmit control PLIs via one or more power lines to control loads such as motors, and lighting devices without PLI capability.

F. The method of controlling LED lighting devices according to claim 20:
wherein the user interface permits a user to assign an output color for each subset of lights on the system selected from 2-color lights, 3-color lights, and RGBW lights, and wherein the icon on the main page for each subset is correspondingly set to a 2-color light icon, a 3-color light icon, and an RGBW light icon; and
wherein the user interface permits a user to assign an output color and intensity for each subset of lights when activated with icon (e.g., via quick press).

What is claimed is:

1. A method of controlling LED lighting devices on a vehicle using power line instructions (PLIs) sent via a lighting power line of the vehicle, the lighting power line having a nominal voltage of 10-30 VDC, comprising:
providing a controller configured to sequentially transmit lighting control PLIs via the lighting power line of the vehicle to control the color and intensity of LED lighting devices on the vehicle, wherein the lighting control PLIs comprise a plurality of data bits and wherein one type of data bit of the PLIs comprises the controller temporarily causing the power line to drop below the nominal voltage to below a voltage threshold set by a receiving controller;
providing a plurality of LED lighting devices, each LED lighting device configured to (a) receive lighting control PLIs via a power line, (b) detect when the voltage on the power line drops below the voltage threshold to detect PLI data bits, and (c) change the lighting configuration of the LED lighting device in accordance with received PLIs; and
providing a user interface permitting a user to instruct the controller to command, via a PLI, the LED lighting devices to change display color and intensity.

2. The method of controlling LED lighting devices according to claim 1:
wherein the user interface comprises an auto-identify mode permitting a user to determine which lights are on which power line channel; and
wherein, in the auto-identify mode, the controller commands, via a PLI, the LED lighting devices on a selected channel to turn ON and prompts the user to indicate whether selected lights are ON or OFF and, if they are ON, whether other lights are also ON.

3. The method of controlling LED lighting devices according to claim 2:
wherein, in the auto-identify mode, the controller then commands, via a PLI, the LED lighting devices on a selected clan of that channel to turn ON and prompts the user to indicate whether selected lights are ON or OFF and, if they are ON, whether other lights are also ON.

4. The method of controlling LED lighting devices according to claim 1, wherein the user interface has a main control page displaying a name and icon for each subset of the lights on a system, wherein the user interface permits a user to assign an output color for each subset of lights on the system, and wherein the icon on the main page for each subset differs, depending on the selected output color for that subset.

5. The method of controlling LED lighting devices according to claim 4, wherein the user interface permits a user to assign an output color for each subset of lights on the system selected from 2-color lights, 3-color lights, and RGBW lights, and wherein the icon on the main page for each subset is correspondingly set to a 2-color light icon, a 3-color light icon, and an RGBW light icon.

6. The method of controlling LED lighting devices according to claim 5, wherein the 2-color light icon has an associated 2-color widget, the 3-color light icon has an associated 3-color widget, and the RGBW light icon has an associated RGBW widget.

7. The method of controlling LED lighting devices according to claim 1, further comprising:
providing a controller configured to transmit lighting control instructions comprising bits of a first bit polarity or bits of a second bit polarity, wherein a lighting control instruction to control the output color of a device comprises one or both of the following:
- (a) two start bits of the first bit polarity; a plurality of bits comprising first and second sequential command bits, the first command bit being of the first bit polarity and the second command bit being of the second bit polarity; and a plurality of bits representing color data; and
- (b) two start bits of the first bit polarity, a plurality of bits comprising first and second sequential command bits, the first command bit being of the first bit polarity and the second command bit being of the first bit polarity, and a plurality of bits representing saturation and hue data.

8. The method of controlling LED lighting devices according to claim 7:
wherein the lighting control instructions are power line instructions (PLIs) sent via a lighting power line, the lighting power line having a nominal voltage of 10-30 VDC;
wherein for bits of the first bit polarity, the controller temporarily causes the lighting power line to drop below its nominal voltage to below a voltage threshold set by the controller; and
wherein for bits of the second bit polarity, the lighting power line does not drop to below the voltage threshold set by the controller.

9. The method of controlling LED lighting devices according to claim 1, further comprising:
providing a controller configured to transmit lighting control instructions comprising bits of a first bit polarity or bits of a second bit polarity, wherein a lighting control instruction causing an LED lighting device to inhibit output on startup comprises:
two start bits of the first bit polarity; and
then a plurality of bits comprising sequential command bits, the first command bit being of the second bit polarity, the second command bit being of the second bit polarity, the third command bit being of the first bit polarity, the fourth command bit being of the first bit polarity, the fifth command bit being of the second bit polarity, and the sixth command bit being of the second bit polarity.

10. The method of controlling LED lighting devices according to claim 1, wherein the user interface permits a user to instruct the controller to do any one or any two or more of the following:
command, via a PLI, one of the LED lighting devices to display 100% intensity at the current color;
command, via a PLI, one of the LED lighting devices to display a specific color at a specific non-zero, non-100% intensity;
command, via a PLI, one of the LED lighting devices to display a specific color with no change in intensity;
command, via a PLI, one of the LED lighting devices to turn off;
command, via a PLI, all of the LED lighting devices to turn off;
command, via a PLI, one of the LED lighting devices to dim up or down by a set percent;
command, via a PLI, one of the LED lighting devices to invoke a specific,
predetermined pattern or mode;
command, via a PLI, a specific predefined group of the LED lighting devices to display 100% intensity at the current color;
command, via a PLI, a specific predefined group of the LED lighting devices to display a specific color at a specific non-zero, non-100% intensity;
command, via a PLI, a specific predefined group of the LED lighting devices to display a specific color with no change in intensity;
command, via a PLI, a specific predefined group of the LED lighting devices to turn off;
command, via a PLI, a specific predefined group of the LED lighting devices to dim up or down by a set percent; and
command, via a PLI, a specific predefined group of the LED lighting devices to invoke a specific, predetermined pattern or mode.

11. The method of controlling LED lighting devices according to claim 1, wherein the user interface permits a user to instruct the controller to do all of the following:
command, via a PLI, one of the LED lighting devices to display 100% intensity at the current color;
command, via a PLI, one of the LED lighting devices to display a specific color at a specific non-zero, non-100% intensity;
command, via a PLI, one of the LED lighting devices to display a specific color with no change in intensity;
command, via a PLI, one of the LED lighting devices to turn off;
command, via a PLI, all of the LED lighting devices to turn off;
command, via a PLI, one of the LED lighting devices to dim up or down by a set percent;
command, via a PLI, one of the LED lighting devices to invoke a specific,
predetermined pattern or mode;
command, via a PLI, a specific predefined group of the LED lighting devices to display 100% intensity at the current color;
command, via a PLI, a specific predefined group of the LED lighting devices to display a specific color at a specific non-zero, non-100% intensity;
command, via a PLI, a specific predefined group of the LED lighting devices to display a specific color with no change in intensity;
command, via a PLI, a specific predefined group of the LED lighting devices to turn off;
command, via a PLI, a specific predefined group of the LED lighting devices to dim up or down by a set percent; and
command, via a PLI, a specific predefined group of the LED lighting devices to invoke a specific, predetermined pattern or mode.

12. The method of controlling LED lighting devices according to claim 1, wherein the one type of data bit of the PLIs comprises the controller causing the power line to drop below the voltage threshold for 80-150 microseconds.

13. The method of controlling LED lighting devices according to claim 1, wherein the user interface permits a user to instruct the controller to command, via a PLI, a specific predefined group of the LED lighting devices to invoke a configured lighting scene.

14. The method of controlling LED lighting devices according to claim 1, wherein the vehicle is a boat and wherein the user interface permits a user to instruct the controller to command, via a PLI, a specific predefined group of the LED lighting devices to invoke a scene such as "night fishing mode" in which underwater lights turn on green and other lights transition to a dimmed red state, or turn off.

15. An LED lighting device powered by a lighting power line and configured to (a) receive lighting control power line instructions (PLIs) sent via the lighting power line, (b) detect when a voltage on the lighting power line drops below a voltage threshold to detect specific PLI data bits, and (c) change the color and intensity of the LED lighting device in accordance with received PLIs, the LED lighting device comprising a decoder to decode data bits that have been encoded in PLIs received by the LED lighting device, the data bits comprising color data bits and intensity data bits; and wherein the PLIs comprise the following protocol on the lighting power line:
at least two start bits, each of the start bits comprising the lighting power line voltage dropping below a nominal voltage of 10-30 VDC to a voltage threshold for 80-400 microseconds and then increasing back up, and wherein the at least two start bits are separated by a period of time that establishes a baud rate for the PLIs;
a plurality of data bits comprising command bits and bits representing at least one of color data, hue and saturation data, and brightness data, wherein for another type of data bit and between data bits, the lighting power line does not drop to below the voltage threshold set by the controller; and
a plurality of error-detecting bits.

16. A method of controlling LED lighting devices on a vehicle using power line instructions (PLIs) sent via a lighting power line of the vehicle, the lighting power line having a nominal voltage of 10-30 VDC, comprising:
providing a controller configured to sequentially transmit lighting control PLIs via the lighting power line to control the color and intensity of LED lighting devices on the vehicle, wherein the lighting power line has a nominal voltage of 10-30 VDC; wherein the lighting control PLIs comprise multiple data bits; and wherein one type of data bit of the PLIs comprises the controller temporarily causing the lighting power line to drop below its nominal voltage to below a voltage threshold set by the controller; and wherein the PLIs comprise the following protocol on the lighting power line:
at least two start bits, each of the start bits comprising the controller temporarily causing the lighting power line voltage to drop below the voltage threshold set by the controller for 80-400 microseconds and then increasing back up, and wherein the at least two start bits are separated by a period of time that establishes a baud rate for the PLIs;
a plurality of data bits comprising command bits and bits representing at least one of color data, hue and saturation data, and brightness data, wherein for another type of data bit and between data bits, the lighting power line does not drop to below the voltage threshold set by the controller; and
a plurality of error-detecting bits.

17. The method of controlling LED lighting devices according to claim 16, wherein each of the start bits comprise the controller temporarily causing the lighting power line voltage to drop below the voltage threshold set by the controller for 80-150 microseconds and then increasing back up.

18. The method of controlling LED lighting devices according to claim 16, wherein the at least two start bits are separated by a period of time of one of 4.85-5.15 ms or 0.97-1.03 ms establishing the baud rate for the PLIs.

* * * * *